US012728667B2

(12) United States Patent
Albin et al.

(10) Patent No.: US 12,728,667 B2
(45) Date of Patent: Sep. 8, 2026

(54) VEHICLE WHEEL-BASED COMPUTING DEVICE

(71) Applicant: Mercedes-Benz Group AG, Stuttgart (DE)

(72) Inventors: Thomas Albin, Stuttgart (DE); Timothy Fenlon, Santa Clara, CA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 549 days.

(21) Appl. No.: 18/356,820

(22) Filed: Jul. 21, 2023

(65) Prior Publication Data

US 2025/0026144 A1 Jan. 23, 2025

(51) Int. Cl.
*B60B 7/20* (2006.01)
*B60W 40/10* (2012.01)

(52) U.S. Cl.
CPC ............... *B60B 7/20* (2013.01); *B60W 40/10* (2013.01)

(58) Field of Classification Search
None
See application file for complete search history.

(56) References Cited

U.S. PATENT DOCUMENTS

| | | | | |
|---|---|---|---|---|
| 8,096,069 | B2 * | 1/2012 | Ishikawa ................. | G09F 21/10 40/589 |
| 10,636,389 | B2 | 4/2020 | Gilbert et al. | |
| 11,670,295 | B2 | 6/2023 | Back et al. | |
| 12,033,261 | B2 | 7/2024 | Villegas et al. | |
| 2008/0106140 | A1 | 5/2008 | Velez | |
| 2011/0074342 | A1 * | 3/2011 | MacLaughlin ......... | H02J 50/12 320/108 |
| 2013/0335311 | A1 * | 12/2013 | Kim .......................... | G06F 3/01 345/156 |
| 2014/0204344 | A1 * | 7/2014 | Harris .................... | G03H 1/265 359/23 |
| 2022/0004809 | A1 | 1/2022 | Iyer et al. | |
| 2022/0084204 | A1 | 3/2022 | Li et al. | |
| 2023/0350702 | A1 * | 11/2023 | Wen ........................ | G06F 9/451 |
| 2025/0026144 | A1 | 1/2025 | Albin et al. | |

FOREIGN PATENT DOCUMENTS

| | | | |
|---|---|---|---|
| CN | 110641223 | A | 1/2020 |
| CN | 211493520 | U | 9/2020 |
| DE | 102015007741 | A1 | 12/2016 |
| DE | 102018121808 | A1 | 3/2019 |
| WO | WO 2022078814 | A1 | 4/2022 |

OTHER PUBLICATIONS

Baier et al., "Hybrid physics and deep learning model for interpretable vehicle state prediction", arXiv preprint arXiv:2103.06727, dated Jun. 8, 2022, 9 pages.
U.S. Appl. No. 18/332,300, filed Jun. 9, 2023, 70 pages.
Non-Final Office Action for the U.S. Appl. No. 18/332,300 from the United States Patent and Trademark Office dated May 16, 2025.

* cited by examiner

*Primary Examiner* — Frank S Chen
(74) *Attorney, Agent, or Firm* — Dority & Manning, P.A.

(57) ABSTRACT

A vehicle wheel-based computing device includes a display device that can be at least partially attached to a wheel of a vehicle, and a control circuit. The control circuit can obtain content to be provided for presentation on a display screen of the display device, receive vehicle data indicating a motion parameter associated with the vehicle, and perform a transformation of the content based on: (i) a refresh rate associated with the display device, and (ii) the motion parameter associated with the vehicle.

20 Claims, 25 Drawing Sheets

1300

VEHICLE WHEEL-BASED COMPUTING DEVICE

FIELD

The disclosure relates generally to a vehicle wheel-based computing device which includes a display device that can be at least partially attached to a wheel of a vehicle.

BACKGROUND

Some vehicles can include lighting elements, for example light emitting diode lighting elements, that are provided on the wheels, rims, or hubs of the vehicle tires. Some control systems can cause various lighting effects to be provided by controlling the light emitting diode lighting elements.

SUMMARY

Aspects and advantages of implementations of the disclosure will be set forth in part in the following description, or may be learned from the description, or may be learned through practice of the implementations.

For example, in an aspect, a vehicle wheel-based computing device may be provided. The vehicle wheel-based computing device may include a display device configured for at least partial attachment to a wheel of a vehicle and a control circuit. The control circuit may be configured to: obtain content to be provided for presentation on a display screen of the display device, receive vehicle data indicating a motion parameter associated with the vehicle, and perform a transformation of the content based on: (i) a refresh rate associated with the display device, and (ii) the motion parameter associated with the vehicle.

In an embodiment, the transformation includes a rotation of the content in a direction opposite of a rotation direction of the wheel.

In an embodiment, the display device is circular-shaped.

In an embodiment, the display device covers a rim of the wheel.

In an embodiment, the display device is integrated into the wheel.

In an embodiment, the display device is configured to be detachable from the wheel and attachable to the wheel.

In an embodiment, the control circuit is configured to render the content to be provided for presentation on the display screen of the display device, the content being generated at least partially via one or more machine-learned models, wherein the one or more machine-learned models include one or more machine-learned generative models trained based on training data indicative of a plurality of wheel-based features.

In an embodiment, the motion parameter includes at least one of a speed of the vehicle, an angular velocity of the wheel, revolutions per minute of the wheel, a heading of the wheel or the vehicle, or an acceleration of the vehicle.

In an embodiment, the vehicle wheel-based computing device further includes a motion sensor configured to obtain the vehicle data, and the vehicle data includes at least one of accelerometer data associated with the display device, gyroscope data associated with the display device, wheel torque data, or brake torque data.

In an embodiment, the motion parameter includes an angular velocity of the display device and the transformation includes a rotation of the content. When the angular velocity of the display device is less than a threshold angular velocity value, the control circuit is configured to rotate the content at a rotation rate which matches the angular velocity of the display device, and when the angular velocity of the display device is more than the threshold angular velocity value, the content corresponds to a static image and the control circuit is configured to provide the static image for presentation on the display screen of the display device.

In an embodiment, the motion parameter includes an angular velocity of the display device and the transformation includes a rotation of the content. When the angular velocity of the display device is less than a threshold angular velocity value, the control circuit is configured to rotate the content at a rotation rate which matches the angular velocity of the display device, and when the angular velocity of the display device is more than the threshold angular velocity value, the content corresponds to a video stream and the control circuit is configured to provide the video stream for presentation on the display screen of the display device which appears stationary on the display device.

In an embodiment, the control circuit is configured to obtain an image captured by a camera disposed at the vehicle, and to provide for presentation on the display screen of the display device an augmented-reality image which includes one or more virtual objects which are overlaid on the image captured by the camera.

In an embodiment, to perform the transformation of the content the control circuit is configured to rotate the content to match an angular velocity of the display device such that an orientation of the content presented on the display device is maintained.

In an embodiment, the content to be provided for presentation on the display screen of the display device includes an animation including a plurality of image frames, and to perform the transformation of the content, the control circuit is configured to rotate one or more of the image frames to maintain, while the animation is provided for presentation on the display screen of the display device during rotation of the wheel, an orientation of the animation as it appears from a viewpoint external to the vehicle.

In an embodiment, the control circuit is configured to: obtain motion data associated with the display device based on one or more sensors integrated with the display device, and transmit the motion data to an infotainment system of the vehicle to provide for display within the vehicle a representation of the display screen of the display device based on the motion data.

For example, in an aspect, a computer-implemented method can be provided. The method can include obtaining, by a vehicle wheel-based computing device, content to be provided for presentation on a display screen of a display device, the display device being configured for at partial attachment to a wheel of a vehicle; receiving, by the vehicle wheel-based computing device, vehicle data indicating a motion parameter associated with the vehicle; and performing, by the vehicle wheel-based computing device, a transformation of the content based on: (i) a refresh rate associated with the display device, and (ii) the motion parameter associated with the vehicle.

In an embodiment, the method can further include rendering, by the vehicle wheel-based computing device, the content to be provided for presentation on the display screen of the display device, the content being generated at least partially via one or more machine-learned models, wherein the one or more machine-learned models include one or more machine-learned generative models trained based on training data indicative of a plurality of wheel-based features.

For example, in an aspect, a vehicle can be provided. The vehicle can include a wheel and a vehicle wheel-based computing device. The vehicle wheel-based computing device includes: a display device configured for at least partial attachment to the wheel, and a control circuit configured to: obtain content to be provided for presentation on a display screen of the display device, receive vehicle data indicating a motion parameter associated with the vehicle, and perform a transformation of the content based on: (i) a refresh rate associated with the display device, and (ii) the motion parameter associated with the vehicle.

In an embodiment, the transformation includes a rotation of the content in a direction opposite of a rotation direction of the wheel.

In an embodiment, the display device is circular-shaped and covers a rim of the wheel.

In an embodiment, the control circuit is configured to receive an input requesting content to be provided for presentation on the display screen of the display device, and to render the content to be provided for presentation on the display screen of the display device based on the input, the content being rendered at least partially via one or more machine-learned models, wherein the one or more machine-learned models include one or more machine-learned generative models trained based on training data indicative of a plurality of wheel-based features.

In an embodiment, the motion parameter includes an angular velocity of the display device, the display device includes a motion sensor configured to measure motion data associated with the display device, and the control circuit is configured to determine the angular velocity of the display device based on the motion data.

In an embodiment, the vehicle further includes a charging system disposed proximate to the display device, the charging system being configured to transfer power wirelessly to a power source of the display device.

Other example aspects of the disclosure are directed to other systems, methods, vehicles, apparatuses, tangible non-transitory computer-readable media, and devices for the technology described herein.

These and other features, aspects, and advantages of various implementations will become better understood with reference to the following description and appended claims. The accompanying drawings, which are incorporated in and constitute a part of this specification, illustrate implementations of the disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended drawings, in which.

DETAILED DESCRIPTION

Figure 1:
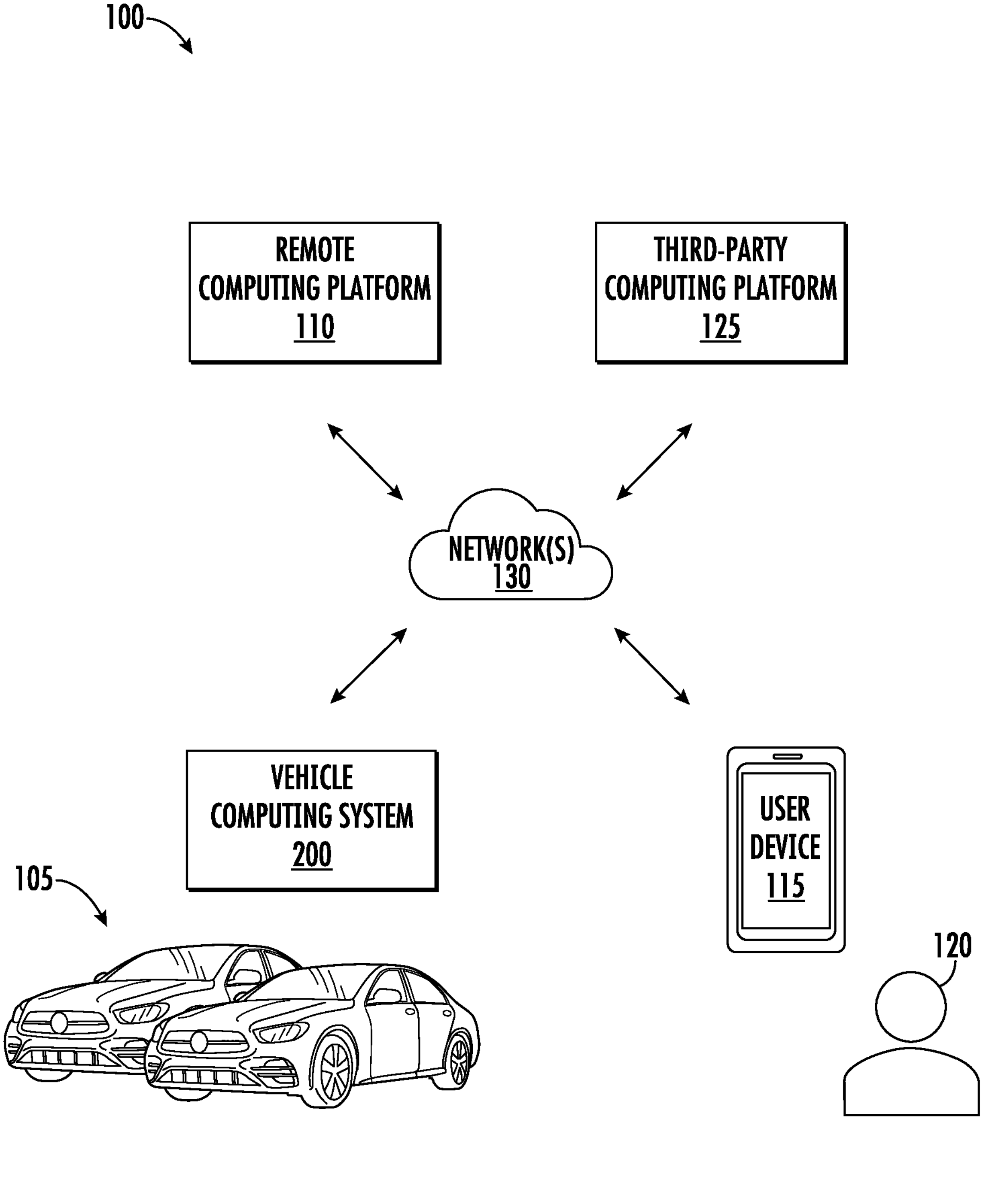
FIG. 1 illustrates an example computing ecosystem according to example embodiments disclosed herein.

Example aspects of the disclosure are directed to a vehicle wheel-based computing device including a "smart" wheel hub display device. The wheel hub display device can be an integrated (e.g., OEM) component or an after-market consumer electronic device that can be attached to a variety of wheels. One example embodiment of the wheel hub display device includes a substantially circular-shaped device with a round display, such as an LED or LCD display screen. For instance, in one example, the wheel hub display device is a high-resolution display (e.g., 1080×1080 display, 4 k display, 8 k display, etc.) with pixels arranged in a circular configuration. Another example embodiment of the wheel hub display device includes a three-dimensional display configured to follow at least a portion of the inner hub and spokes of a wheel. The wheel hub display device can also include an outer protective layer configured to protect the display from debris, weather conditions, and other elements that could damage the wheel hub display device.

The wheel hub display device and associated computing components provide a vehicle operator with the ability to control display elements that provide content including moving images, icons, and other presentation media. For instance, the wheel hub display device can display high quality images, videos, graphic effects, and so on at the wheel of a vehicle. In addition, the wheel hub display device can account for various wheel physics and dynamics in rendering the high quality images. For example, the wheel hub display device can perform a transformation of the content based on: (i) a refresh rate associated with the display device, and (ii) a motion parameter associated with the vehicle. For example, the wheel hub display device can rotate the displayed image (e.g., with respect to the rotational velocity of the wheel) such that the image appears stationary to an observer outside a vehicle as the wheels of the vehicle rotate. As another example, certain effects can be generated with respect to physics of the wheels such that the effects reflect or respond to the motion of the vehicle. For example, the transformation can include a rotation of the content in a direction opposite of a rotation direction of the wheel.

According to example aspects of the disclosure, the content to be presented on a display screen of the wheel hub display device can be based on a user input. In some implementations, the user input can be a request to generate content based on content of the user input. In some implementations, the wheel hub display device can include a machine-learned generative model to generate the content which is to be presented on the wheel hub display device. In other implementations, another component of the vehicle (e.g., an HMI system) or a component of a computing platform (e.g., an entertainment system) may include a machine-learned generative model to generate the content based on the user input and provide the content to the wheel hub display device.

For example, the machine-learned generative model can generate content for the wheel hub display device based on user input data, such as a user prompt, to customize the wheel display according to the user's preferences. A software application (e.g., on a user device, on a vehicle computing system, etc.) can provide operators of a vehicle with generative tools to design and modify different display effects with wheel hub display devices on the wheels of the vehicle. For instance, the application can provide operators of the vehicle with tools to choose what content to display on each wheel hub display device, including user-designed content and generated content from a generative model. The generative model can be any suitable generative model, such as a generative adversarial network (GAN), stable diffusion, or other model. An operator of the vehicle can input a description of content to be generated into the application, which then can utilize the generative model (or other models, such as a physics-based model) to generate the content based on the description. The application can then communicate with the wheel hub display device(s) to display the generated content.

A remote computing platform can manage training and distribution of the generative models to the vehicles. For instance, the remote computing platform can access or maintain a catalog of wheel-based features, such as wheels, hubs, hub caps, rims, etc. including images, videos, drawings, CAD/CAM, 3D meshes, and other forms of data that can be used to train a machine-learned model. The remote computing platform can also store or access training data corresponding to other effects, such as media (e.g., characters, actors, logos, and so on), physical effects (e.g., fire, bubbles, water, etc.), animals, or other suitable data that an operator may wish to incorporate in some degree into the generated content.

Vehicles, computing devices, and methods according to example aspects of the disclosure can provide a number of technical effects and benefits. For instance, vehicles, computing devices, and methods according to example aspects of the disclosure can decrease computational resource usage associated with transmitting and/or storing images for wheel hub display devices at a vehicle. The use of a generative model can provide for the generation of new content at the vehicle itself, which can provide for powerful customization options to be made available to the operator of the vehicle without requiring that the vehicle store extensive data to facilitate those customization options. For instance, using a generative model to generate the generated content can avoid computational resource usage associated with storing potentially thousands or hundreds of thousands of pre-generated images while simultaneously increasing customization potential.

The technology of the disclosure provides a number of computing improvements. This includes improvements to the computing systems onboard vehicles. For example, a vehicle's computing system may be configured to obtain user input data including a description of content to be presented via a display device at least partially attached to a wheel of the vehicle. The computing system may be configured to generate, using one or more models, the content based on the user input data. The one or more models may include a machine-learned generative model. To generate the content, the computing system may be configured to input the user input data into the machine-learned generative model. The machine-learned generative model can be trained based on training data indicative of a plurality of wheel-based features. The machine-learned generative model may be trained to process the user input data and provide generated content that is: based on the description of the content included in the user input data, and configured for presentation via the display device at least partially attached to the wheel of the vehicle. The computing system may be configured to receive an output of the one or more models, the output including the generated content. The computing system may be configured to provide, for presentation via the display device at least partially attached to the wheel of the vehicle, data indicative of the generated content. In this way, the computing system of the vehicle may utilize a trained generative model to display different images, graphics, patterns, etc. (rather than a large onboard database), saving a significant amount of memory, which is limited onboard the vehicle. As such, these saved computing resources can be utilized for the vehicle's core functionalities.

Additionally, the technology of the disclosure allows for dynamic and customizable wheel displays without having to physically manipulate the vehicle's wheels, reducing potential mechanical wear and tear. Furthermore, technology of the disclosure provides a number of computing improvements. This includes improvements to the computing systems onboard vehicles including vehicle wheel-based computing devices. According to embodiments of the disclosure, content can be presented on a display device in a particular manner as viewed from an exterior of the vehicle by a vehicle wheel-based computing device configured to perform a transformation of the content based on: (i) a refresh rate associated with the display device, and (ii) a motion parameter associated with the vehicle. For example, content (e.g., images, videos, etc.) is presented on a display device which is attached to a wheel of the vehicle. The content can be viewed by a person outside of the vehicle while the wheel is rotating by compensating for the rotation of the wheel.

Reference now will be made in detail to embodiments, one or more examples of which are illustrated in the drawings. Each example is provided by way of explanation of the embodiments, not limitation of the disclosure. In fact, it will be apparent to those skilled in the art that various modifications and variations may be made to the embodiments without departing from the scope or spirit of the disclosure. For instance, features illustrated or described as part of one embodiment may be used with another embodiment to yield a still further embodiment. Thus, it is intended that aspects of the disclosure cover such modifications and variations.

The technology of the disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 120. The user 120 may be a driver of the vehicle. In some implementations, the user 120 may be a passenger of the vehicle. In some implementations, the computing ecosystem 100 may include a third-party computing platform 125, as further described herein. The vehicle 105 may include a vehicle computing system 200 located onboard the vehicle 105. The computing platform 110, the user device 115, the third-party computing platform 125, and/or the vehicle computing system 200 may be configured to communicate with one another via one or more networks 130.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 130 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may be associated with (e.g., operated by) an entity. For example, the remote computing platform 110 may be associated with an OEM that is responsible for the make and model of the vehicle 105. In another example, the remote computing platform 110 may be associated with a service entity contracted by the OEM to operate a cloud-based server system that provides computing services to the vehicle 105.

The computing platform 110 may include one or more back-end services for supporting the vehicle 105. The services may include, for example, tele-assist services, navigation/routing services, performance monitoring services, etc. The computing platform 110 may host or otherwise include one or more APIs for communicating data to/from a computing system of the vehicle 105 or the user device 115.

The computing platform 110 may include one or more computing devices. For instance, the computing platform 110 may include a control circuit and a non-transitory computer-readable medium (e.g., memory). The control circuit of the computing platform 110 may be configured to perform the various operations and functions described herein. Further description of the computing hardware and components of computing platform 110 is provided herein with reference to other drawings.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith, as further described herein. In an embodiment, the launch of a software application may initiate a user-network session with the computing platform 110.

The third-party computing platform 125 may include a computing system that is remote from the vehicle 105, remote computing platform 110, and user device 115. In an embodiment, the third-party computing platform 125 may include a cloud-based server system. The term "third-party entity" may be used to refer to an entity that is different than the entity associated with the remote computing platform 110. For example, as described herein, the remote computing platform 110 may be associated with an OEM that is responsible for the make and model of the vehicle 105. The third-party computing platform 125 may be associated with a supplier of the OEM, a maintenance provider, a mapping service provider, an emergency provider, or other types of entities. In another example, the third-party computing platform 125 may be associated with an entity that owns, operates, manages, etc. a software application that is available to or downloaded on the vehicle computing system 200.

The third-party computing platform 125 may include one or more back-end services provided by a third-party entity. The third-party computing platform 125 may provide services that are accessible by the other systems and devices of the ecosystem 100. The services may include, for example, mapping services, routing services, search engine functionality, maintenance services, entertainment services (e.g., music, video, images, gaming, graphics), emergency services (e.g., roadside assistance, 911 support), or other types of services. The third-party computing platform 125 may host or otherwise include one or more APIs for communicating data to/from the third-party computing platform 125 to other systems/devices of the ecosystem 100.

The networks 130 may be any type of network or combination of networks that allows for communication between devices. In some implementations, the networks 130 may include one or more of a local area network, wide area network, the Internet, secure network, cellular network, mesh network, peer-to-peer communication link or some combination thereof and may include any number of wired or wireless links. Communication over the networks 130 may be accomplished, for instance, via a network interface using any type of protocol, protection scheme, encoding, format, packaging, etc. In an embodiment, communication between the vehicle computing system 200 and the user device 115 may be facilitated by near field or short range communication techniques (e.g., BLUETOOTH low energy protocol, radio frequency signaling. NFC protocol).

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat, an amphibious vehicle, etc.). The vehicle 105 may include operator-assistance functionality such as cruise control, advanced driver assistance systems, etc. In some implementations, the vehicle 105 may be a fully or semi-autonomous vehicle.

The vehicle 105 may include a powertrain and one or more power sources. The powertrain may include a motor (e.g., an internal combustion engine, electric motor, or hybrid thereof), e-motor (e.g., electric motor), transmission (e.g., automatic, manual, continuously variable), driveshaft, axles, differential, e-components, gear, etc. The power sources may include one or more types of power sources. For example, the vehicle 105 may be a fully electric vehicle (EV) that is capable of operating a powertrain of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system, as further described with respect to FIG. 3.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc. The vehicle 105 may include one or more wheels. The exterior of the vehicle 105 may include a display device including a display screen that is at least partially attached to one or more of the wheels as described herein.

The systems and components of the vehicle 105 may be configured to communicate via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium, which may be external to the computing system, may act as an external buffer or repository for storing information. In such an example, the computing system may retrieve or otherwise receive the information from the non-transitory computer-readable medium.

Certain routine and known components of vehicle 105 (e.g., an engine) are not illustrated and/or discussed herein for the purpose of brevity. One of ordinary skill in the art will understand the operation of known vehicle components in vehicle 105.

The vehicle 105 may include a vehicle computing system 200. As described herein, the vehicle computing system 200 that is onboard the vehicle 105. For example, the computing devices and components of the vehicle computing system 200 may be housed, located, or otherwise included on or within the vehicle 105. The vehicle computing system 200 may be configured to execute the computing functions and operations of the vehicle 105.

Figure 2A:
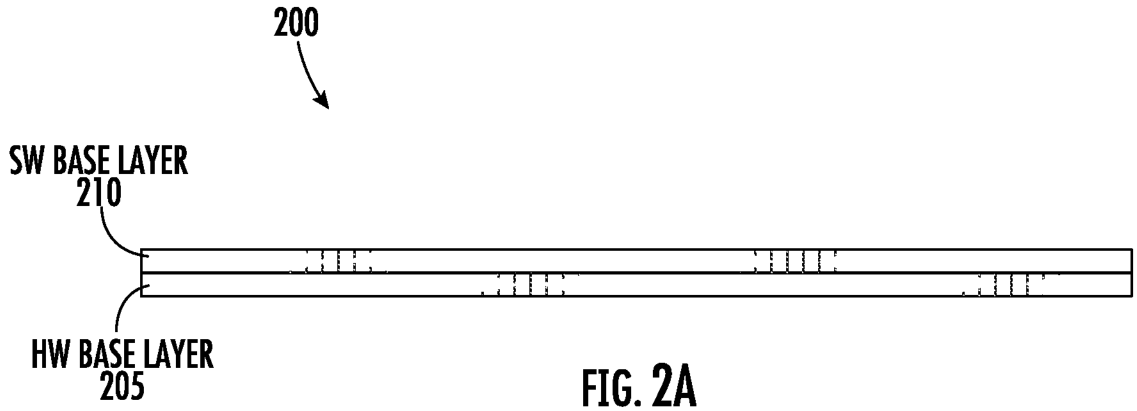
FIGS. 2A-D illustrate diagrams of an example computing architecture for an onboard computing system of a vehicle according to example embodiments disclosed herein.

FIG. 2A illustrates an overview of an operating system of the vehicle computing system 200. The operating system may be a layered operating system. The vehicle computing system 200 may include a hardware layer 205 and a software layer 210. The hardware and software layers 205, 210 may include sub-layers. In some implementations, the operating system of the vehicle computing system 200 may include other layers (e.g., above, below, or in between those shown in FIG. 2A). In an example, the hardware layer 205 and the software layer 210 can be standardized base layers of the vehicle's operating system.

Figure 2B:
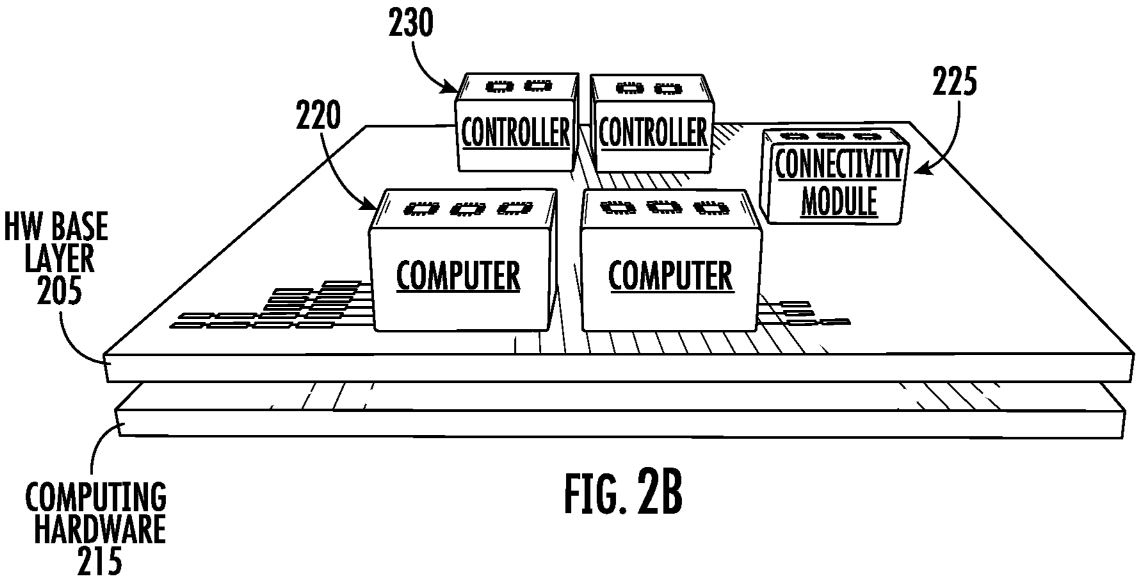

FIG. 2B illustrates a diagram of the hardware layer 205 of the vehicle computing system 200. In the layered operating system of the vehicle computing system 200, the hardware layer 205 can reside between the physical computing hardware 215 onboard the vehicle 105 and the software (e.g., of software layer 210) that runs onboard the vehicle 105.

The hardware layer 205 may be an abstraction layer including computing code that allows for communication between the software and the computing hardware 215 in the vehicle computing system 200. For example, the hardware layer 205 may include interfaces and calls that allow the vehicle computing system 200 to generate a hardware-dependent instruction to the computing hardware 215 (e.g., processors, memories, etc.) of the vehicle 105.

The hardware layer 205 may be configured to help coordinate the hardware resources. The architecture of the hardware layer 205 may be serviced oriented. The services may help provide the computing capabilities of the vehicle computing system 200. For instance, the hardware layer 205 may include the domain computers 220 of the vehicle 105, which may host various functionality of the vehicle 105 such as the vehicle's intelligent functionality. The specification of each domain computer may be tailored to the functions and the performance requirements where the services are abstracted to the domain computers. By way of example, this permits certain processing resources (e.g., graphical processing units) to support the functionality of a central in-vehicle infotainment computer for rendering graphics across one or more display devices for navigation, games, etc. or to support an intelligent automated driving computer to achieve certain industry assurances.

The hardware layer 205 may be configured to include a connectivity module 225 for the vehicle computing system 200. The connectivity module may include code/instructions for interfacing with the communications hardware of the vehicle 105. This can include, for example, interfacing with a communications controller, receiver, transceiver, transmitter, port, conductors, or other hardware for communicating data/information. The connectivity module 225 may allow the vehicle computing system 200 to communicate with other computing systems that are remote from the vehicle 105 including, for example, remote computing platform 110 (e.g., an OEM cloud platform).

The architecture design of the hardware layer 205 may be configured for interfacing with the computing hardware 215 for one or more vehicle control units. The vehicle control units may be configured for controlling various functions of the vehicle 105. This may include, for example, a central exterior and interior controller (CEIC), a charging controller, or other controllers as further described herein.

Figure 2C:
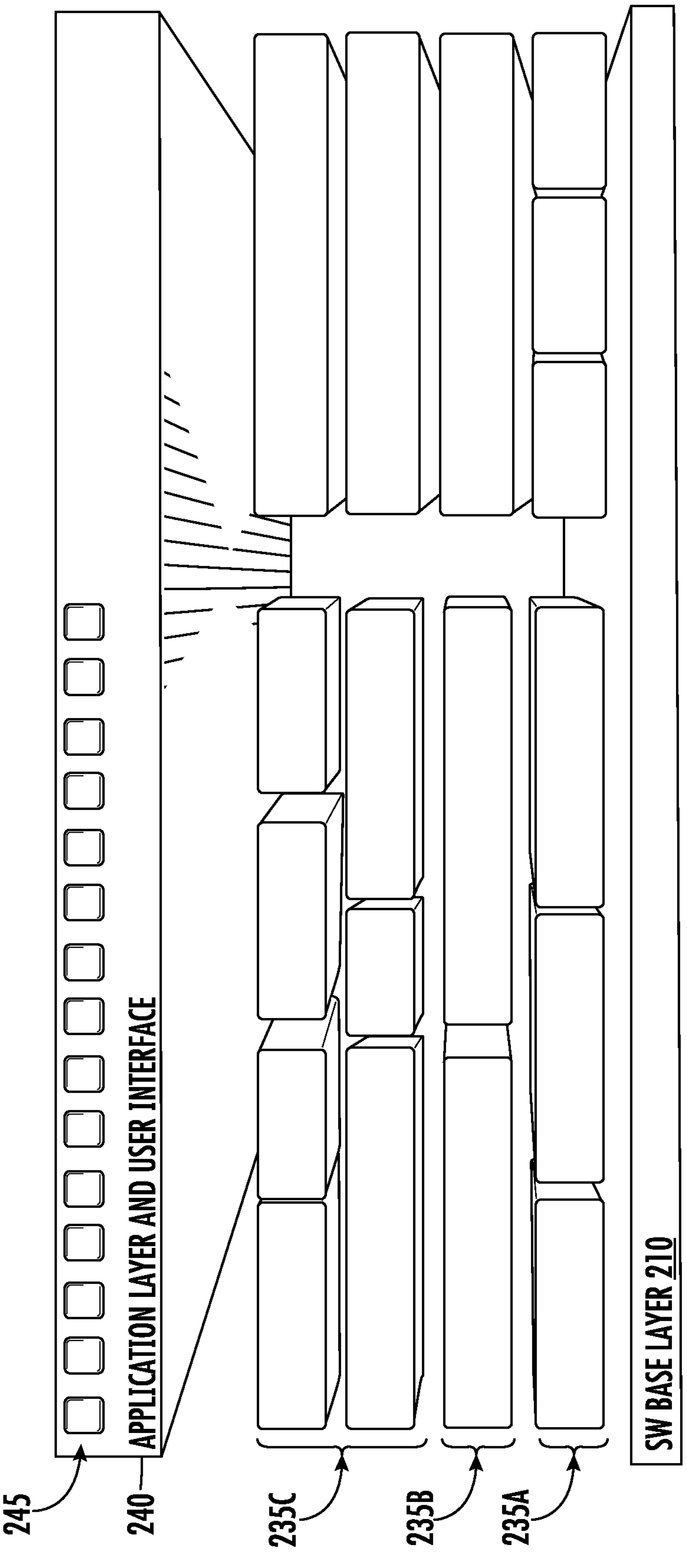

The software layer 210 may be configured to provide software operations for executing various types of functionality and applications of the vehicle 105. FIG. 2C illustrates a diagram of the software layer 210 of the vehicle computing system 200. The architecture of the software layer 210 may be service oriented and may be configured to provide software for various functions of the vehicle computing system 200. To do so, the software layer 210 may include a plurality of sublayers 235A, 235B, 235C. For instance, the software layer 210 may include a first sublayer 235A including firmware (e.g., audio firmware) and a hypervisor, a second sublayer 235B including operating system components (e.g., open-source components), and a third sublayer 235C including middleware (e.g., for flexible integration with applications developed by an associated entity or third-party entity).

The vehicle computing system 200 may include an application layer 240. The application layer 240 may allow for integration with one or more software applications 245 that are downloadable or otherwise accessible by the vehicle 105. The application layer 240 may be configured, for example, using container interfaces to integrate with applications developed by a variety of different entities.

Figure 2D:
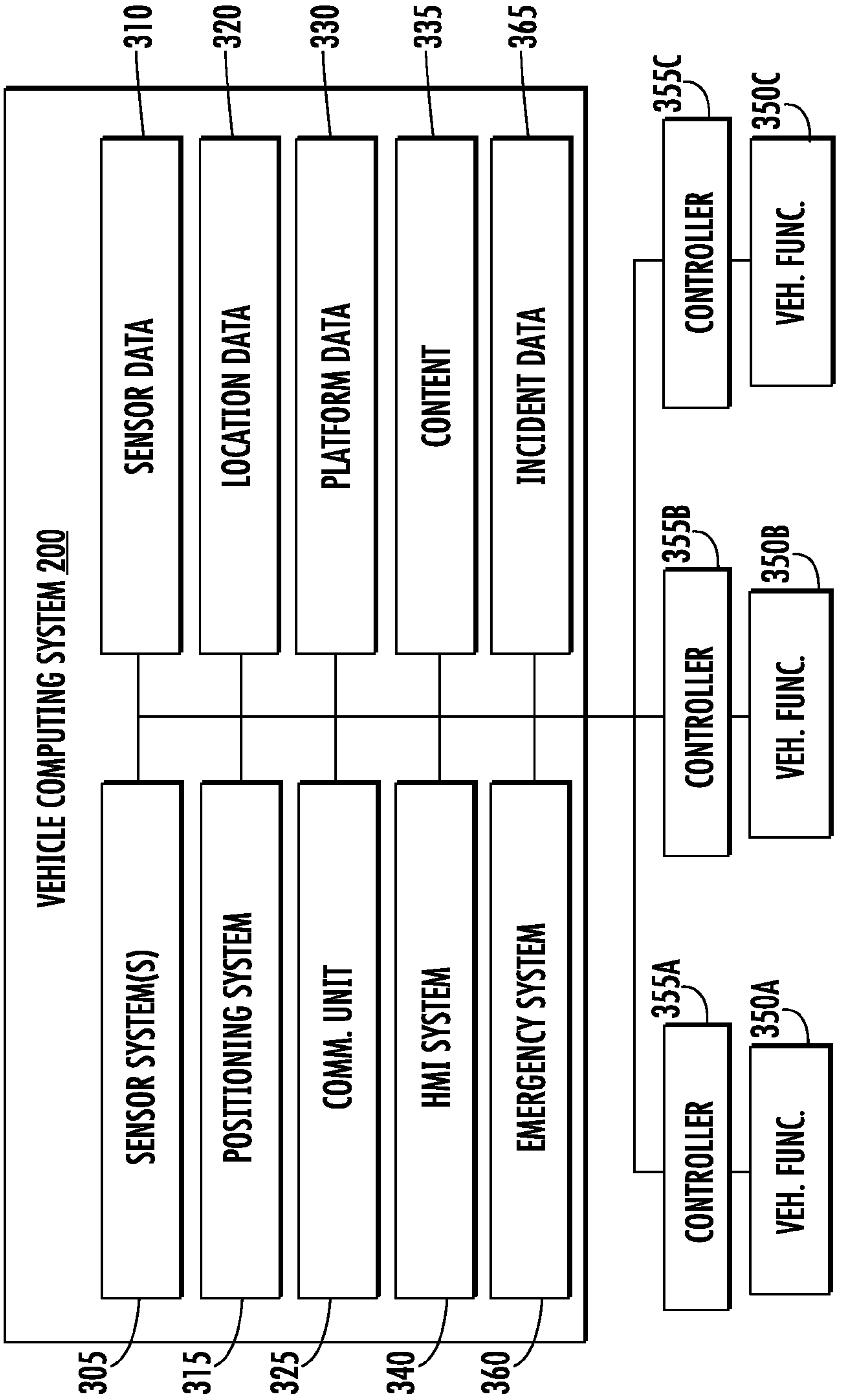

The layered operating system and the vehicle's onboard computing resources may allow the vehicle computing system 200 to collect and communicate data as well as operate the systems implemented onboard the vehicle 105. FIG. 2D illustrates a block diagram of example systems and data of the vehicle 105.

The vehicle 105 may include one or more sensor systems 305. A sensor system may include or otherwise be in communication with a sensor of the vehicle 105 and a module for processing sensor data 310 associated with the sensor configured to acquire the sensor data 310. This may include sensor data 310 associated with the surrounding environment of the vehicle 105, sensor data associated with the interior of the vehicle 105, or sensor data associated with a particular vehicle function. The sensor data 310 may be indicative of conditions observed in the interior of the vehicle, exterior of the vehicle, or in the surrounding environment. For instance, the sensor data 310 may include image data, inside/outside temperature data, weather data, data indicative of a position of a user/object within the vehicle 105, weight data, motion/gesture data, audio data, or other types of data. The sensors may include one or more: cameras (e.g., visible spectrum cameras, infrared cameras), motion sensors (e.g., accelerometers, gyroscopes), audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors. The vehicle 105 may include other sensors configured to acquire data associated with the vehicle 105. For example, the vehicle 105 may include inertial measurement units, wheel odometry devices, or other sensors.

The vehicle 105 may include a positioning system 315. The positioning system 315 may be configured to generate location data 320 (also referred to as position data) indicative of a location (also referred to as a position) of the vehicle 105. For example, the positioning system 315 may determine location by using one or more of inertial sensors (e.g., inertial measurement units, etc.), a satellite positioning system, based on an IP address, by using triangulation and/or proximity to network access points or other network components (e.g., cellular towers, Wi-Fi access points, etc.), or other suitable techniques. The positioning system 315 may determine a current location of the vehicle 105. The location may be expressed as a set of coordinates (e.g., latitude, longitude), an address, a semantic location (e.g., "at work"), etc.

In an embodiment, the positioning system 315 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 315 may localize the vehicle 105 within the environment (e.g., across multiple axes) based on the map data. For example, the positioning system 315 may process certain sensor data 310 (e.g., LIDAR data, camera data, etc.) to match it to a map of the surrounding environment to get an understanding of the vehicle's position within that environment. The determined position of the vehicle 105 may be used by various systems of the vehicle computing system 200 or another computing system (e.g., the remote computing platform 110, the third-party computing platform 125, the user device 115).

The vehicle 105 may include a communications unit 325 configured to allow the vehicle 105 (and its vehicle computing system 200) to communicate with other computing devices. The vehicle computing system 200 may use the communications unit 325 to communicate with the remote computing platform 110 or one or more other remote computing devices over a network 130 (e.g., via one or more wireless signal connections). For example, the vehicle computing system 200 may utilize the communications unit 325 to receive platform data 330 from the computing platform

110. This may include, for example, an over-the-air (OTA) software update for the operating system of the vehicle computing system 200. Additionally, or alternatively, the vehicle computing system 200 may utilize the communications unit 325 to send vehicle data to the computing platform 110. The vehicle data may include any data acquired onboard the vehicle including, for example, sensor data 310, location data 320, diagnostic data, user input data, data indicative of current software versions or currently running applications, occupancy data, data associated with the user 120 of the vehicle 105, or other types of data obtained (e.g., acquired, accessed, generated, downloaded, etc.) by the vehicle computing system 200.

In some implementations, the communications unit 325 may allow communication among one or more of the systems on-board the vehicle 105. For instance, in some implementations, the communications unit 325 can allow systems on-board the vehicle 105 to communicate with a wheel hub display device (not illustrated in FIG. 2D).

In an embodiment, the communications unit 325 may be configured to allow the vehicle 105 to communicate with or otherwise receive data from the user device 115 (shown in FIG. 1). The communications unit 325 may utilize various communication technologies such as, for example, Bluetooth low energy protocol, radio frequency signaling, or other short range or near filed communication technologies. The communications unit 325 may include any suitable components for interfacing with one or more networks, including, for example, transmitters, receivers, ports, controllers, antennas, or other suitable components that may help facilitate communication.

The vehicle 105 may include one or more human-machine interfaces (HMIs) 340. The human-machine interfaces 340 may include a display device, as described herein. The display device (e.g., including a touchscreen) may be viewable by a user of the vehicle 105 (e.g., user 120) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats). The human-machine interfaces 340 may present content 335 via a user interface for display to a user 120.

Figure 3:
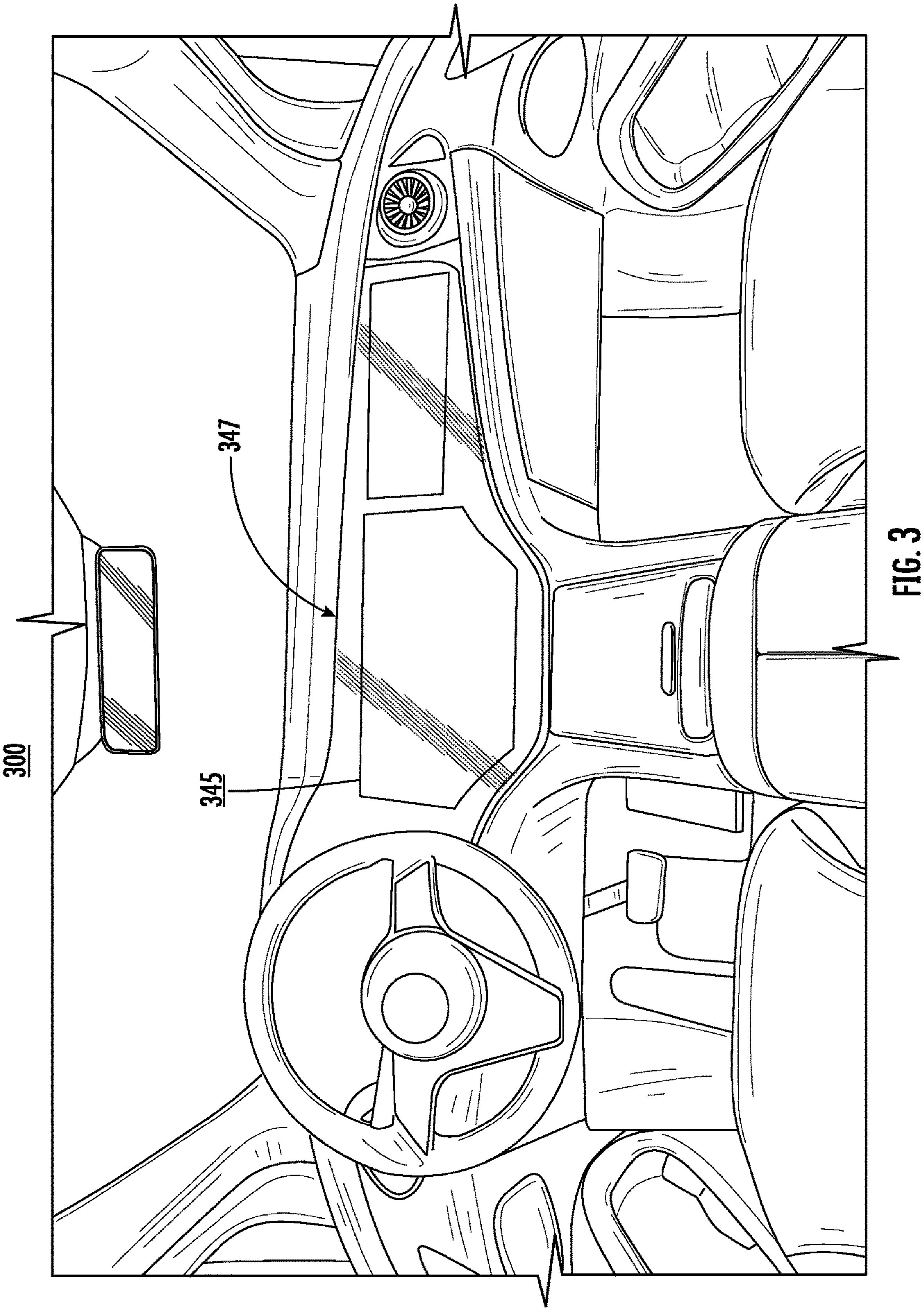
FIG. 3 illustrates an example vehicle interior with an example display according to example embodiments disclosed herein.

FIG. 3 illustrates an example vehicle interior 300 with an interior display device 345. The display device 345 may be a component of the vehicle's head unit or infotainment system. Such a component may be referred to as a display device of the infotainment system or be considered as a device for implementing an embodiment that includes the use of an infotainment system. For illustrative and example purposes, such a component may be referred to herein as a head unit display device (e.g., positioned in a front/dashboard area of the vehicle interior), a rear unit display device (e.g., positioned in the back passenger area of the vehicle interior), an infotainment head unit or rear unit, or the like. The display device 345 may be located on, form a portion of, or function as a dashboard 347 of the vehicle 105. The display device 345 may include a display screen, CRT, LCD, plasma screen, touch screen, TV, projector, tablet, and/or other suitable display components.

The display device 345 may display a variety of content to the user 120 including information about the vehicle 105, prompts for user input, etc. The display device may include a touchscreen through which the user 120 may provide user input to a user interface. For example, the display device 345 may include a user interface rendered via a touch screen that presents various content. The content may include vehicle speed, mileage, fuel level, charge range, navigation/routing information, audio selections, streaming content (e.g., video/image content), internet search results, comfort settings (e.g., temperature, humidity, seat position, seat massage), or other vehicle data. The display device 345 may render content to facilitate the receipt of user input. For instance, the user interface of the display device 345 may present one or more soft buttons with which a user 120 can interact to adjust various vehicle functions (e.g., navigation, audio/streaming content selection, temperature, seat position, seat massage, etc.). Additionally, or alternatively, the display device 345 may be associated with an audio input device (e.g., microphone) for receiving audio input from the user 120. For instance, in some embodiments, the display device 345 may provide the user 120 with controls to gather user input including a description of content to be generated for a wheel hub display device.

The vehicle 105 may include a plurality of vehicle functions 350A-C. The plurality of vehicle functions 350A-C may include a functionality that the vehicle 105 is configured to perform based on a detected input. The plurality of vehicle functions 350A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions. The user 120 may interact with the plurality of vehicle function 250A-C through user input (e.g., to an adjustable input device, UI element) that specifies a setting of a respective vehicle function among the plurality of vehicle functions 250A-C selected by the user.

Each vehicle function may include a controller (e.g., from among a plurality of controllers 355A-C) associated with that particular vehicle function among the plurality of vehicle functions 250A-C. The controller for a particular vehicle function may include I circuitry configured to operate its associated vehicle function. For example, a controller may include circuitry configured to turn the seat heating function on, to turn the seat heating function off, set a particular temperature or temperature level, etc.

In an embodiment, a controller from among the plurality of controllers 355A-C for a particular vehicle function among the plurality of vehicle functions 250A-C may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 120. For example, the user 120 may provide a voice command to activate the radio function of the vehicle 105 and request a particular station. The motion sensor may be a visual sensor (e.g., camera), infrared, RADAR, etc. configured to capture a gesture input from the user 120. For example, the user 120 may provide a hand gesture motion to adjust a temperature function of the vehicle 105 to lower the temperature of the vehicle interior.

The plurality of controllers 355A-C may be configured to send signals to another onboard system. The signals may encode data associated with a respective vehicle function. The encoded data may indicate, for example, a function setting, timing, etc. In an example, such data may be used to generate content for presentation via the display device 345 (e.g., showing a current setting). Additionally, or alternatively, such data can be included in vehicle data and transmitted to the computing platform 110.

Figure 4:
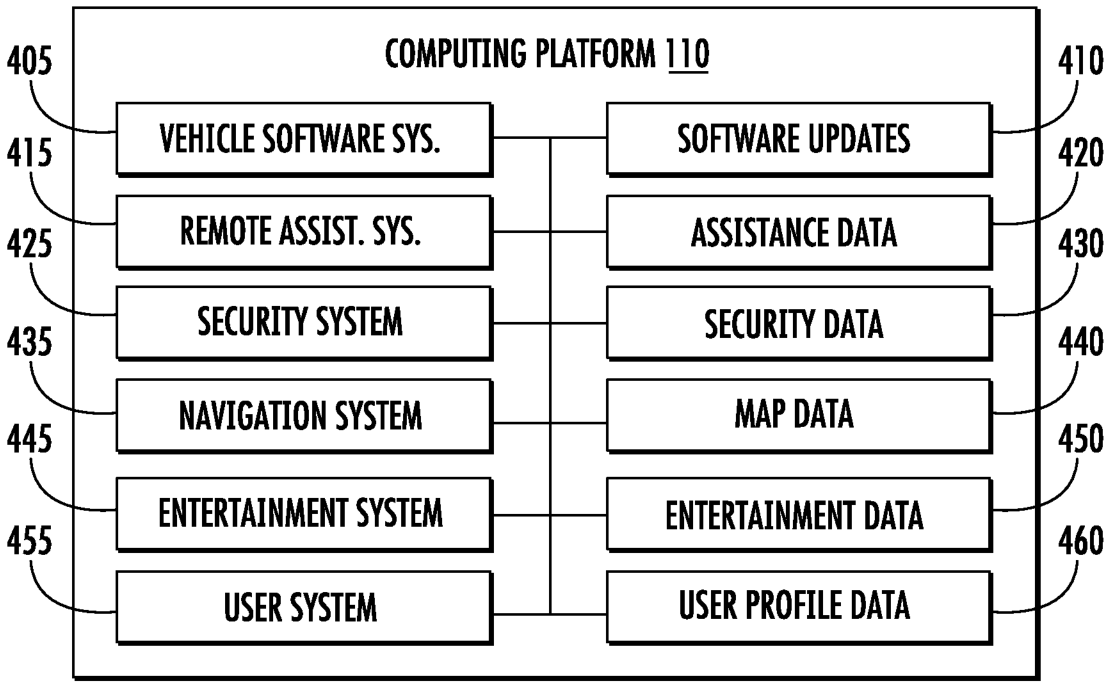
FIG. 4 illustrates a diagram of an example computing platform that is remote from a vehicle according to example embodiments disclosed herein.

FIG. 4 illustrates a diagram of computing platform 110, which is remote from a vehicle according to an embodiment hereof. As described herein, the computing platform 110 may include a cloud-based computing platform. The computing platform 110 may be implemented on one or more servers and include, or otherwise have access to, one or more databases. In an example, the computing platform 110 may be implemented using different servers based on geographic region.

In some implementations, the computing platform 110 may include a layered infrastructure that includes a plurality of layers. For instance, the computing platform 110 may include a cloud-based layer associated with functions such as security, automation, monitoring, and resource management. The computing platform 110 may include a cloud application platform layer associated with functions such as charging station functions, live traffic, vehicle functions, vehicle-sharing functions, etc. The computing platform 110 may include applications and services that are built on these layers.

The computing platform 110 may be a modular connected service platform that includes a plurality of services that are available to the vehicle 105. In an example, the computing platform 110 may include a container-based micro-services mesh platform. The services can be represented or implemented as systems within the computing platform 110.

In an example, the computing platform 110 may include a vehicle software system 405 that is configured to provide the vehicle 105 with one or more software updates 410. The vehicle software system 405 can maintain a data structure (e.g., list, table) that indicates the current software or versions thereof downloaded to a particular vehicle. The vehicle software system 405 may also maintain a data structure indicating software packages or versions that are to be downloaded by the particular vehicle. In some implementations, the vehicle software system 405 may maintain a data structure that indicates the computing hardware, charging hardware, or other hardware resources onboard a particular vehicle. These data structures can be organized by vehicle identifier (e.g., VIN) such that the computing platform 110 can perform a look-up function, based on the vehicle identifier, to determine the associated software (and updates) for a particular vehicle.

When the vehicle 105 is connected to the computing platform 110 and is available to update its software, the vehicle 105 can request a software update from the computing platform. The computing platform 110 can provide the vehicle 105 one or more software updates 410 as over-the-air software updates via a network 130.

The computing platform 110 may include a remote assistance system 415. The remote assistance system 415 may provide assistance to the vehicle 105. This can include providing information to the vehicle 105 to assist with charging (e.g., charging locations recommendations), remotely controlling the vehicle (e.g., for AV assistance), roadside assistance (e.g., for collisions, flat tires), etc. The remote assistance system 415 may obtain assistance data 420 to provide its core functions. The assistance data 420 may include information that may be helpful for the remote assistance system 415 to assist the vehicle 105. This may include information related to the vehicle's current state, an occupant's current state, the vehicle's location, the vehicle's route, charge/fuel level, incident data, etc. In some implementations, the assistance data 420 may include the vehicle data.

The remote assistance system 415 may transmit data or command signals to provide assistance to the vehicle 105. This may include providing data indicative of relevant charging locations, remote control commands to move the vehicle, connect to an emergency provider, etc.

The computing platform 110 may include a security system 425. The security system 425 can be associated with one or more security-related functions for accessing the computing platform 110 or the vehicle 105. For instance, the security system 425 can process security data 430 for identifying digital keys, data encryption, data decryption, etc. for accessing the services/systems of the computing platform 110. Additionally, or alternatively, the security system 425 can store security data 430 associated with the vehicle 105. A user 120 can request access to the vehicle 105 (e.g., via the user device 115). In the event the request includes a digital key for the vehicle 105 as indicated in the security data 430, the security system 425 can provide a signal to lock (or unlock) the vehicle 105.

The computing platform 110 may include a navigation system 435 that provides a back-end routing and navigation service for the vehicle 105. The navigation system 435 may provide map data 440 to the vehicle 105. The map data 440 may be utilized by the positioning system 315 of the vehicle 105 to determine a location of the vehicle 105, a point of interest, etc. The navigation system 435 may also provide routes to destinations requested by the vehicle 105 (e.g., via user input to the vehicle's head unit). The routes can be provided as a portion of the map data 440 or as separate routing data. Data provided by the navigation system 435 can be presented as content on the display device 345 of the vehicle 105.

The computing platform 110 may include an entertainment system 445. The entertainment system 445 may access one or more databases for entertainment data 450 for a user 120 of the vehicle 105. In some implementations, the entertainment system 445 may access entertainment data 450 from another computing system (e.g., via an API) associated with a third-party service provider of entertainment content. The entertainment data 450 may include media content such as music, videos, gaming data, etc. The vehicle 105 may output the entertainment data 450 via one or more output devices of the vehicle 105 (e.g., display device, speaker, etc.).

The computing platform 110 may include a user system 455. The user system 455 may create, store, manage, or access user profile data 460. The user profile data 460 may include a plurality of user profiles, each associated with a respective user 120. A user profile may indicate various information about a respective user 120 including the user's preferences (e.g., for music, comfort settings), frequented/past destinations, past routes, etc. The user profiles may be stored in a secure database. In some implementations, when a user 120 enters the vehicle 105, the user's key (or user device) may provide a signal with a user or key identifier to the vehicle 105. The vehicle 105 may transmit data indicative of the identifier (e.g., via its communications unit 325) to the computing platform 110. The computing platform 110 may look-up the user profile of the user 120 based on the identifier and transmit user profile data 460 to the vehicle computing system 200 of the vehicle 105. The vehicle computing system 200 may utilize the user profile data 460 to implement preferences of the user 120, present past destination locations, etc. The user profile data 460 may be updated based on information periodically provided by the vehicle 105. In some implementations, the user profile data 460 may be provided to the user device 115.

Figure 5:
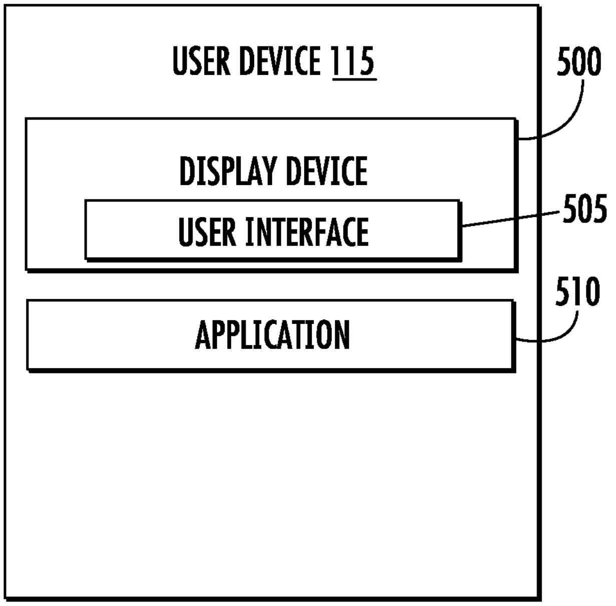
FIG. 5 illustrates a diagram of an example user device according to example embodiments disclosed herein.

FIG. 5 illustrates a diagram of example components of user device 115 according to an embodiment hereof. The user device 115 may include a display device 500 configured to render content via a user interface 505 for presentation to a user 120. The display device 500 may include a display screen, CRT, LCD, plasma screen, touch screen, TV, projector, tablet, or other suitable display components. The user device 115 may include a software application 510 that is downloaded and runs on the user device 115. In some implementations, the software application 510 may be associated with the vehicle 105 or an entity associated with the vehicle 105 (e.g., manufacturer, retailer, maintenance provider). In an example, the software application 510 may enable the user device 115 to communicate with the computing platform 110 and the services thereof.

Figure 8:
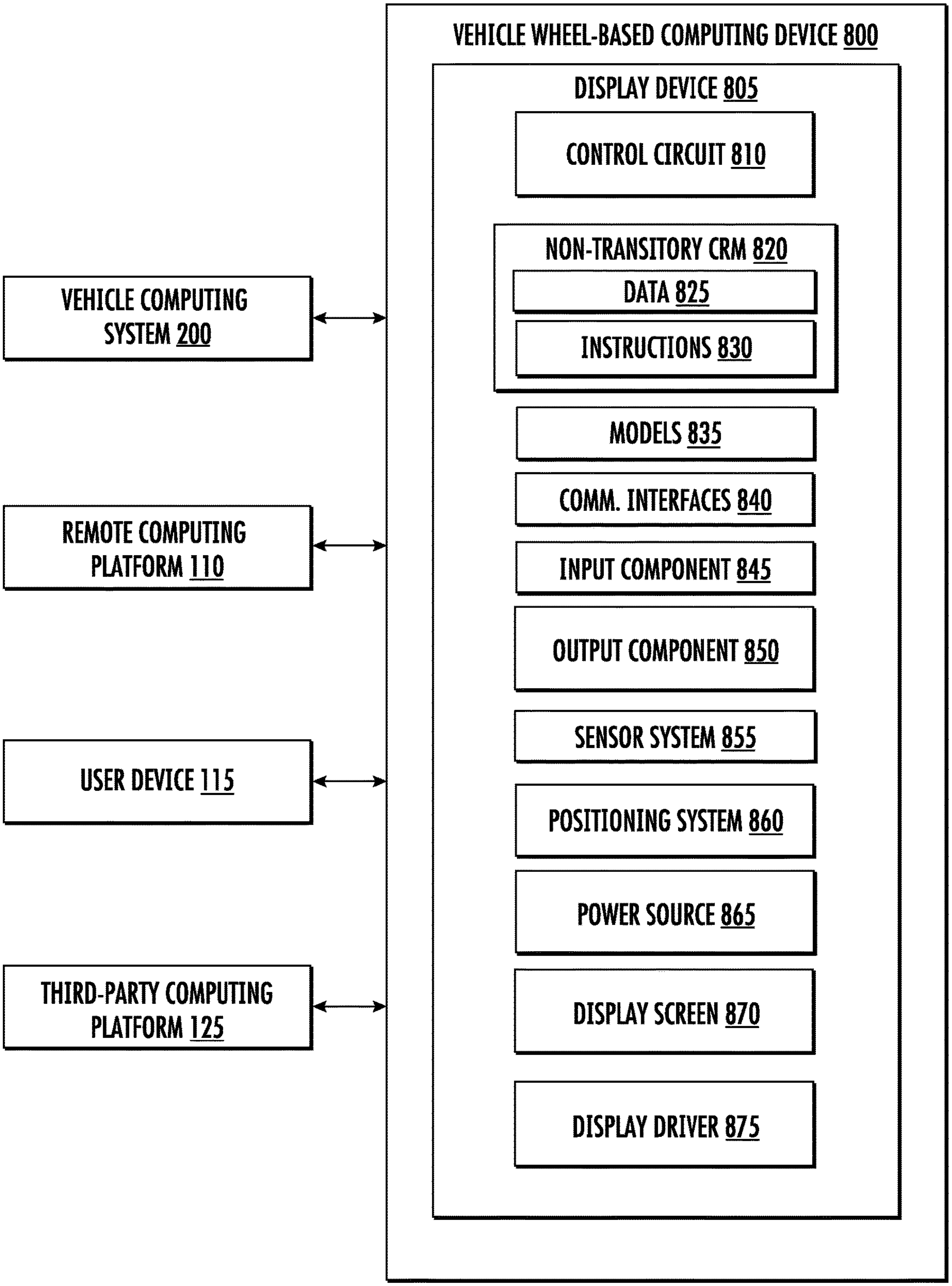
FIG. 8 illustrates a block diagram of a vehicle wheel-based computing device, according to example embodiments disclosed herein.

The technology of the disclosure allows the vehicle computing system 200 to extend its computing capabilities by generating content for a wheel hub display device (e.g., vehicle wheel-based computing device 800 including display device 805 in FIG. 8). In particular, the vehicle computing system 200 can utilize one or more models, including a machine-learned generative model, to generate content for display on the vehicle wheel-based computing device 800 in response to a user input through, for example, user device 115, display device 345, or other suitable input device.

Figure 6A:
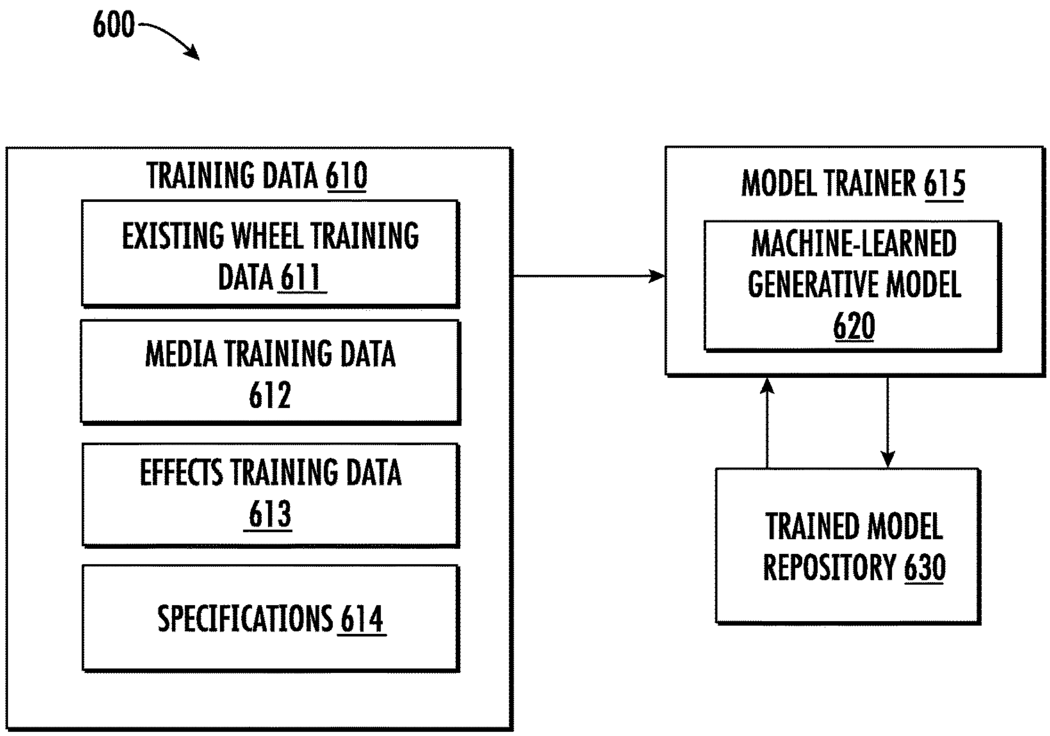
FIGS. 6A-6B illustrate a diagram of example systems for generative modeling of wheel hub display device content according to example embodiments disclosed herein.

FIG. 6A illustrates a diagram of an example system 600 for model training for generative modeling of wheel hub display device content according to an embodiment hereof. The system 600 includes a model trainer 615 configured to train a machine-learned generative model 620. The model trainer 615 can access a trained model repository 630 to obtain an initial (e.g., pre-trained) machine-learned generative model 620 and/or to store the machine-learned generative model 620 after training. In some implementations, the model trainer 615 can access a pre-trained generative model 620 that is pre-trained for general generative tasks and train the model 620 using the training data 610 to further refine the model 620 for predictions over wheel-based features, such as for generating content for vehicle wheel-based computing device 800 including display device 805. The generative model 620 can be any suitable model such as any suitable pre-trained model. As one example, the model 620 may be or may include a generative adversarial network (GAN). As another example, the model 620 may be or may include a stable diffusion model. The stable diffusion model provides for the use of checkpoints and pre-training data, which can contribute to more accurate predictions in some instances. While reference is made to a generative adversarial network (GAN) and a stable diffusion model, these types of models are not intended to be limiting as other types of models (other generative models) may be utilized to implement the technology of the disclosure.

The model trainer 615 can obtain training data 610. The training data 610 can include any suitable data for training the generative model 620. In particular, the training data 610 can include data indicating a plurality of wheel-based features, such as data indicating wheel rims, hubs, hub caps, spokes, tires, and so on. As examples, the training data 610 can include training images, training models (e.g., 3D models), training videos, training graphics, training icons, and other suitable training data indicative of wheel-based features. The training data 610 can include two-dimensional image content and/or three-dimensional image content. For instance, in some implementations, the training data 610 can be organized into collections or bins. The collections or bins may be indexed by type (e.g., 2D vs. 3D), content type, subject area, etc. In some implementations, the training data 610 can be gathered from open-source data publicly available on the Internet or other data store. Additionally or alternatively, the training data 610 can include proprietary data.

For instance, the training data 610 can include existing wheel training data 611. The existing wheel training data 611 can indicate a plurality of historical or otherwise existing wheels and/or portions thereof, such as rims, spokes, hubs, hub caps, tires, etc. For example, in some implementations, the existing wheel training data 611 can include images, videos, etc. of historical wheel rims labeled with descriptors of wheel rims, such as, for example, an image of a 1950's convertible wheel rim labeled with tags or descriptors such as "1950s," "convertible," "rim," tags describing the make, model, year, and so on to facilitate training the generative model 620. In some implementations, the labels may be automatically generated.

In some implementations, the training data 610 can be used to train styles for the generative model 620. For instance, styles can be generated using keywords, annotated training data, etc. for a specific set of training data. As one example, if the generative model 620 is trained on a specific dataset of 1930's car wheels, the style of that training data can be provided to the generative model 620 as "1930's car wheels" or similar. If a user later wishes to generate content based on that style (e.g., by providing a prompt such as "create wheels that are styled circa 1930's"), the generative model 620 can understand that the user wishes to generate wheels with that style. The styles can also be combined (e.g., by provided a prompt such as "generate a 1930's car wheels with 'Happy Days' characters").

Additionally, or alternatively, the training data 610 can include media training data 612. The media training data 612 can include data indicating media such as, for example, characters (e.g., cartoon characters), actors, brands or logos, objects, and other suitable media. The media training data 612 can be labeled with tags or descriptors describing the character, actor, etc. In some implementations, operators of the model trainer 615 can license, purchase, or otherwise access databases provided by owners of the media to obtain the media training data 612.

Additionally, or alternatively, the training data 610 can include effects training data 613. The effects training data 613 can indicate a plurality of effects, such as physical effects. As examples, the effects training data 613 can indicate effects such as fire, bubbles, light, colors, water, plants, flags, and other suitable physical effects. The effects training data 613 can be labeled with tags or descriptors indicating the type of effect. Iconic styles such as "gothic," "bubbly," "modern," "baroque," "futuristic," and so on can also be included in effects training data 613.

Additionally, or alternatively, the training data 610 can include specifications 614. The specifications 614 can describe aspects of wheels and wheel rims, such as, for example, a size, a shape, an associated vehicle model, a year, or a material associated with a given wheel or wheel rim. For instance, in some implementations, the generated content is configured for presentation via the display device positioned on the wheel such that the generated content is formatted and fitted for the display device positioned on the wheel. The specifications 614 can facilitate formatting and fitting the generated content for presentation via the display device.

In some implementations, after training the model 620 using at least some of the training data 610, the model trainer 615 can store a snapshot or checkpoint based on the training data 610 in the model repository 630. In this way, the model 620 can be trained progressively to evaluate performance over continued training. Once the model 620 is trained to a satisfactory degree, the weights, biases, and other suitable hyperparameters of the model 620 can be stored in the model repository 630.

Although the training data 610 is illustrated as being only for training, it should be understood that the training data can be structured into a training set, validation set, and/or test set in accordance with training regimes. For example, the training data 610 may be partitioned into a training set (e.g., about 80% of the training data 610 or another suitable percentage) for training and adjusting parameters of the generative model 620, a validation set (e.g., about 10% of the training data 610 or another suitable percentage) for fine-tuning hyperparameters and monitoring the model 620's performance during training, and a test set (e.g., about 10% of the training data 610 or another suitable percentage) for evaluating the final performance of the model 620. Furthermore, in some implementations, each dataset can be included in a separate directory with further subdirectories for images and/or masks. This structure can facilitate access and loading of the data during training and evaluation. Any additional metadata associated with the datasets can be stored in a separate file, such as a CSV or JSON file. In some implementations, data augmentation techniques such as random cropping, rotation, scaling, flipping, etc. can increase the diversity of the training data 610.

Figure 6B:
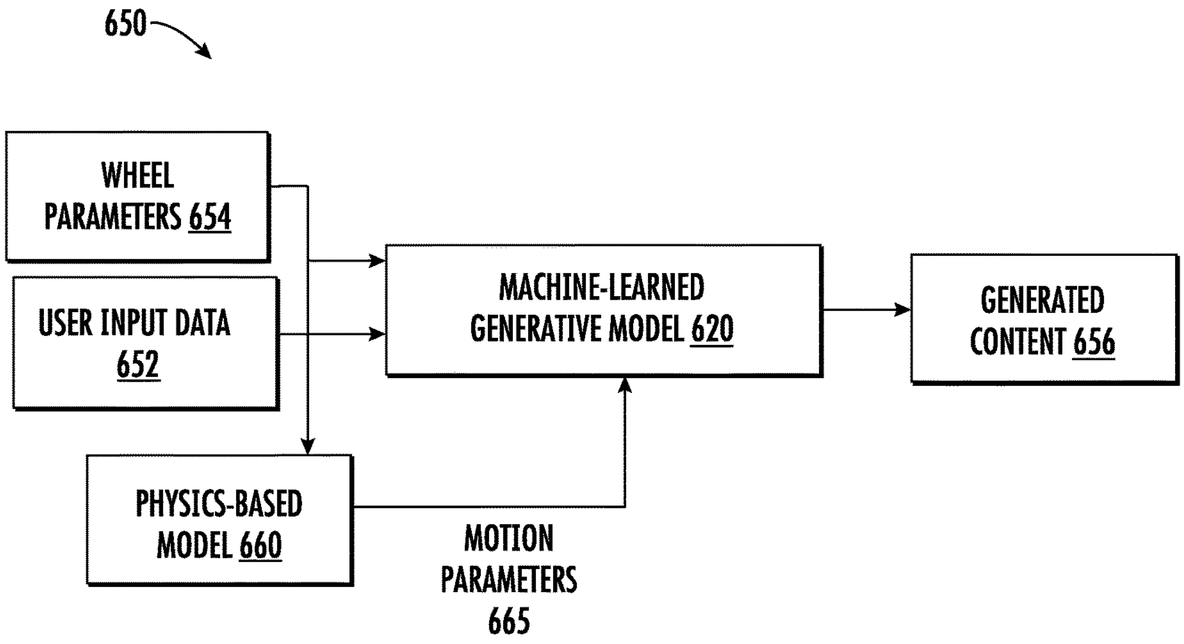

FIG. 6B illustrates a diagram of an example system 650 for generative modeling of wheel hub display device content according to an embodiment hereof. The system 650 can employ the generative model 620 of FIG. 6A to produce generated content 656 for display on a wheel hub display device (e.g., vehicle wheel-based computing device 800 including display device 805). In particular, the system 650 can obtain user input data 652 from a user. The user input data 652 can be a natural language input provided from a user (e.g., provided via text or speech input). The user input data 652 can include a description of content to be presented via the vehicle wheel-based computing device 800 including display device 805 at least partially attached to a wheel of a vehicle. As an example, the user input data 652 can be obtained from an application on a user device, a vehicle infotainment system, or other suitable computing device. In addition to the user input data 652, in some implementations, the generative model 620 can receive wheel parameters 654 describing parameters of the wheel on which the content is to be displayed, such as display type (e.g., 3D, 2D, etc.), display size, wheel type, wheel size, and so on. Based on the user input data 652 and/or the wheel parameters 654, the generative model 620 can produce the generated content 656 for display on the vehicle wheel-based computing device 800 including display device 805. In some implementations, for example, the generated content 656 can include an image augmented with an icon or a graphic. The image can be augmented such that the icon/graphic is overlaid, incorporated into, or replaces a portion of the image.

Furthermore, in some implementations, the system 650 can employ a physics-based model 660 to produce generated content 656 that accounts for motion of the wheel on which the generated content 656 is displayed. For instance, the physics-based model 660 can produce motion parameters 665 that model the motion of the vehicle and/or the wheel. As examples, the motion parameters 665 can include a motion of the wheel, a speed of the vehicle, an acceleration of the vehicle, a heading of the wheel or of the vehicle, an angular velocity of the wheel, revolutions per minute of the wheel, and the like. To generate the content 656, the system 650 can input the motion parameters 665 into the machine-learned generative model 620. The machine-learned generative model 620 can then produce output (e.g., generated content 656) that is based on the motion parameters 665. As an example, the output can include an animation based on the generated content 656. For instance, the animation can include animated motion of an element in the generated content 656 based on at least one of the motion parameters 665 (e.g., a motion of the wheel, a speed of the vehicle, an acceleration of the vehicle, or a heading of the wheel or of the vehicle, an angular velocity of the wheel, revolutions per minute of the wheel, and the like). Additionally, or alternatively, the motion parameters 665 from the physics-based model 660 may be utilized for post-processing the generated content 656, in addition to, or rather than, being used as inputs to the machine-learned generated model 620, as further described herein.

In some implementations, the user input data 652 can be indicative of a physics event associated with the vehicle. The presentation of the data indicative of the generated content 656 via the display device 805 at least partially attached to the wheel can then be based on the physics event. As one example, the user may describe a flame effect that bends backwards when accelerating as if affected by wind from acceleration. To facilitate this effect, the physics-based model 660 can model motion parameters 665 descriptive of acceleration such that the generative model 620 can produce generated content 656 that follows this physics effect. As another example, in some implementations, the user may describe content that flashes red when the vehicle is braking or decelerating, so the physics-based model 660 can produce motion parameters 665 that model vehicle braking or deceleration for the generative model 620.

Furthermore, in some implementations, the user input data 652 can be indicative of a timing of display for the generated content 656. The generated content 656 can be presented via the display device 805 based on the timing of display indicated by the user input data 652. For example, a user may describe a certain generated content 656 that is only displayed at night. The vehicle computing system 200 can thus only display the generated content 656 when it is night. For instance, the timing of display can be compared to current time characteristics to determine whether to display the generated content 656.

In some implementations, the generated content can be post-processed, after output from the machine-learned generative model 620. For example, in some implementations, a post-processing module can be configured to process the generated content 656 output from the generative model (e.g., one or more generated image frames) and generate an animation based on the motion parameters 665. Thus, the physics-based model 660 (and the motion parameters 665) can be used for post-processing the generated content 656 to create the data that is provided for presentation via the display device 805 at least partially attached to the wheel of the vehicle. Additionally, or alternatively, the post-processing module could generate such data based on the timing of display or the physics event indicated by the user input data 652.

By way of example, the machine-learned generative model 620 can generate image frame(s) of a hamster wheel with a superhero inside the hamster wheel. The post-processing module can generate an animation that shows the superhero running and the hamster wheel spinning at the same rate that the tires of the vehicle are rotating. The post-processing module may configure the animation to stop when the vehicle stops and, while the vehicle is stopped, have the superhero stand-still, holding a stop sign. The animation may be configured to continue the display of the superhero running (and the hamster wheel spinning), when the vehicle resumes motion. The post-processing module may provide data indicating the generated content (e.g., the animation) for presentation via the display device 805 at least partially attached to the wheel of the vehicle.

Figure 7:
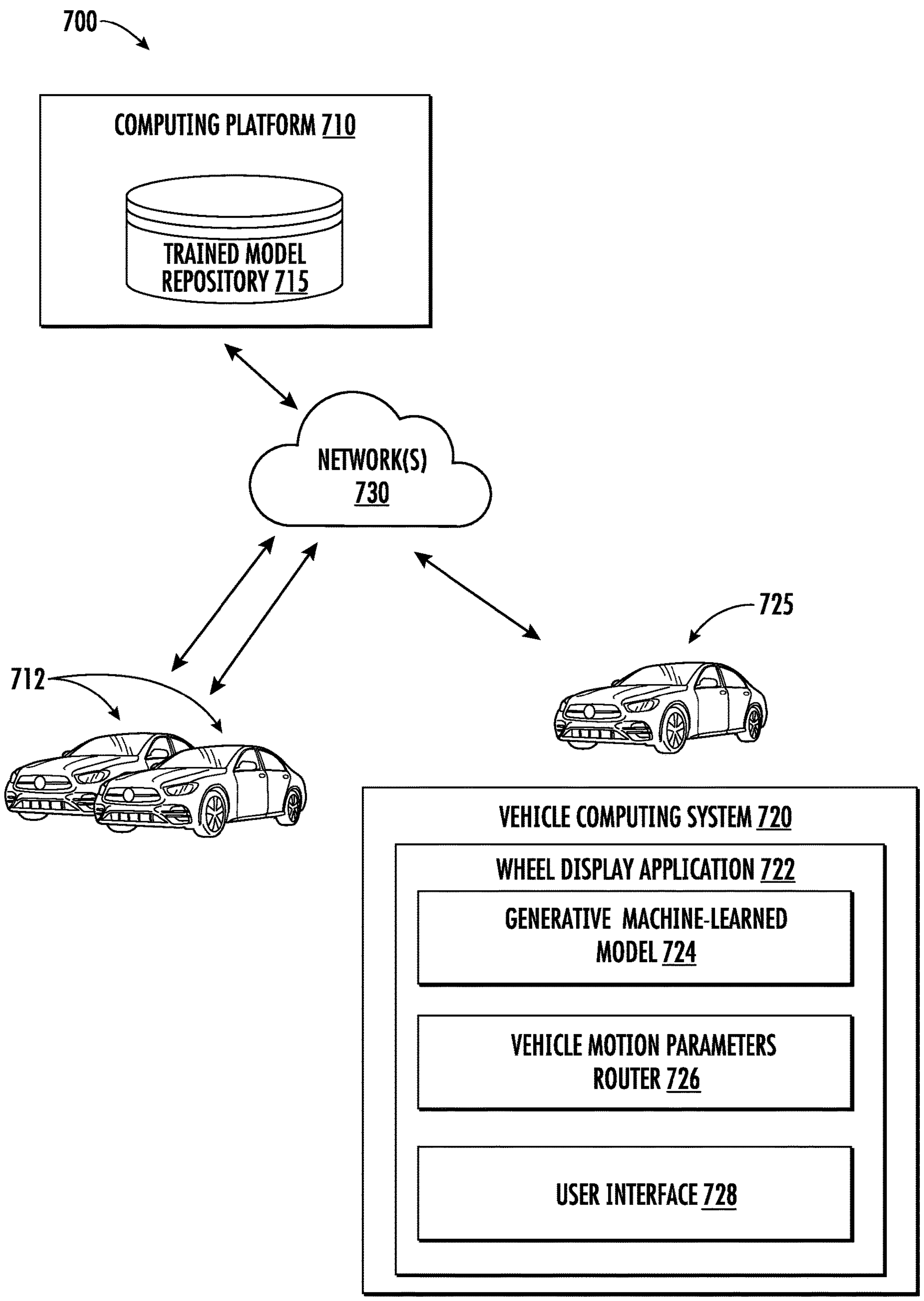
FIG. 7 illustrates a diagram of an example computing ecosystem for generative modeling of wheel hub display device content according to example embodiments disclosed herein.

FIG. 7 illustrates a diagram of an example computing ecosystem 700 for generative modeling of wheel hub display device content according to an embodiment hereof. A computing platform 710 can include a trained model repository 715. The trained model repository 715 can be configured to store one or more trained machine-learned models, such as machine-learned generative models. For instance, the trained model repository 715 can store a master copy of hyperparameters, such as weights, biases, etc., of machine-learned models. As one example, the trained model repository 715 can be the trained model repository 630 of FIG. 6A.

The computing platform 710 can communicate over one or more networks 730 to provide external computing systems with access to the trained model repository 715. For instance, the computing platform 710 can distribute one or more machine-learned models to one or more vehicles 712. In particular, a vehicle 725 can include a vehicle computing system 720. The vehicle computing system 720 can be, for example, the vehicle computing system 200 of FIG. 1. The vehicle computing system 720 can be configured to perform various computing functions for the vehicle 725, such as, for example, generative modeling of wheel hub display device content. In particular, the vehicle computing system 720 can execute or otherwise host a wheel display application 722 configured to control one or more wheel hub display devices (e.g., vehicle wheel-based computing device 800 including display device 805 in FIG. 8) on vehicle 725. For example, each wheel of the vehicle 725 may include a vehicle wheel-based computing device 800 including display device 805. The wheel display application 722 can download or otherwise obtain a machine-learned generative model 724 from the computing platform 710 (e.g., the trained model repository 715).

In addition, the wheel display application can include a vehicle motion parameters router 726. The vehicle motion parameters router 726 can obtain or provide data indicative of motion parameters of the vehicle 725 to the wheel display application 722 such that the wheel display application 722 can utilize the motion parameters at the generative machine-learned model 724. As examples, the vehicle motion parameters router 726 can communicate with sensors onboard the vehicle 725 (e.g., with sensor systems 305) or with other components of vehicle computing system 720 (e.g., with communication unit 325) to obtain the vehicle motion parameters. Vehicle motion parameters may also be provided from the vehicle wheel-based computing device 800 to the vehicle computing system 720 including vehicle motion parameters router 726.

In addition, the wheel display application can include a user interface 728. The user interface 728 can provide an operator of vehicle 725 with controls for generative modeling of wheel hub display device content. Example user interfaces 728 are discussed further with respect to FIGS. 11 and 12.

The technology of the disclosure allows the vehicle computing system 200 to extend its computing capabilities by generating content for a vehicle wheel-based computing device which includes a wheel hub display device. In particular, the vehicle computing system 200 can utilize one or more models, including a machine-learned generative model, to generate content for display on a display screen of the wheel hub display device in response to a user input through, for example, user device 115, display device 345, or another suitable input device.

Figure 10A:
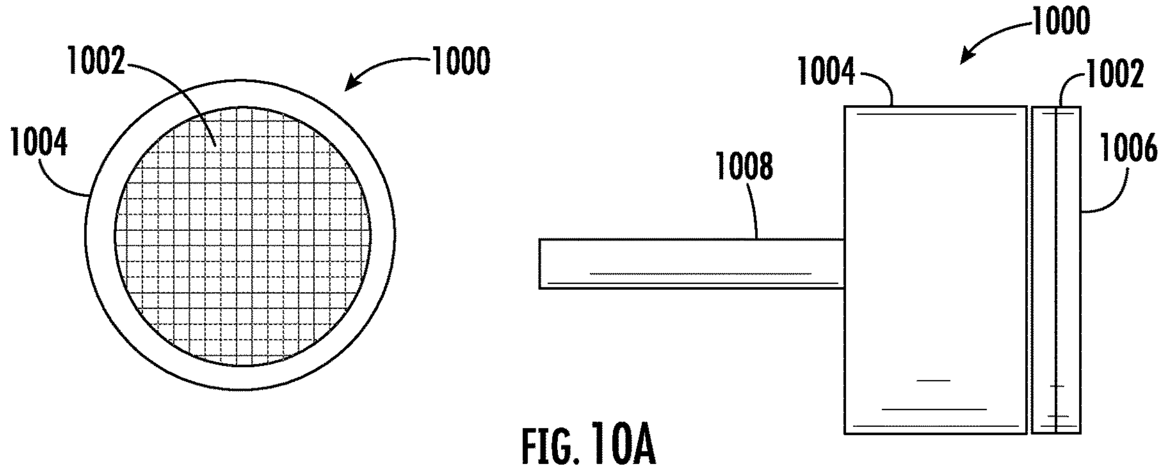
FIGS. 10A-10D illustrate example wheel hub display devices according to example embodiments disclosed herein.
Figure 10B:
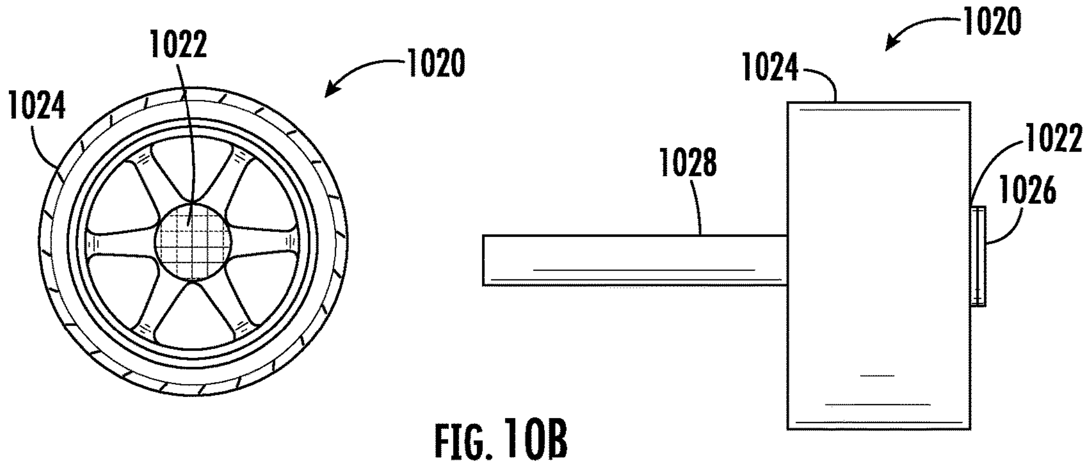

FIG. 8 illustrates a block diagram of a vehicle wheel-based computing device, according to example embodiments disclosed herein. In FIG. 8, a vehicle wheel-based computing device 800 includes a display device 805. For example, the display device 805 can be circular-shaped as shown in FIGS. 10A and 10B. For example, the display device 805 can cover a rim of the wheel as shown in FIG. 10A or a hub cap as shown in FIG. 10B. In other implementations, the display device 805 can cover the whole wheel except for the tire, cover the wheel except for the tire and rim, cover the hub, cover just a center cap of the hub, etc. For example, the display device 805 may be integrated into the wheel or be configured to be detachable from the wheel and attachable to the wheel.

For example, the display device 805 may include a control circuit 810 and a non-transitory computer-readable medium 820, also referred to herein as memory. In an embodiment, the control circuit 810 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), a system on chip, or any other control circuit. Although FIG. 8 illustrates that control circuit 810 is part of display device 805, in some implementations the control circuit 810 may be separately provided from the display device 805 and instead may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 810 may be programmed by one or more computer-readable or computer-executable instructions stored on the non-transitory computer-readable medium 820.

In an embodiment, the non-transitory computer-readable medium 820 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 820 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 820 may store information that may be accessed by the control circuit 810. For instance, the non-transitory computer-readable medium 820 (e.g., memory devices) may store data 825 that may be obtained, received, accessed, written, manipulated, created, and/or stored. The data 825 may include, for instance, any of the data or information described herein. In some implementations, the vehicle wheel-based computing device 800 may obtain data from one or more memories that are remote from the vehicle wheel-based computing device 800.

The non-transitory computer-readable medium 820 may also store computer-readable instructions 830 that may be executed by the control circuit 810. The instructions 830 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 810 to perform one or more functional tasks. The modules and computer-readable/executable instructions may be described as performing various operations or tasks when the control circuit 810 or other hardware component is executing the modules or computer-readable instructions.

The instructions 830 may be executed in logically and/or virtually separate threads on the control circuit 810. For example, the non-transitory computer-readable medium 820 may store instructions 830 that when executed by the control circuit 810 cause the control circuit 810 to perform any of the operations, methods and/or processes described herein. In some cases, the non-transitory computer-readable medium 820 may store computer-executable instructions or computer-readable instructions, such as instructions to perform at least a portion of the methods of FIGS. 13 and 14.

In an embodiment, the vehicle wheel-based computing device 800 may store or include one or more machine-learned models 835. For example, the machine-learned models 835 may be or may otherwise include various machine-learned models, including machine-learned generative models (e.g., the machine-learned generative model 620 of FIGS. 6A-6B). In an embodiment, the machine-learned models 835 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models). As another example, the machine-learned models 835 can include generative models, such as stable diffusion models, generative adversarial networks (GAN), GPT models, and other suitable models.

In some embodiments, vehicle computing system 200, remote computing platform 110, third-party computing platform 125, and the like may be configured to render content to be provided for presentation on the display screen 870 of the display device 805. For example, the content may be generated at least partially via one or more machine-learned models. The one or more machine-learned models may include one or more machine-learned generative models trained based on training data indicative of a plurality of wheel-based features (e.g., sensor data or camera data indicating an RPM of the wheel, a temperature of the wheel, etc.).

In some embodiments, display device 805 may be configured to render content to be provided for presentation on the display screen 870 of the display device 805. For example, the content may be generated at least partially via one or more machine-learned models. The one or more machine-learned models may include one or more machine-learned generative models trained based on training data indicative of a plurality of wheel-based features (e.g., sensor data or camera data indicating an RPM of the wheel, a temperature of the wheel, etc.).

The models 835 may be used to produce generated content for the vehicle wheel-based computing device 800. For example, a user may provide an input or prompt (e.g., user input data 652) via an application on user device 115 or via a vehicle infotainment system (e.g., part of vehicle computing system 200) or some other suitable computing device. The user input can then be provided as an input to the machine-learned models 835 and, in response to the user input which is descriptive of content to be displayed or presented on the display screen 870 of the display device 805, produce generated content to be displayed on the display screen 870 of the display device 805 based on the description provided by the user input.

In some implementations, the one or more machine-learned models 835 may be received from the vehicle computing system 200, remote computing platform 110, user device 115, third-party computing platform 125, non-transitory computer-readable medium 820, or elsewhere. In an embodiment, the vehicle wheel-based computing device 800 may implement multiple parallel instances of a single model.

The display device 805 may include one or more communication interfaces 840. The one or more communication interfaces 840 may be used to communicate with one or more other systems. The one or more communication interfaces 840 may include any circuits, components, software, etc. for communicating via one or more networks. In some implementations, the one or more communication interfaces 840 may include for example, one or more of a communications controller, receiver, transceiver, transmitter, port, conductors, software and/or hardware for communicating data/information. For example, the display device 805 may be configured to communicate via WIFI, BLUETOOTH, or other wireless methods. For example, the display device 805 may be configured to transmit data (e.g., motion data associated with the vehicle wheel-based computing device 800) to the vehicle computing system 200, remote computing platform 110, user device, 120, and the like via the one or more communication interfaces 840. For example, the display device 805 may be configured to receive data (e.g., content to be displayed on the display screen 870 of the display device 805) from the vehicle computing system 200, remote computing platform 110, user device, 120, and the like via the one or more communication interfaces 840.

The display device 805 may also include one or more user input components 845 that receives user input. For example, the user input component 845 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional or electronic keyboard, cursor-device, joystick, or other devices by which a user may provide user input.

The display device 805 may include one or more output components 850. The output components 850 may include hardware and/or software for audibly or visually producing content. For instance, the output components 850 may include one or more speakers.

The display device 805 may include one or more sensor systems 855. The one or more sensor systems may include one or more sensors to obtain sensor data. For example, the sensor data may be associated with the surrounding environment of the vehicle, sensor data associated with the wheel of the vehicle, sensor data associated with the tire, sensor data associated with a particular vehicle function, etc. For example, the sensor data may include image data, temperature data, weather data, motion data, pressure data, elevation data, audio data, or other types of data. The sensors may include one or more: cameras (e.g., visible spectrum cameras, infrared cameras), motion sensors (e.g., accelerometers, gyroscopes), audio sensors (e.g., microphones), temperature sensors, humidity sensors, altitude sensors, pressure sensors, Light Detection and Ranging (LIDAR) systems, Radio Detection and Ranging (RADAR) systems, or other types of sensors. The display device 805 may include other sensors configured to acquire data associated with the vehicle or with the display device 805 itself.

For example, display device 805 may be physically connected to a wheel assembly (e.g., a wheel, rim, tire assembly, etc.) of the vehicle. As such the motion of the tire can also correspond to the motion of the display device 805. For example, the display device 805 may include one or more motion sensors (e.g., an accelerometer, gyroscope, etc.) to obtain vehicle data (sensor data). The vehicle data may include accelerometer data associated with the display device, gyroscope data associated with the display device, wheel torque data, or brake torque data, for example. The one or more motion sensors may be embedded in the display device 805. For example, the display device 805 can be configured to transmit real-time physical motion of the display device 805 (and by direct association the corresponding wheel to which it is attached) to the vehicle computing system 200. For example, the control circuit 810 may be configured to obtain motion data associated with the display device 805 based on one or more sensors from the sensor system 855 which are integrated with the display device 805. The control circuit 810 may be configured to transmit the motion data to an infotainment system of the vehicle to provide for display within the vehicle a representation of the display screen 870 of the display device 805 based on the motion data.

The wheel assembly to which the display device 805 is connected may also include its own sensors (e.g., pressure sensors, temperature sensors, cameras, etc.) that can transmit sensor data (e.g., tire pressure, temperature, etc.) to the display device 805 and/or vehicle computing system 200. For example, any sensor data captured by the sensors of the display device 805 may be transmitted to vehicle computing system 200. The display device 805 may be configured to receive sensor data from other components and sensors of the vehicle. For example, the display device 805 may be configured to receive brake data (e.g., relating to brake torque) from a brake sensor. For example, the brake data may be used to interact with a generative model to affect how content is displayed on the display screen 870. As an example, when the brake data received by the vehicle wheel-based computing device 800 (display device 805) via a brake sensor indicates a braking action of the vehicle, a particular character may be displayed on the display screen 870 (e.g., a red rabbit). When the brake data received by the vehicle wheel-based computing device 800 (display device 805) via a brake sensor indicates the braking action of the vehicle increases in intensity, the color of the particular character may also be intensified (e.g., the red color of the rabbit becomes brighter).

For example, the vehicle wheel-based computing device 800 (display device 805) may be configured to receive or obtain sensor data from other on-board electronics of the vehicle via the vehicle computing system 200 including throttle information, engine RPM, wheel torque, RPM information associated with the wheel, etc.

For example, sensor data obtained by the vehicle wheel-based computing device 800 (display device 805) may be provided for display at a display device disposed in the interior of the vehicle to a user of the vehicle. In some implementations, the user can view the rotation of the vehicle wheel-based computing device 800 (display device 805) in real-time based on the sensor data (e.g., accelerometer data, gyroscope data, etc.). For example, the vehicle wheel-based computing device 800 (display device 805) may be visualized on the display device in the interior of the vehicle as a wheel rotating along an axis with directional magnitude vectors (e.g., representing an x-axis, y-axis, z-axis) over time t, to enable a user to view the wheel's motion as yaw, pitch, roll, etc.

For example, the sensor system 855 of the vehicle wheel-based computing device 800 (display device 805) may include one or more cameras integrated with the vehicle wheel-based computing device 800 (display device 805) to capture images of the environment of the vehicle. The display device 805 may be configured to obtain images captured by the one or more cameras integrated with the vehicle wheel-based computing device 800 (display device 805), or by other camera(s) disposed separately from the vehicle wheel-based computing device 800 (display device 805). In some implementations, the display device 805 may be configured to provide for presentation on the display screen 870 of the display device 805 an augmented-reality image which includes one or more virtual objects which are overlaid on an image captured by the one or more cameras (e.g., a real-world image of the vehicle environment, of the wheel itself, etc.).

In some implementations, the cameras disposed in the display device 805 (and/or cameras disposed in the wheel assembly) may be configured to identify a distance to a curb or other objects which may be in the path of the display device 805 (e.g., when parking). In some implementations, the cameras disposed in the display device 805 (and/or cameras disposed in the wheel assembly) may be configured to capture content which is provided as an input to a machine-learned model (e.g., a generative model) of the vehicle computing system 200 or the vehicle wheel-based computing device 800 to generate content for presentation on the display screen 870 of the display device 805. In some implementations, the cameras disposed in the display device 805 (and/or cameras disposed in the wheel assembly) may be configured to capture content which is provided as input data to the vehicle computing system 200 or the vehicle wheel-based computing device 800 which can cause the display screen 870 of the display device 805 to display the same content captured by the cameras (e.g., a mirror or reflection effect).

The vehicle wheel-based computing device 800 (display device 805) may include a positioning system 860. The positioning system 860 may be configured to generate location data (also referred to as position data) indicative of a location (also referred to as a position) of the display device 805. For example, the positioning system 860 may determine location by using one or more of inertial sensors (e.g., inertial measurement units, etc.), a satellite positioning system, based on an IP address, by using triangulation and/or proximity to network access points or other network components (e.g., cellular towers, Wi-Fi access points, etc.), or other suitable techniques. The positioning system 860 may determine a current location of the display device 805, and by direct association of the vehicle when the vehicle wheel-based computing device 800 (display device 805) is connected to the wheel assembly. The location may be expressed as a set of coordinates (e.g., latitude, longitude), an address, a semantic location (e.g., "at work"), etc.

In an embodiment, the positioning system 860 may be configured to localize the vehicle wheel-based computing device 800 (display device 805) within its environment. For example, the vehicle wheel-based computing device 800 (display device 805) may access map data that provides detailed information about the surrounding environment of the vehicle. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 860 may localize the vehicle wheel-based computing device 800 (display device 805) within the environment (e.g., across multiple axes) based on the map data. For example, the positioning system 860 may process certain sensor data (e.g., LIDAR data, camera data, etc.) to match it to a map of the surrounding environment to get an understanding of the position of the vehicle wheel-based computing device 800 (display device 805) within that environment. The determined position of the vehicle wheel-based computing device 800 (display device 805) may be used by various systems or components of the vehicle wheel-based computing device 800 (display device 805), the vehicle computing system 200, or another computing system (e.g., the remote computing platform 110, the third-party computing platform 125, the user device 115, etc.).

The display device 805 may include one or more power sources 865 which provide power to the display device 805. For example, the one or more power sources 865 may include an internal battery (e.g., an internal rechargeable battery), a solar charger, a USB port to charge the display device 805, a wireless charging system (e.g., a wireless battery charger receiver), and the like.

Figure 9:
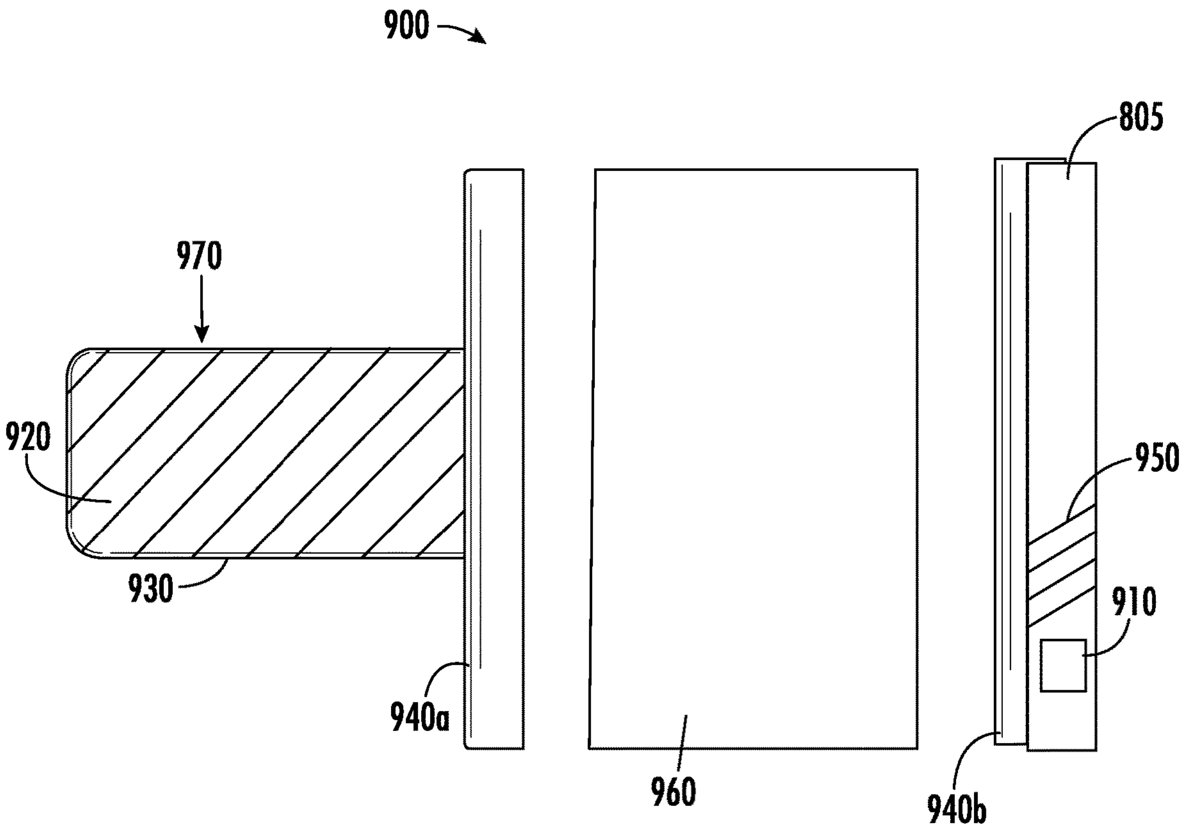
FIG. 9 illustrates an example wireless charging system, according to example embodiments disclosed herein.

Referring to FIG. 9, an example wireless charging system is illustrated according to an example embodiment of the disclosure. For example, a wireless charging system 900 may be disposed proximate to the display device 805 and the wireless charging system may be configured to transfer power wirelessly to a power source (e.g., rechargeable battery 910) of the display device 805. For example, the wireless charging system 900 associated with the vehicle wheel-based computing device 800 (display device 805) may include an inductive charging system which transfers power wirelessly from a fixed primary coil 920 attached to the vehicle wheel suspension 930 of the wheel (an inner side 940*a* of the wheel with respect to tire 960), to a secondary coil 950 which may be embedded in the display device 805 (e.g., a rear side of the display device 805) which is attached to an outer side 940*b* of the wheel with respect to tire 960, to charge a rechargeable battery 910 in the display device 805. For example, the fixed primary coil 920 may be powered by the vehicle battery 970. In some implementations, a large diameter coil may be implemented on the fixed primary coil 920 attached to the wheel suspension 930, and a large diameter secondary coil 950 may be embedded in the display device 805, which can allow power transfer up to 30 cm or 40 cm between coils. This example inductive charging system charges the rechargeable battery 910 embedded in the display device 805 from a 30 cm to 40 cm distance. The power is transmitted through the fixed primary coil 920 attached to the wheel suspension 930 and the fixed primary coil 920 may be positioned in such a way that the fixed primary coil 920 is aligned toward the secondary coil 950 which is embedded in the display device 805, where the display device 805 moves in an angular motion compared to the fixed primary coil 920. For example, the fixed primary coil 920 can be fixed compared to the secondary coil 950, which allows for power transfer as the display device 805 rotates about the axis of the wheel. Additional power may be obtained through the rotational aspects of the inductive fields, and the rotation of the secondary coil 950 produces additional energy which can be captured to increase the amplitude of the power transferred, such that power transfer is solely based on the inductive charging using a standard inductive power transfer circuit, plus some additional power generated by the angular motion of the display device's embedded secondary coil 950.

In another example, the wireless charging system 900 may include a fly wheel and motor/generator which allows the display device 805 to rotate at a different angular velocity when compared to the wheel. For example, the motor may rotate the display device 805 independent to the rotation of the wheel such that the motor/generator may be implemented to recapture power and put into the rechargeable battery 910 in the display device 805.

Returning to FIG. 8, the display device 805 may include a display screen 870 which is configured to display content. For example, the display screen 870 may include any of a LED, LCD, OLED, plasma, CRT, or projector display screen. For example, a projection device may be installed at the wheel assembly to project an image on the display screen 870. The display screen 870 may be a substantially circular-shaped device with a round display. For example, the display screen may be a high-resolution display (e.g., 1080×1080 display, 4 k display, 8 k display, etc.) with pixels arranged in a circular configuration. The display screen 870 may be a touch screen.

The display device 805 may include display driver 875. The display driver 875 may be configured to map an image in computer-readable format (e.g., the generated content to be presented on the display screen 870) to the pixels of the display screen 870. For example, the display driver 875 may be configured to convert a three-dimensional model or a two-dimensional image into a format that can be displayed by pixels of a three-dimensional display. The display driver 875 may be configured to drive the display screen 870 to display content which is received remotely (e.g., via content received from vehicle computing system 200, remote computing platform 110, etc.), or the display driver 875 may be configured to drive the display screen 870 to display content that is rendered by an operating system of the display device 805. Additionally, or alternatively, the display driver 875 can be incorporated into wheel electronics that can obtain data points for the wheel, such as tire pressure, temperature, wheel speed, and so on.

Figure 10C:
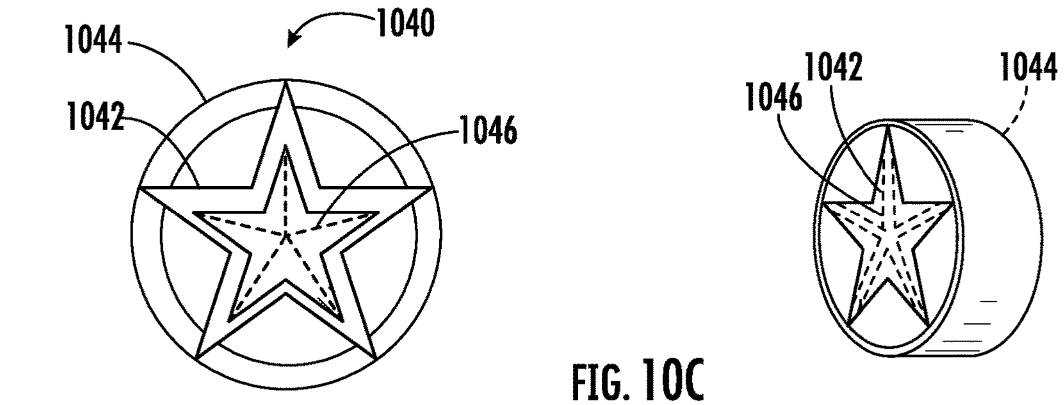

FIGS. 10A-10C illustrate example vehicle wheel-based computing devices according to example embodiments of the disclosure. FIG. 10A illustrates a wheel 1000 including a round display device 1002. In some implementations, the round display device 1002 can be a tablet-like device. For instance, the display device 1002 can include a display screen, control circuit, battery, and the like, as described with respect to the display device 805 of FIG. 8. The display device 1002 can include a metallic backing or metallic material to improve the durability of the display device 1002. As illustrated in FIG. 10A, the round display device 1002 can occupy substantially the entire surface area of the face of a wheel rim (not illustrated) such that the round display device 1002 obscures the wheel rim from an observer. In some implementations, the round display device 1002 can be a high resolution circular display, such as a 4K display, an 8K display, a 1080×1080 display, or another suitable display screen. Although the round display device 1002 is illustrated as being a monolithic display in FIG. 8A, the round display device 1002 could be formed from several partial segments. As one example, the round display device 1002 could be formed of several "pie-shaped slices" of display. For instance, each "slice" of the overall display screen could be affixed to a spoke or other portion of the wheel 1000.

Figure 10D:
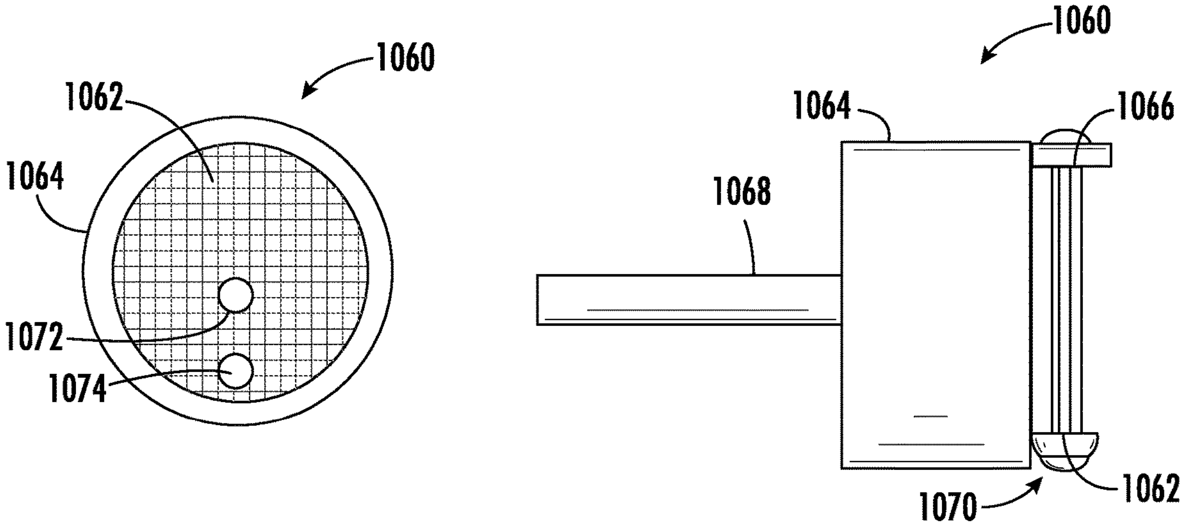

In some implementations, the round display device 1002 can include a protective layer 1006. The protective layer 1006 can shield the round display device 1002 from climate conditions, debris, road conditions (e.g., potholes), and other elements that could damage the round display device 1002. As one example, the protective layer 1006 may be made of a shatter-proof glass or plastic material. In some implementations, the display 1002 can be slotted into a case including the protective layer 806. One example case is illustrated in FIG. 10D.

The wheel 1000 additionally includes a tire 1004. As illustrated in FIG. 10A, the round display device 1002 may not cover the tire 1004. The wheel 1000 can be arranged on an axle 1008 such that the wheel 1000 can roll on the axle 1008 and propel a vehicle. In some implementations, an inductive power system can transfer power from rotation of the axle 1008 (or another suitable vehicle component) to power the round display device 1002 as described with respect to FIG. 9.

In some implementations, the wheel 1000 (e.g., the round display device 1002) can include or can otherwise be in communication with a display driver (e.g., display driver 875). The display driver can map an image in computer-readable format (e.g., the generated content 656) to the pixels of the round display device 1002. Additionally or alternatively, the display driver can be incorporated into wheel electronics that can obtain data points for the wheel, such as tire pressure, temperature, wheel speed, and so on.

FIG. 10B illustrates another example wheel 1020 including a hub display device 1022. As illustrated in FIG. 10B, the hub display device 1022 can occupy about the surface area of a hub cap in the center of wheel 1020. For instance, in some implementations, the hub display device 1022 can be built into a hub cap. As another example, in some implementations, the hub display device 1022 can cover a known hub cap. In some implementations, the hub display device 1022 can include a high resolution circular display screen, such as a 4K display screen, an 8K display screen, a 1080×1080 display screen, or another suitable display screen.

In some implementations, the hub display device 1022 can include a protective layer 1026. The protective layer 1026 can shield the hub display device 1022 from climate conditions, debris, road conditions (e.g., potholes), and other elements that could damage the hub display device 1022. As one example, the protective layer 1026 is made of a shatter-proof glass or plastic material.

The wheel 1020 additionally includes a tire 1024. The wheel 1020 can be arranged on an axle 1028 such that the wheel 1020 can roll on the axle 1028 and propel a vehicle. As illustrated in FIG. 10B, the hub display device 1022 can be arranged on a hub cap that covers the meeting point of the wheel 1020 and the axle 1028. In some implementations, an inductive power system can transfer power from rotation of the axle 1028 (or another suitable vehicle component) to power the hub display device 1022 (e.g., as described with respect to FIG. 9).

In some implementations, the wheel 1020 (e.g., the hub display device) can include or can otherwise be in communication with a display driver (e.g., display driver 875). The display driver can map an image in computer-readable format (e.g., the generated content 656) to the pixels of the hub display device 1022. Additionally or alternatively, the display driver can be incorporated into wheel electronics that can obtain data points for the wheel, such as tire pressure, temperature, wheel speed, and so on.

FIG. 10C illustrates another example wheel 1040 including a three-dimensional display 1042 arranged on spokes 1046. As illustrated in FIG. 10C, the three-dimensional display 1042 can be arranged on the spokes 1046 such that the display occupies at least a portion of free space between the spokes. For instance, pixels of the three-dimensional display 1042 can be arranged in rows and the rows of pixels can be layered into the width of the wheel 1040.

The wheel 1040 additionally includes a tire 1044. In some implementations, the wheel 1040 (e.g., the three-dimensional display 1042) can include or can otherwise be in communication with a display driver (e.g., display driver 875). The display driver can map an image in computer-readable format (e.g., the generated content 656) to the pixels of the three-dimensional display 1042. For instance, the display driver can convert a three-dimensional model or a two-dimensional image into a format that can be displayed by pixels of the three-dimensional display 1042. Additionally or alternatively, the display driver can be incorporated into wheel electronics that can obtain data points for the wheel, such as tire pressure, temperature, wheel speed, and so on.

FIG. 10D illustrates another example wheel 1060. The wheel 1060 can include a display device 1062 and a tire 1064 mounted to an axle 1068. In particular, the display device 1062 can be incorporated into a case 1070. The case 1070 can be configured to shield the display device 1062 from debris and other forces during operation of the wheel 1060. For instance, the case 1070 can fully encompass the display device 1062 and/or related electronic components. The case 1070 can include a protective layer 1066 that protects the display screen portion of display device 1062.

As one example, in some embodiments, the display device 1062 can be a tablet-like device with a shell including hardware components such as a display screen, control circuit, battery, etc. The display device 1062 can slot into the case 1070 such that the case protects the display device 1062 from several angles. For instance, in some implementations, the case 1070 includes a rubber outer shell with cushioning at the edges of the shell. The rubber outer shell can protect the display device 1062 by absorbing shock forces on the wheel 1060 (e.g., from the tire 1064) that are transferred to the wheel rim. Additionally, or alternatively, the rubber outer shell can allow for some movement while maintaining a water-safe seal between the rim and the display device 1062. Additionally, or alternatively, in some cases, the rubber outer shell can shield the display device 1062 should the display device 1062 become detached from the wheel 1060.

In some implementations, the case 1070 can have a toroidal shape with an extended area along the outside. The case 1070 can include a portion that is composed of a harder material, such as a hard rubber or plastic, that is configured to be fitted or otherwise secured to the wheel 1060 (e.g., to a wheel rim). For instance, in some implementations, the wheel rim may be fitted with an inverse half-toroidal shape to accommodate the case 1070.

FIG. 10D also illustrates an example configuration of a plurality of cameras 1072, 1074 which are integrated with the front (outer) side of the display device 1062. The plurality of cameras 1072, 1074 may be configured to capture images of the external environment of the vehicle which may be provided to a user inside the vehicle, to the vehicle computing system 200, and may be used for generating content by the display device 1062 and/or the vehicle computing system 200.

Figure 11:
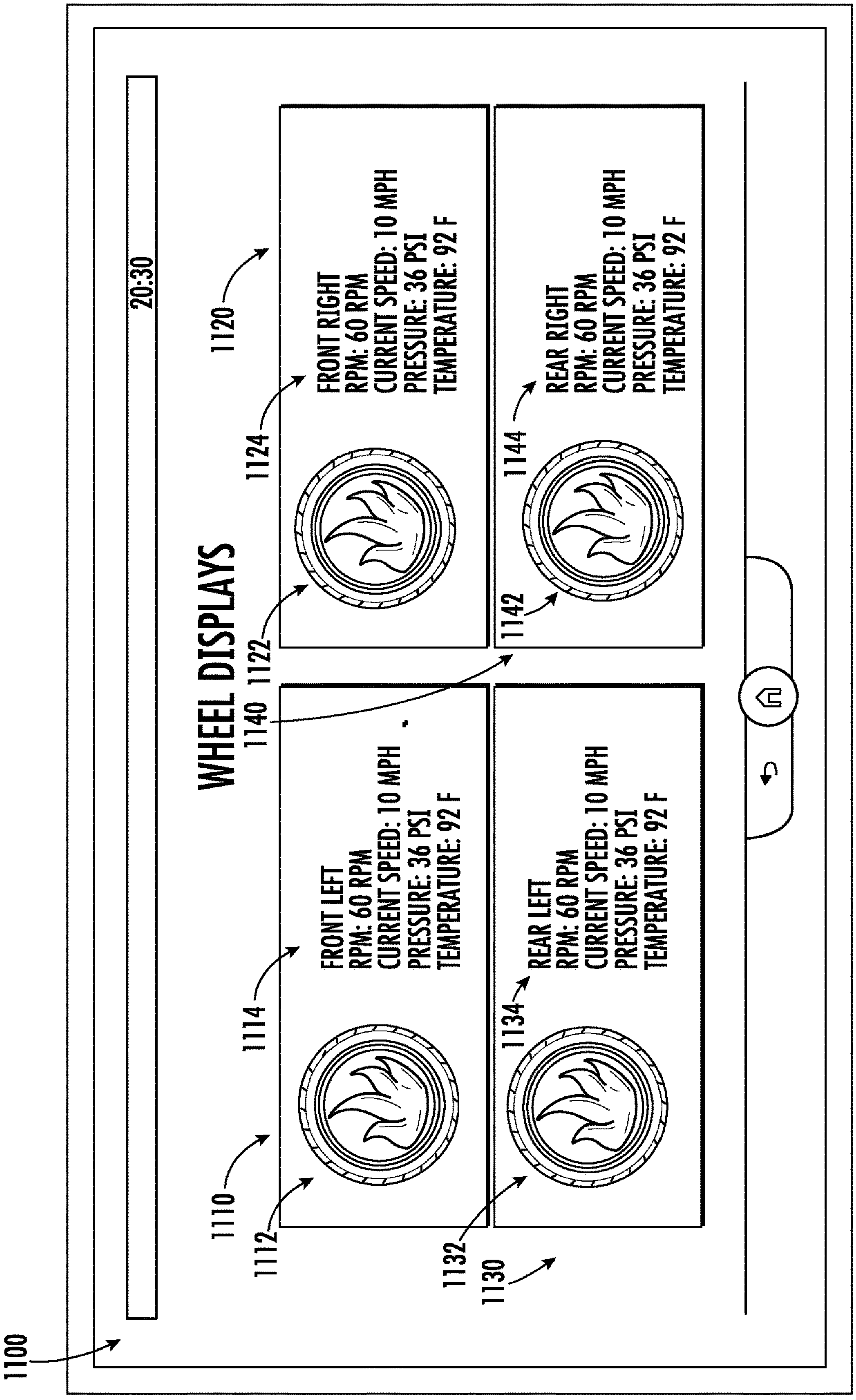
FIG. 11 illustrates an example user interface according to example embodiments disclosed herein.

FIG. 11 illustrates an example user interface 1100 according to an embodiment hereof. The example user interface 1100 can be displayed, for example, on an infotainment system of a vehicle (e.g., vehicle 105). The user interface 1100 can include informational elements 1110, 1120, 1130, and 1140 each corresponding to a given wheel of a vehicle. For instance, element 1110 can correspond to a front left wheel. Element 1110 can include display 1112 that depicts the current content displayed on the wheel hub display device of the front left wheel. Additionally, element 1110 can include information 1114 such as current RPM of the front left wheel, current linear speed of the front left wheel, current tire pressure of the front left wheel, and current temperature of the front left wheel.

Additionally, element 1120 can correspond to a front right wheel. Element 1120 can include display 1122 that depicts the current content displayed on the wheel hub display device of the front right wheel. Additionally, element 1120 can include information 1124 such as current RPM of the front right wheel, current linear speed of the front right wheel, current tire pressure of the front right wheel, and current temperature of the front right wheel.

Additionally, element 1130 can correspond to a rear left tire. Element 1130 can include display 1132 that depicts the current content displayed on the wheel hub display device of the rear left wheel. Additionally, element 1130 can include information 1134 such as current RPM of the rear left wheel, current linear speed of the rear left wheel, current tire pressure of the rear left wheel, and current temperature of the rear left wheel.

Finally, element 1140 can correspond to a rear right tire. Element 1140 can include display 1142 that depicts the current content displayed on the wheel hub display device of the rear right wheel. Additionally, element 1140 can include information 1144 such as current RPM of the rear right wheel, current linear speed of the rear right wheel, current tire pressure of the rear right wheel, and current temperature of the rear right wheel.

Figure 12:
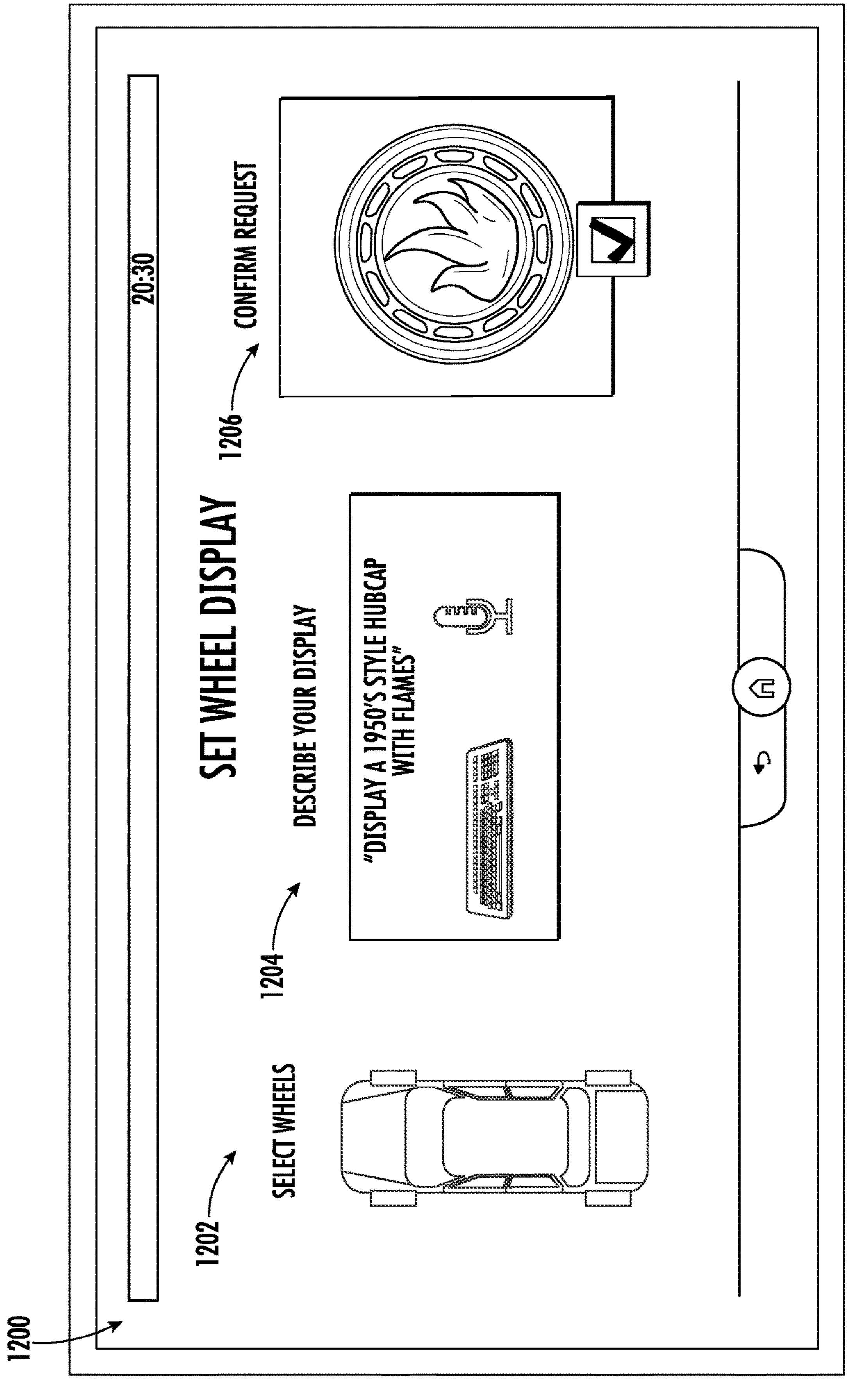
FIG. 12 illustrates an example user interface according to example embodiments disclosed herein.

FIG. 12 illustrates an example user interface 1200 according to an embodiment hereof. The example user interface 1200 can be displayed, for example, on an infotainment system of a vehicle (e.g., vehicle 105). The example user interface 1200 can provide a user with controls to generate new content for display on the wheel displays of the vehicle (e.g., 105). For instance, the user can first interact with element 1202 to select which wheels to generate new content for. As one example, the user can tap, click, or otherwise interact with elements uniquely corresponding to each wheel of the vehicle. Additionally or alternatively, the user can interact with element 1204 to input user input data describing the content to be generated. For instance, in some example implementations, the user can speak the description of the display and the vehicle computing system 200 can convert the user's spoken description into text data through any suitable speech-to-text system. As another example, the user can interact with an element to bring up an on-screen keyboard to manually type the description. After receiving the user input data, content can be generated as described herein. In some implementations, the user interface 1200 includes element 1206 providing for a user to confirm the result of the generated content before it is displayed on the wheel hub display devices of the vehicle. In some implementations, a plurality of content items may be generated based on the user input data and element 1206 may provide for the user to select which, if any, content items will be displayed on the wheel hub display device (e.g., vehicle wheel-based computing device 800 including display device 805).

As yet another example, in some implementations, a user may upload images, videos, or other content from a user device (e.g., a mobile device) and either display the image on the display screen of the display device 805 or use the image as an input to produce the generated content. Furthermore, in some implementations, the user can take a picture using an in-cabin camera and provide it as input to produce the generated content. For instance, the user may provide an image and a prompt such as "display my image with me wearing a cowboy hat" and the vehicle computing system 200 can generate content depicting the user's image with a cowboy hat. The generated image with cowboy hat could then be displayed on the display screen of the display device 805 of the vehicle.

Figure 13:
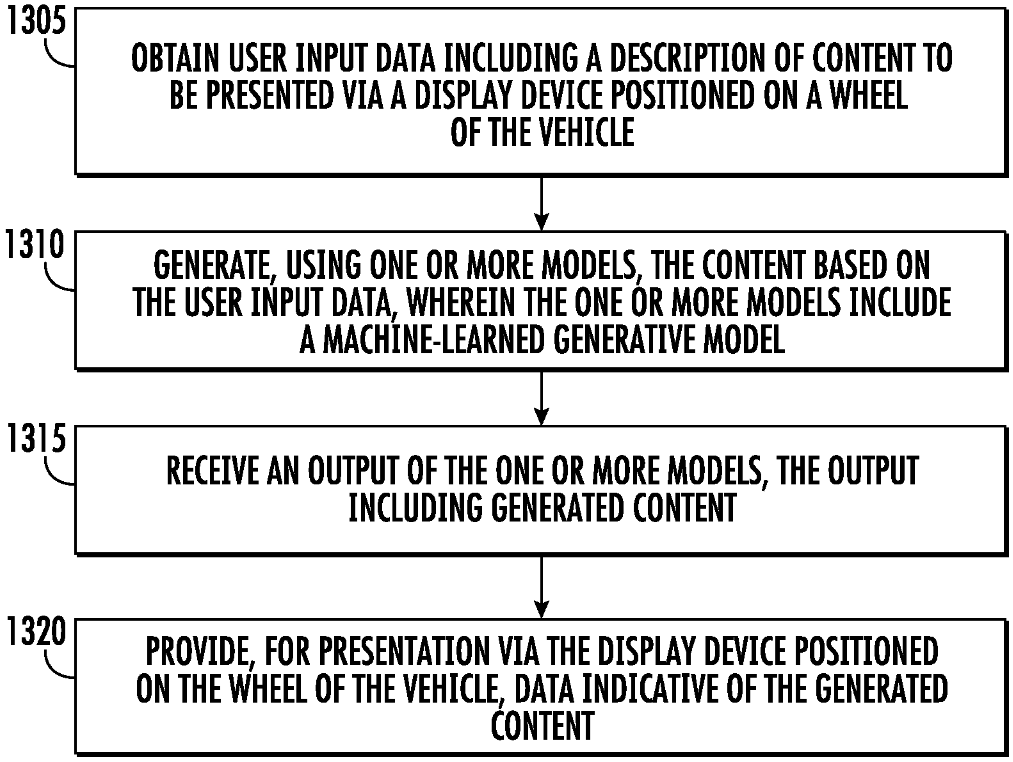
FIG. 13 illustrates a flowchart diagram of an example method according to example embodiments disclosed herein.

FIG. 13 illustrates a flowchart diagram of an example method 1300 for a generative model of wheel hub display device content according to an embodiment hereof. The method 1300 may be performed by a computing system described with reference to the other drawings. In an embodiment, the method 1300 may be performed by the control circuit 810 of the vehicle wheel-based computing device 800 of FIG. 8, by the control circuit 6015 of the computing system 6005 of FIG. 20, and the like. One or more portions of the method 1300 may be implemented as an algorithm on the hardware components of the devices described herein (e.g., as in FIGS. 1, 4, 5, 8, 15, etc.). For example, the operations of method 1300 may be implemented as operations/instructions that are executable by computing hardware.

FIG. 13 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the disclosure. FIG. 13 is described with reference to elements/terms described with respect to other systems and figures for example illustrated purposes and is not meant to be limiting. One or more portions of method 1300 may be performed additionally, or alternatively, by other systems. For example, method 1300 may be performed by a control circuit of the remote computing platform 110, the vehicle computing system 200, the user device 115, and so on.

In an embodiment, the method 1300 may begin with or otherwise include an operation 1305, in which the computing system 200 obtains user input data 652 including a description of content to be presented via a display device (e.g., display device 805) positioned on a wheel of the vehicle 105. The user input data 652 can be a natural language input provided from a user. The user input data 652 can include a description of content to be presented via the display device 805 positioned on a wheel of a vehicle. As an example, the user input data 652 can be obtained from an application on a user device, a vehicle infotainment system, or other suitable computing device. In addition to the user input data 652, in some implementations, the generative model 620 can receive wheel parameters 654 describing parameters of the wheel on which the content is to be displayed, such as display type (e.g., 3D, 2D, etc.), display size, wheel type, wheel size, and so on. Based on the user input data 652 and/or the wheel parameters 654, the generative model 620 can produce the generated content 656 for display on the wheel hub display device (e.g., vehicle wheel-based computing device 800 including display device 805).

Furthermore, in some implementations, the user input data 652 can be indicative of a timing of display for the generated content 656. The generated content 656 can be presented via the display device 805 based on the timing of display indicated by the user input data 652. For example, a user may describe a certain generated content 656 that is only displayed at night. The vehicle computing system 200 can thus only display the generated content 656 when it is night. For instance, the timing of display can be compared to current time characteristics to determine whether to display the generated content 656.

In an embodiment, the method 1300 may include an operation 1310, in which the computing system 200 generates, using one or more models (e.g., generative model 620, physics-based model 660), the content 656 based on the user input data. In particular, the one or more models can include a machine-learned generative model 620. In some implementations, the generative model can be a generative adversarial network trained to provide the generated content based on the user input data. To generate the content, the computing system 200 can be configured to input the user input data 652 into the machine-learned generative model 620. The machine-learned generative model 620 can be trained to process the user input data 652 and provide generated content 656 that is: (i) based on the description of the content included in the user input data 652, and (ii) configured for presentation via the display device (e.g., display device 805) positioned on the wheel of the vehicle.

For instance, the machine-learned generative model 620 can be trained based on training data 610 indicative of a plurality of wheel-based features. For instance, the training data 610 can include data indicating wheel rims, hubs, hub caps, spokes, tires, and so on. As examples, the training data 610 can include training images, training models (e.g., 3D models), training videos, training graphics, training icons, and other suitable training data indicative of wheel-based features. The training data 610 can include two-dimensional image content and/or three-dimensional image content. For instance, in some implementations, the training data 610 can be organized into collections or bins. The collections or bins may be indexed by type (e.g., 2D vs. 3D), content type, subject area, etc. In some implementations, the training data 610 can be gathered from open-source data publicly available on the Internet or other data store. Additionally, or alternatively, the training data 610 can include proprietary data.

For instance, the training data 610 can include existing wheel training data 611. The existing wheel training data 611 can indicate a plurality of historical or otherwise existing wheels and/or portions thereof, such as rims, spokes, hubs, hub caps, tires, etc. For example, in some implementations, the existing wheel training data 611 can include images, videos, etc. of historical wheel rims labeled with descriptors of wheel rims, such as, for example, an image of a 1950's convertible wheel rim labeled with tags or descriptors such as "1950s," "convertible," "rim," tags describing the make, model, year, and so on to facilitate training the generative model 620. In some implementations, the labels may be automatically generated.

Additionally, or alternatively, the training data 610 can include media training data 612. The media training data 612 can include data indicating media such as, for example, characters (e.g., cartoon characters), actors, brands or logos, objects, and other suitable media. The media training data 612 can be labeled with tags or descriptors describing the character, actor, etc. In some implementations, operators of the model trainer 615 can license, purchase, or otherwise access databases provided by owners of the media to obtain the media training data 612.

Additionally, or alternatively, the training data 610 can include effects training data 613. The effects training data 613 can indicate a plurality of effects, such as physical effects. As examples, the effects training data 613 can indicate effects such as fire, bubbles, light, colors, water, plants, flags, and other suitable physical effects. The effects training data 613 can be labeled with tags or descriptors indicating the type of effect.

Additionally, or alternatively, the training data 610 can include specifications 614. The specifications 614 can describe aspects of wheels and wheel rims, such as, for example, a size, a shape, an associated vehicle model, a year, or a material associated with a given wheel or wheel rim. For instance, in some implementations, the generated content is configured for presentation via the display device 805 positioned on the wheel such that the generated content is formatted and fitted for the display device 805 positioned on the wheel. The specifications 614 can facilitate formatting and fitting the generated content for presentation via the display device 805.

Additionally, and/or alternatively, the one or more models can include a physics-based model 660 configured to model one or more motion parameters of the vehicle. For instance, the physics-based model 660 can produce motion parameters 665 that model the motion of the vehicle and/or the wheel. As examples, the motion parameters 665 can include a motion of the wheel, a speed of the vehicle, an acceleration of the vehicle, a heading of the wheel or of the vehicle, an angular velocity of the wheel, revolutions per minute of the wheel, and the like. To generate the content 656, the system 650 can input the motion parameters 665 into the machine-learned generative model 620. The machine-learned generative model 620 can then produce output (e.g., generated content 656) that is based on the motion parameters 665. As an example, the output can include an animation based on the generated content 656. For instance, the animation can include animated motion of an element in the generated content 656 based on at least one of the motion parameters 665 (e.g., at least one of the motion of the wheel, the speed of the vehicle, the acceleration of the vehicle, or the heading of the vehicle).

In some implementations, the user input data 652 can be indicative of a physics event associated with the vehicle. The presentation of the data indicative of the generated content 656 via the display device 805 positioned on the wheel can then be based on the physics event. As one example, the user may describe a flame effect that bends backwards when accelerating as if affected by wind from acceleration. To facilitate this effect, the physics-based model 660 can model motion parameters 665 descriptive of acceleration such that the generative model 620 can produce generated content 656 that follows this physics effect. As another example, in some implementations, the user may describe content that flashes red when the vehicle is braking or decelerating, so the physics-based model 660 can produce motion parameters 665 that model vehicle braking or deceleration for the generative model 620.

Various approaches may be used to configure the machine-learned generative model to provide generated content 656 that is configured for presentation via the display device positioned on the wheel of the vehicle. For example, the model can be configured such that the generated content is formatted and fitted for the display device 805 positioned on the wheel. For instance, the machine-learned generative model can be trained on images that are the size and shape of the display device 805. Additionally, or alternatively, the machine-learned generative model can be trained to receive an input indicative of the size and shape of the display device. The model can process image(s) to crop the image(s), reformat the image(s), or otherwise transform the image(s) for generating content that will fit the size, shape, resolution, or other display parameters of the display device 805. In some implementations, the transformation may be performed on the generated content by the machine-learned model or through post-processing of the generated content. In some implementations, the machine-learned generative model can create and output the generated content such that it matches the resolution of the display device 805 positioned on the wheel.

In an embodiment, the method 1300 may include an operation 1315, in which the computing system 200 receives an output of the one or more models, the output including the generated content 656. For instance, in some implementations, the computing system 200 can process the output of the one or more models to generate the data indicative of the generated content for presentation via the display device. As an example, the output of the one or more models may be trimmed, formatted, or otherwise adjusted such that the content will be displayed properly on the display device. As another example, the output of the one or more models may be filtered for inappropriate content, such as offensive or obscene content, content without proper licensing, and so on, such that inappropriate content is not displayed on the display device 805.

In an embodiment, the method 1300 may include an operation 1320, in which the computing system 200 provides, for presentation via the display device (e.g., display device 805) positioned on the wheel of the vehicle, data indicative of the generated content 656. For instance, the computing system 200 can communicate the data indicative of the generated content from the computing system 200 to a display driver or other computing device configured to provide the content for display on the display device 805. As another example, the computing system 200 can display the content via the display device 805 directly. The data indicative of the generated content can include static content or animated content based on the generated content. In some implementations, the data indicative of the generated content can be further processed such that it can be presented via the display device 805.

Figure 14:
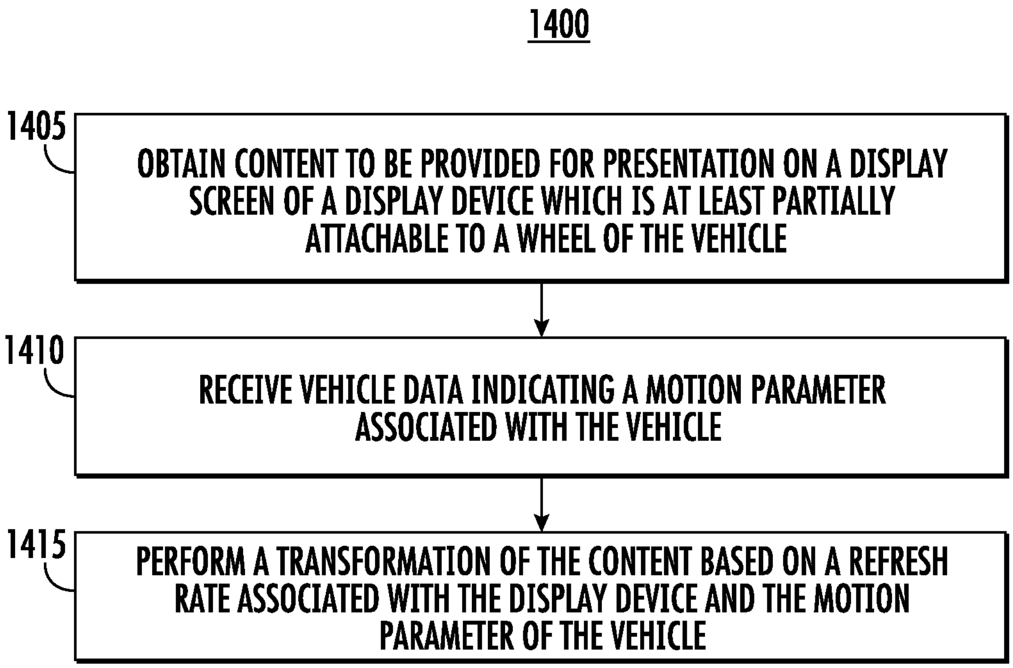
FIG. 14 illustrates a flowchart diagram of an example method according to example embodiments disclosed herein.

FIG. 14 illustrates a flowchart diagram of an example method 1400 for controlling a display device which is at least partially attached to a wheel to display content, according to an embodiment hereof. The method 1400 may be performed by a computing system described with reference to the other drawings. In an embodiment, the method 1400 may be performed by the control circuit 810 of the vehicle wheel-based computing device 800 of FIG. 8, by the control circuit 6015 of the computing system 6005 of FIG. 20, and the like. One or more portions of the method 1400 may be implemented as an algorithm on the hardware components of the devices described herein (e.g., as in FIGS. 1, 4, 5, 8, 15, etc.). For example, the operations of method 1400 may be implemented as operations/instructions that are executable by computing hardware.

FIG. 14 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the disclosure. FIG. 14 is described with reference to elements/terms described with respect to other systems and figures for example illustrated purposes and is not meant to be limiting. One or more portions of method 1400 may be performed additionally, or alternatively, by other systems. For example, one or more portions of method 1400 may be performed by a control circuit of the remote computing platform 110, the vehicle computing system 200, the user device 115, the vehicle wheel-based computing device 800 including display device 805, and so on.

In an embodiment, the method 1400 may begin with or otherwise include an operation 1405, in which the vehicle wheel-based computing device 800 (display device 805) obtains content to be provided for presentation on a display screen 870 of the display device 805. The content can correspond to content which is generated and rendered by the control circuit 810 of the display device 805 according to the method of FIG. 13, or the content can correspond to content which is generated and rendered by other systems including vehicle computing system 200, remote computing platform 110, user device 115, third-party computing platform 125, etc. For example, the content can include an image, a video, an animation, augmented reality content, etc. For example, the content can be generated at least partially via one or more machine-learned models, including one or more machine-learned generative models, as described with respect to FIGS. 6A-6B.

In an embodiment, the method 1400 may include an operation 1410, in which the vehicle wheel-based computing device 800 (display device 805) receives vehicle data indicating a motion parameter associated with the vehicle. For example, the vehicle wheel-based computing device 800 including display device 805 may receive the vehicle data via one or more sensors included in or embedded in the display device 805, or the display device 805 may receive the vehicle data via one or more external sensors which are not included in or embedded in the display device 805. The vehicle wheel-based computing device 800 including display device 805 may be configured to provide such sensor data to other systems including vehicle computing system 200, remote computing platform 110, user device 115, third-party computing platform 125, etc. The vehicle wheel-based computing device 800 including display device 805 may be configured to receive such sensor data from sensors of other systems including vehicle computing system 200, remote computing platform 110, user device 115, third-party computing platform 125, etc. For example, the motion parameter may include a speed of the vehicle, an angular velocity of the wheel, revolutions per minute of the wheel, a heading of the wheel or the vehicle, or an acceleration of the vehicle. The vehicle data may include accelerometer data associated with the display device 805, gyroscope data associated with the display device 805, wheel torque data, or brake torque data.

In an embodiment, the method 1400 may include an operation 1415, in which the vehicle wheel-based computing device 800 (display device 805) performs a transformation of the content based on a refresh rate associated with the display device 805 and the motion parameter of the vehicle. In some implementations, the transformation includes a rotation of the content in a direction opposite of a rotation direction of the wheel.

To determine the transformation of the content, the control circuit 810 and/or display driver 875 may be configured to determine an angular velocity of the display device 805. For example, the angular velocity of the display device 805 may be equal to an angular velocity of the wheel, and thus sensor data indicating an angular velocity of the wheel may be used to determine the angular velocity of the display device 805. In addition, or alternatively, the angular velocity of the display device 805 may be determined based on sensor data from sensors (e.g., accelerometers, gyroscopes, etc.) included in or embedded in the display device 805 itself.

The control circuit 810 and/or display driver 875 may be configured to display an image or video on the display screen 870 of the display device 805 in a manner such that the image appears to remain horizontal even while the wheel rotates. For example, the control circuit 810 and/or display driver 875 may be configured to compensate for the rotation of the wheel by rotating the image at the same rate of rotation as the tire, but in an opposite direction. That is, the control circuit 810 and/or display driver 875 may be configured to perform the transformation of the content by rotating the content in a direction opposite of a rotation direction of the wheel and at a rotation rate which matches an angular velocity of the display device 805 (which is an angular velocity of the wheel), such that an orientation of the content presented on the display device 805 is maintained.

As an example, when the tire rotates in a first direction (e.g., clockwise direction) at 10 revolutions per minute (RPM) (~1.05 radians per second), the control circuit 810 and/or display driver 875 may be configured to rotate the content (e.g., an image) by 1.05 radians per second in a second direction which is opposite to the first direction (e.g., a counterclockwise direction).

The display device 805 may be associated with a refresh rate which refers to the number of times an image on the display screen 870 is updated or refreshed per second. For example, when an image is drawn with a frame rate of 25 frames per second (FPS) via the control circuit 810 and/or display driver 875, approximately every 40 milliseconds a new image is updated by the display driver 875. Therefore, to make the image appear horizontal to an external (e.g., street) view when the wheel of the vehicle rotates at 10 RPM (~4-6 miles per hour for a 19" rim diameter), the control circuit 810 and/or display driver 875 may be configured to rotate the frame of the image or video by 0.04188 radians every 40 ms. Further, the control circuit 810 and/or display driver 875 may be configured to rotate the image based on the angular velocity of the wheel.

For example, at 10 RPM the angular velocity is about 60 degrees per second, and to make the image appear horizontal to an external (e.g., street) view when the wheel of the vehicle rotates at 10 RPM (~4-6 miles per hour for a 19" rim diameter), the control circuit 810 and/or display driver 875 may be configured to rotate the frame of the image or video by about 2.4 degrees every 40 ms (e.g., the 25th frame which appears 1 second later at a 25 FPS rate will be rotated by 60 degrees (25×2.4 degrees)). Accordingly, the control circuit 810 and/or display driver 875 may be configured to update the display screen 870 at a refresh rate (e.g., 25 FPS, 30 FPS, 60 FPS, etc.) associated with the display device 805. Further, the control circuit 810 and/or display driver 875 may be configured to perform a transformation of the content (e.g., by rotating the content) based on the refresh rate associated with the display device 805 and the motion parameter associated with the vehicle (e.g., the RPM of the wheel, the angular velocity of the wheel, the RPM of the display device 805, the angular velocity of the display device 805, etc.). By performing the transformation of the content, the content appears to be horizontal when viewing the wheel from the exterior as the vehicle moves (e.g., at a slow rate such as at about 1 mile per hour).

For example, at 100 RPM the angular velocity is about 600 degrees per second, and to make the image appear horizontal to an external (e.g., street) view when the wheel of the vehicle rotates at 100 RPM (~40-60 miles per hour for a 19" rim diameter), the control circuit 810 and/or display driver 875 may be configured to rotate frame of the image or video by about 24 degrees every 40 ms (e.g., the 15th frame which appears 1 second later at a 25 FPS rate will be rotated by 360 degrees (15×24 degrees)). Accordingly, the control circuit 810 and/or display driver 875 may be configured to update the display screen 870 at a refresh rate (e.g., 25 FPS, 30 FPS, 60 FPS, etc.) associated with the display device 805. Further, the control circuit 810 and/or display driver 875 may be configured to perform a transformation of the content (e.g., by rotating the content) based on the refresh rate associated with the display device 805 and the motion parameter associated with the vehicle (e.g., the RPM of the wheel, the angular velocity of the wheel, the RPM of the display device 805, the angular velocity of the display device 805, etc.). By performing the transformation of the content, the content appears to be horizontal when viewing the wheel from the exterior as the vehicle moves (e.g., at a slow rate such as at about 7 mile per hour to 8 miles per hour).

For example, at 400 RPM the angular velocity is about 2400 degrees per second, and to make the image appear horizontal to an external (e.g., street) view when the wheel of the vehicle rotates at 400 RPM (~160-240 miles per hour for a 19" rim diameter), the control circuit 810 and/or display driver 875 may be configured to rotate the frame of the image or video by about 96 degrees every 40 ms (e.g., the 4th frame which appears 1 second later at a 25 FPS rate will be rotated by about 360 degrees (4×96 degrees)). Accordingly, the control circuit 810 and/or display driver 875 may be configured to update the display screen 870 at a refresh rate (e.g., 25 FPS, 30 FPS, 60 FPS, etc.) associated with the display device 805. Further, the control circuit 810 and/or display driver 875 may be configured to perform a transformation of the content (e.g., by rotating the content) based on the refresh rate associated with the display device 805 and the motion parameter associated with the vehicle (e.g., the RPM of the wheel, the angular velocity of the wheel, the RPM of the display device 805, the angular velocity of the display device 805, etc.). By performing the transformation of the content, the content appears to be horizontal when viewing the wheel from the exterior as the vehicle moves (e.g., at a slow rate such as at about 7 mile per hour to 8 miles per hour).

Figure 15A:
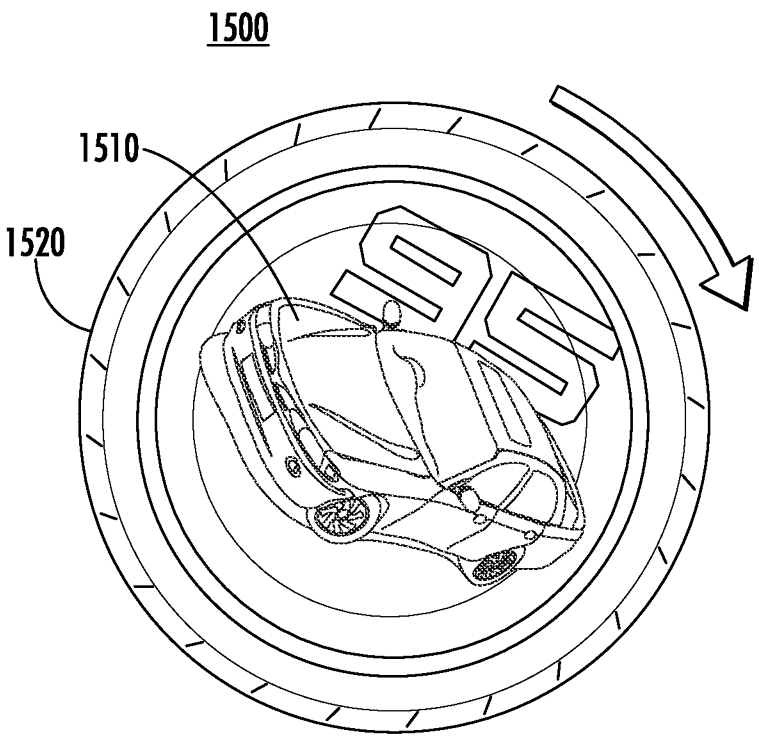
FIGS. 15A-15B illustrate an example of an image shown on the display screen being rotated to compensate for rotation of the wheel, according to example embodiments disclosed herein.
Figure 15B:
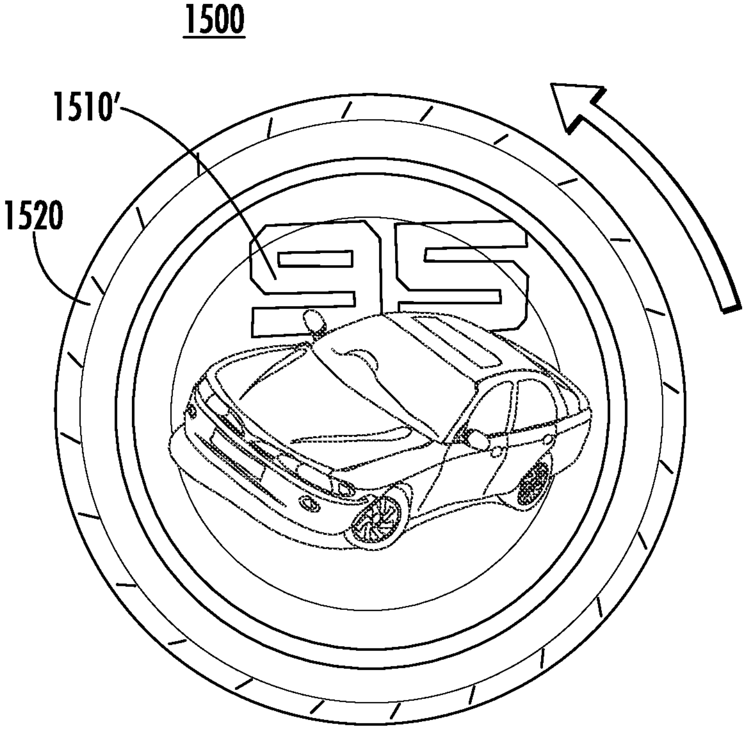

FIGS. 15A and 15B are example illustrations depicting how the image shown on the display screen can be rotated to compensate for rotation of the wheel, according to examples of the disclosure. For example, FIG. 15A illustrates the rotation of the wheel 1520 and of the display screen 1510 before the control circuit 810 and/or display driver 875 compensates for the rotation. At FIG. 15B, the display screen 1510' reflects that the image shown on the display screen 1510' has been rotated in a counterclockwise direction such that the image appears horizontal to an observer viewing the vehicle and wheel 1520 from the outside.

For a single image, the control circuit 810 and/or display driver 875 may be configured to control the rotation of the image in accordance with the refresh rate associated with the display device 805 and the motion parameter (e.g., RPM of the wheel, angular velocity of the wheel, etc.) so that the image appears static or stationary though the wheel rotates.

For a plurality of images, the control circuit 810 and/or display driver 875 may be configured to control the rotation of each of the images in accordance with the refresh rate associated with the display device 805 and the motion parameter (e.g., RPM of the wheel, angular velocity of the wheel, etc.) so that the plurality of images appear horizontal when viewed from an observer located outside the vehicle (e.g., a street view).

For example, the content to be provided for presentation on the display screen of the display device may include an animation comprising a plurality of image frames. To perform the transformation of the content, the control circuit 810 and/or display driver 875 may be configured to rotate one or more of the image frames to maintain, while the animation is provided for presentation on the display screen 870 of the display device 805 during rotation of the wheel, an orientation of the animation as it appears from a viewpoint external to the vehicle.

In some implementations, the control circuit 810 and/or display driver 875 may be configured to perform transformation of the content based on whether a value associated with a motion parameter exceeds a threshold value (e.g., an RPM of the display device 805 or wheel is more than 200 RPM, 400 RPM, etc.). For example, if the motion parameter corresponds to an angular velocity of the display device 805 and the content includes a plurality of images, when the angular velocity of the display device 805 is less than a threshold angular velocity value, the control circuit 810 and/or display driver 875 may be configured to rotate the content (e.g., the plurality of images) at a rotation rate which matches the angular velocity of the display device 805. On the other hand, when the angular velocity of the display device 805 is more than the threshold angular velocity value, the control circuit 810 and/or display driver 875 may be configured to provide for presentation a static image from among the plurality of images for presentation on the display screen 870 of the display device 805 and rotate the static image at a rotation rate which matches the angular velocity of the display device 805.

In some implementations, the control circuit 810 and/or display driver 875 may be configured to perform transformation of the content based on whether a value associated with a motion parameter exceeds a threshold value (e.g., an RPM of the display device 805 or wheel is more than 200 RPM, 400 RPM, etc.). For example, if the motion parameter corresponds to an angular velocity of the display device 805 and the content includes a plurality of images, when the angular velocity of the display device 805 is less than a threshold angular velocity value, the control circuit 810 and/or display driver 875 may be configured to rotate the content (e.g., the plurality of images) at a rotation rate which matches the angular velocity of the display device 805. On the other hand, when the angular velocity of the display device 805 is more than the threshold angular velocity value, the control circuit 810 and/or display driver 875 may be configured to provide for presentation content which corresponds to a video stream and the control circuit 810 and/or display driver 875 is configured to provide the video stream for presentation on the display screen of the display device which appears stationary on the display device. For example, the video stream may include a sequence of image frames that correspond to a specified angular velocity value (e.g., 400 RPM) and refresh rate of the display device 805. For example, the image frames provided in the video stream may be previously rotated such that the control circuit 810 and/or display driver 875 need not perform a transformation to the image frames as the wheel rotates. A plurality of videos streams corresponding to different angular velocity values and refresh rate values may be stored at the display device 805 or vehicle computing system 200, for example.

Figure 16:
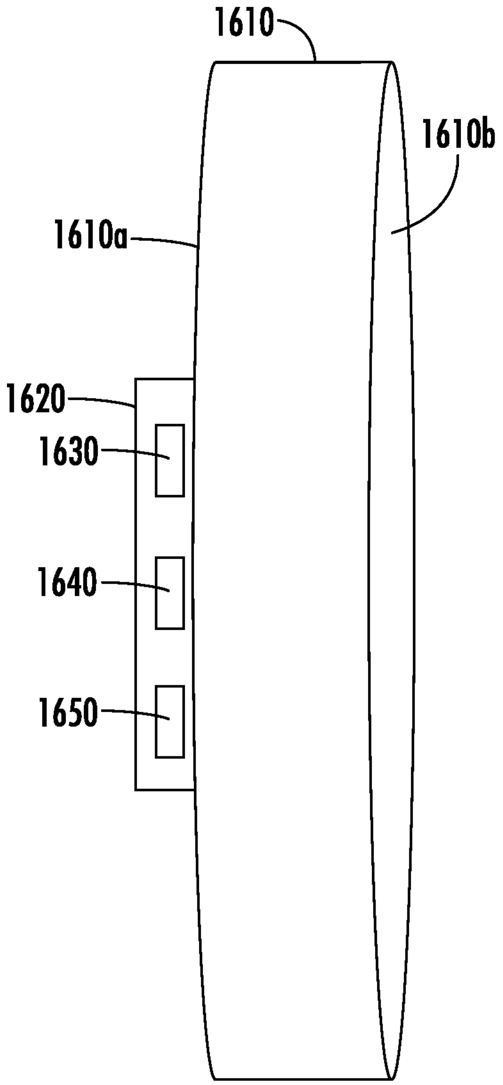
FIG. 16 is an example illustration depicting how one or more motion sensors can be provided to a display device of the vehicle wheel-based computing device, according to examples of the disclosure.

FIG. 16 is an example illustration depicting how one or more motion sensors can be provided to a display device of the vehicle wheel-based computing device, according to examples of the disclosure. For example, in FIG. 16 a motion sensor unit 1620 can be attached to a rear side 1610*a* of a display device 1610 (similar to display device 805 described herein). The front side 1610*b* of the display device 1610 can display an image which is viewably by a user positioned external to the vehicle. Therefore, in the example of FIG. 16, the motion sensor unit 1620 is provided separately from the display device 1610 and is not an integrated feature of the display device 1610.

In the example of FIG. 16, the motion sensor unit 1620 includes an accelerometer 1630, a gyroscope 1640, and a magnetometer 1650. In some implementations, accelerometer 1630 is a 3-axis accelerometer, gyroscope 1640 is a 3-axis gyroscope, and magnetometer 1650 is a 3-axis magnetometer. In some implementations, accelerometer 1630, gyroscope 1640, and magnetometer 1650 may be provided in a single chip (e.g., as a system-in-package).

In some implementations, the motion sensor unit 1620 may be installed or fixed to the display device 1610 as an after-market device. In some implementations, the motion sensor unit 1620 may be calibrated after being attached to the display device 1610, after the display device 1610 is attached to the wheel, etc.

For example, the motion sensor unit 1620 may be configured to output vehicle data relating to the motion of the display device 1610 and the wheel. Such vehicle data can be presented to a user of the vehicle to provide information about the wheel and display device 1610 as well as to vehicle computing system 200. For example, the motion sensor unit 1620 may be configured to determine whether the vehicle is turning left or right based on the gyroscope and accelerometer data. The gyroscope 1640 measures angular velocity, while the accelerometer 1630 measures linear acceleration. By analyzing these sensor inputs, the motion sensor unit 1620 can infer the motion of the wheel (to which the motion sensor unit 1620 is indirectly attached) and determine the direction of a turn.

In some implementations, the accelerometer 1630 is configured to measure linear acceleration. The magnetometer 1650 can provide information about the orientation of the wheel relative to the Earth's gravitational field. When the vehicle turns left, the accelerometer 1630 will detect a change in linear acceleration along the wheel's axis, which includes a component due to the change in the gravitational acceleration. Similarly, when turning right, the accelerometer will detect a different linear acceleration along the wheel's axis, which also includes the gravitational acceleration component. The accelerometer can capture the linear acceleration experienced by the display device 1610. This includes the effects of the vehicle accelerating, braking, and any irregularities in the terrain. For example, the display device 1610 or vehicle computing system 200 may be configured to integrate the acceleration data over time to obtain velocity and distance information. Since the display device 1610 is physically attached to the wheel of the vehicle and the wheel is attached to the vehicle the acquired data can be provided by the motion sensor unit 1620 to the vehicles on-board computer (e.g., the vehicle computing system 200).

In some implementations, the gyroscope 1640 is configured to measure rotational motion or angular velocity around each of the wheels' three axes: X, Y, and Z. By monitoring the gyroscope data 1640, the motion sensor unit 1620 can detect changes in the rotational velocity, which indicate the turning motion. When the vehicle turns left or right, the gyroscope 1640 will detect a change in the angular velocity around the corresponding axis. The sign of the angular velocity (positive or negative) depends on the gyroscope sensor's orientation and the reference frame chosen.

In some implementations, the magnetometer 1650 is configured to detect changes in the magnetic field. As the wheel rotates, the magnetic field experienced by the magnetometer 1650 will vary due to factors such as the Earth's magnetic field and nearby magnetic sources. This data can provide insights into the wheel's orientation relative to the Earth's magnetic field.

The vehicle computing system 200 and/or display device 1610 may be configured to use a sensor fusion approach to calibrate the wheel with respect to the Earth's surface by using a combination of sensors, such as the accelerometer 1630 and the gyroscope 1640, along with the magnetometer 1650, to provide for more reliable and precise orientation estimation.

An example calibration procedure for the vehicle wheel-based computing device (display device 1610) may include mounting the motion sensor unit 1620, display device 1610, and corresponding wheel to which the vehicle wheel-based computing device (display device 1610) is attached, in a known initial orientation, ensuring a marked vertical line on the wheel is aligned with a marked vertical line on the display device 1610. The vehicle computing system 200 and/or display device 1610 may be configured to apply sensor fusion algorithms, such as complementary filtering. Kalman filtering, or sensor fusion libraries, to combine and process the data from the accelerometer, gyroscope, and magnetometer to estimate the wheel's orientation accurately.

In some implementations, data from the motion sensor unit 1620 may be used to determine information about the vehicle and/or wheel. For example, vehicle computing system 200 and/or display device 1610 may be configured to utilize information from the accelerometer 1630 and gyroscope 1640 to determine the direction of the turn. For example, if the gyroscope 1640 detects a positive angular velocity and the accelerometer 1630 indicates a decrease in the gravitational acceleration component along the wheel's axis, it indicates a left turn. Similarly, a negative angular velocity combined with an increase in the gravitational acceleration component indicates a right turn.

Because the vehicle wheel-based computing device (display device 1610) may be physically attached to the wheel (rim) of the vehicle, the angular velocity of the vehicle wheel-based computing device (display device 1610) may be equal to the angular velocity of the wheel (rim) itself, sensor(s) provided at the vehicle wheel-based computing device (display device 1610) can provide additional data to the vehicle on-board computer (vehicle computing system 200). The vehicle computing system 200 and/or display device 1610 may be configured to determine, based on the vehicle data provided by the sensor(s), whether any issues exist with the alignment of the vehicle or the wheel itself.

For example, the vehicle computing system 200 and/or display device 1610 may be configured to determine if a wheel (e.g., left wheel, right wheel, etc.) is balanced or tilting to the outside or inside as it rolls using data provided by the motion sensor unit 1620 (e.g., pitch, yaw, and roll measurements). Pitch refers to the forward or backward inclination of the wheel. When the wheel is balanced, the pitch will be close to zero. If the front of the wheel is tilting upward, it indicates a negative pitch value, and if it's tilting downward, it indicates a positive pitch value. Yaw represents the left or right rotation of the wheel. When the wheel is rolling in a straight line, the yaw value will be close to zero. If the wheel is veering to the left, it indicates a positive yaw value, and if it's veering to the right, it indicates a negative yaw value. Roll refers to the side-to-side tilt of the wheel. When the wheel is balanced, the roll value will be close to zero. If the wheel is tilting to the left, it indicates a positive roll value, and if it's tilting to the right, it indicates a negative roll value. If all pitch, yaw, and roll values are close to zero, the vehicle computing system 200 and/or display device 1610 may be configured to determine the wheel is balanced, and such information can be provided for presentation to a user (e.g., via a display device provided in the interior of the vehicle, via a smartphone, via the display screen of the display device 1610, etc.).

If the pitch value deviates significantly from zero, the vehicle computing system 200 and/or display device 1610 may be configured to determine the wheel is tilting either forward or backward, and such information can be provided for presentation to a user (e.g., via a display device provided in the interior of the vehicle, via a smartphone, via the display screen of the display device 1610, etc.).

If the yaw value deviates significantly from zero, the vehicle computing system 200 and/or display device 1610 may be configured to determine the wheel is veering to the left or right, and such information can be provided for presentation to a user (e.g., via a display device provided in the interior of the vehicle, via a smartphone, via the display screen of the display device 1610, etc.).

If the roll value deviates significantly from zero, the vehicle computing system 200 and/or display device 1610 may be configured to determine the wheel is tilting to the left or right, and such information can be provided for presentation to a user (e.g., via a display device provided in the interior of the vehicle, via a smartphone, via the display screen of the display device 1610, etc.).

The vehicle computing system 200 and/or display device 1610 may also be configured to determine a centripetal force acting on each of the wheels. As the vehicle's wheels turn, there will be a centripetal force acting on the wheel. This force can be estimated by analyzing the acceleration data along the radial direction of the wheel. The vehicle computing system 200 and/or display device 1610 may be configured to use a physics model to predict the centripetal force on each wheel, using data from the motion sensor unit 1620, for example. For example, in the equation $F=(m*\omega*r)/4$, F represents the centripetal force on each individual wheel, m is the mass of the vehicle, ω (omega) is the angular velocity of each wheel, and r is the radius of each wheel.

In this equation, the centripetal force of each wheel is determined by dividing the total centripetal force of the vehicle ($m*\omega*r$) by the number of wheels (in this case, four) to distribute the force evenly among the wheels. Based on this formula, the vehicle computing system 200 and/or display device 1610 may be configured to calculate the centripetal force acting on each individual wheel of the vehicle based on the given angular velocity, radius, and the mass of the vehicle.

In some implementations, when the vehicle is at 0 MPH (stationary), the vehicle wheel-based computing device (display device 1610) may be configured to display special effects, images, videos, etc. on a round display screen, attached to the rim of the wheel, or other wheel parts. The display device 1610 may be configured to receive a touch input and provide a special effect in response to receiving the touch input.

When the vehicle speed is greater than 0 MPH and less than a threshold speed value, the vehicle wheel-based computing device (display device 1610) may be configured to attempt to hold the image or video stable to the horizontal so a user viewing the wheel from an external viewpoint may see the image or video since it is being rotated at the same rate as the vehicle wheel is rotating.

When the vehicle speed is greater than the threshold speed value, the vehicle wheel-based computing device (display device 1610) may be configured to display other types of effects, images, and video that are visible when the wheel is rotating at higher angular velocities.

FIGS. 17A-17D illustrate example wheel rims to which a vehicle wheel-based computing device can be attached, according to example embodiments of the disclosure.

Figure 17A:
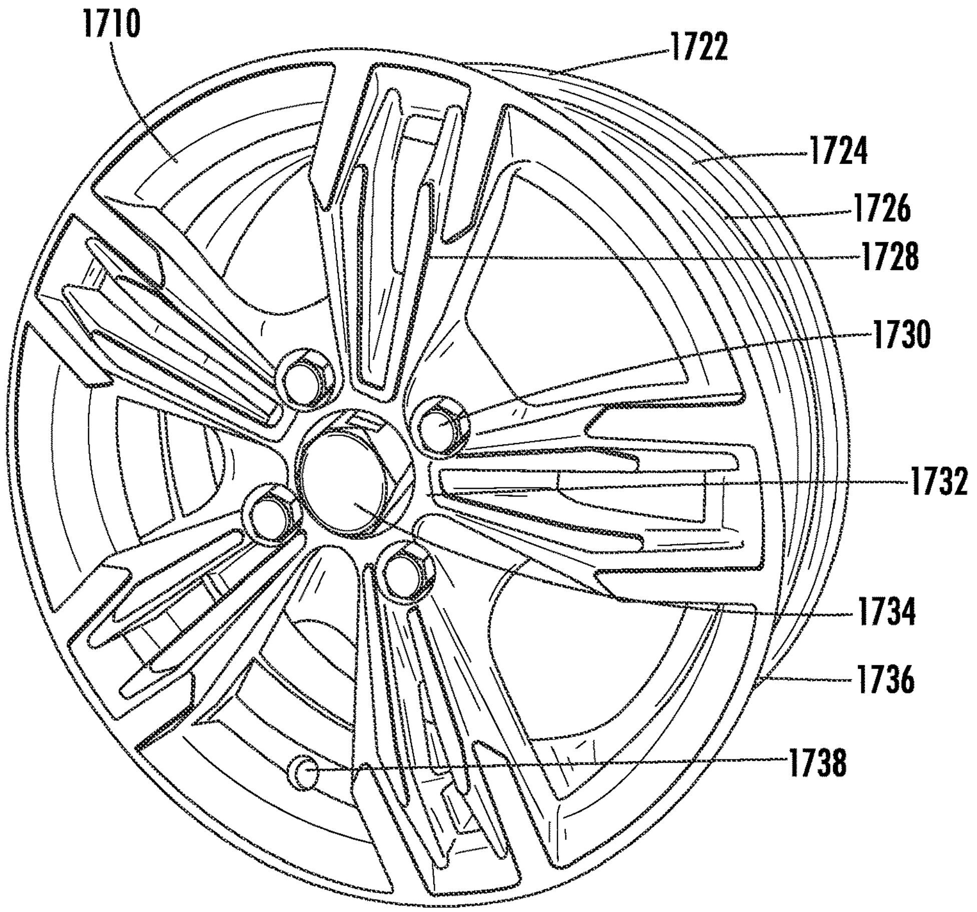
FIGS. 17A-17D illustrate example wheel rims to which a vehicle wheel-based computing device can be attached, according to example embodiments of the disclosure.

FIG. 17A illustrates an example wheel rim 1710 to which a vehicle wheel-based computing device can be attached, according to example embodiments of the disclosure. For example, the wheel rim 1710 may include an outboard flange 1722, mounting humps 1724, a drop center 1726, spokes 1728, lug hole bolts 1730, a bolt circle 1732, a center bore 1734, a rim 1736, and a valve stem 1738. In some implementations, the wheel rim 1710 can include a set of threads which protrude from an outside lip (e.g., the outboard flange 1722) of the wheel rim 1710 (e.g., one inch to two inches). In some implementations, a case or ring can be attached to the wheel rim 1710 via the set of threads. In some implementations, the vehicle wheel-based computing device can be attached to the wheel rim 1710 via coupling members (e.g., screws, bolts, locks, pins, etc.).

Figure 17B:
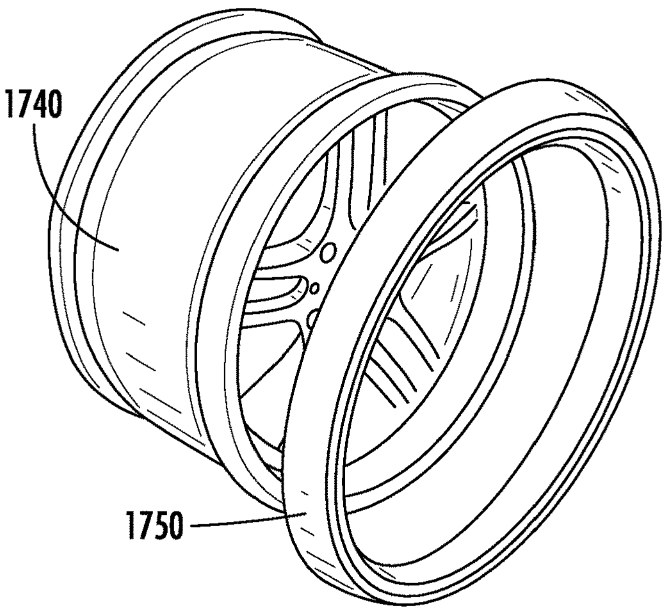

FIG. 17B illustrates an example ring which is attached to a wheel rim, according to example embodiments of the disclosure. For example, in FIG. 17B a ring-shaped device 1750 can be attached to wheel rim 1740 via one or more coupling members. The ring-shaped device 1750 may include one or more lighting elements (e.g., LED lights) to light an environment of the wheel rim 1740, one or more cameras to capture images of the environment, etc. For example, the ring-shaped device 1750 may include a female thread which matches a male thread on the outside part of the wheel rim 1740. In some implementations, the ring-shaped device 1750 may be attached to the wheel rim 1740 when the vehicle wheel-based computing device is removed from the wheel rim 1740. For example, the ring-shaped device 1750 may provide protection against the threads on the outside part of the wheel rim 1740 when the vehicle wheel-based computing device is removed from the wheel rim 1740. In some implementations, the ring-shaped device 1750 may be attached to the wheel rim 1740 when the vehicle wheel-based computing device is also attached to the wheel rim 1740.

Figure 17C:
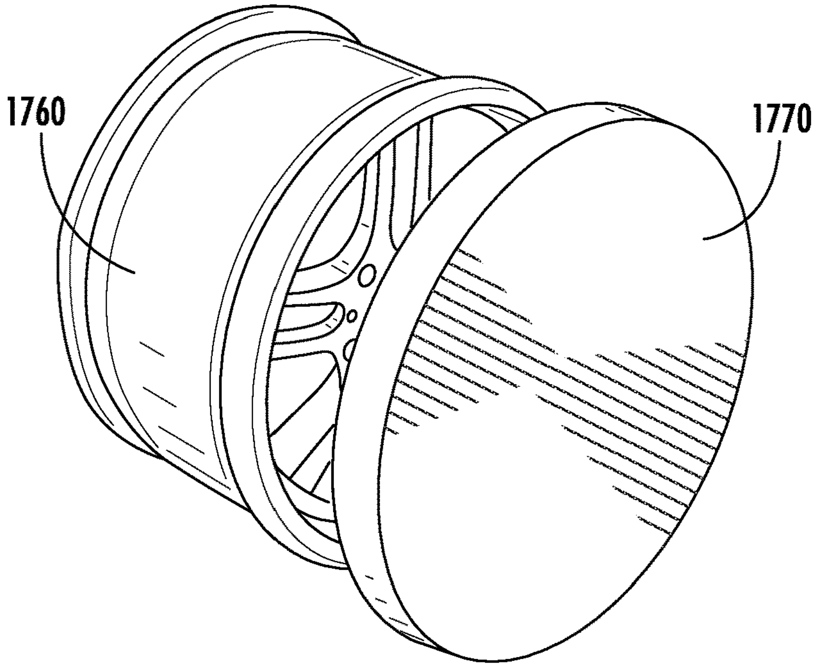

FIG. 17C illustrates an example vehicle wheel-based computing device which is attached to a wheel rim, according to example embodiments of the disclosure. For example, in FIG. 17C a vehicle wheel-based computing device 1770 can be attached to wheel rim 1760 via one or more coupling members. In some implementations, the vehicle wheel-based computing device 1770 can be screwed into place and locked with a key and/or pins. In some implementations, the vehicle wheel-based computing device 1770 can be sized to be disposed over the entire wheel rim 1760, except the tire, which may be left uncovered. Covering the entire wheel rim 1760 can provide aerodynamic improvements to the vehicle airflow.

Figure 17D:
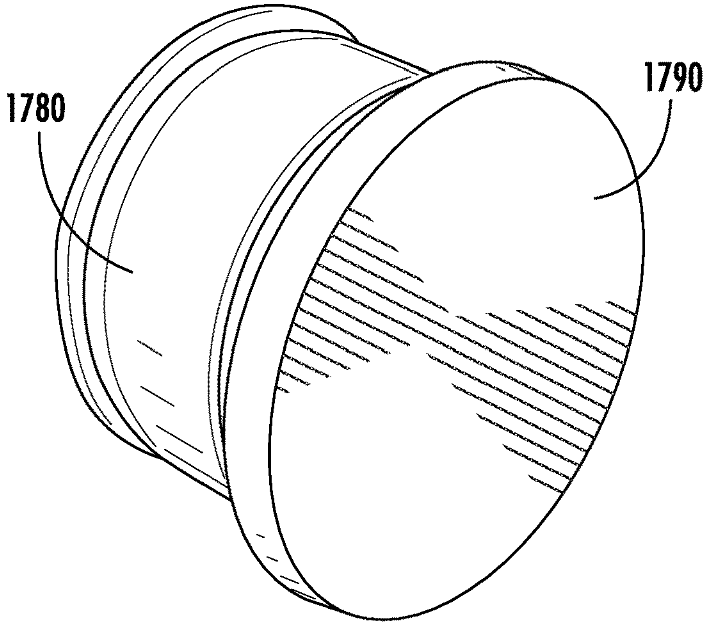

FIG. 17D illustrates an example vehicle wheel-based computing device accessory cover which is attached to a wheel rim, according to example embodiments of the disclosure. For example, in FIG. 17D a vehicle wheel-based computing device accessory cover 1790 can be attached to wheel rim 1780 via one or more coupling members. In some implementations, the vehicle wheel-based computing device accessory cover 1790 can include a see-through plastic so that the wheel rim 1780 is visible, while still covering the wheel rim 1780 to provide aerodynamic improvements to the vehicle airflow.

Figure 18A:
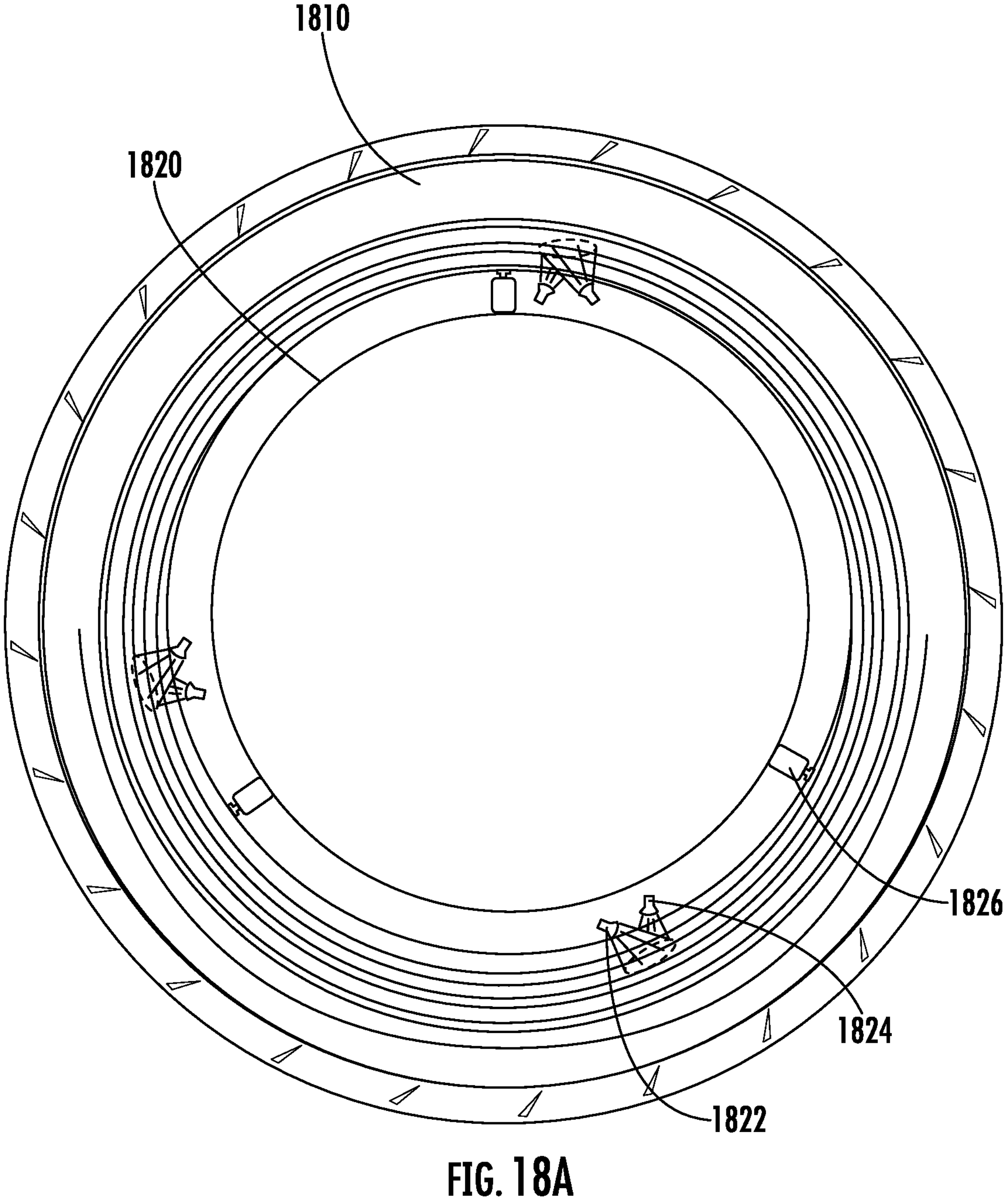
FIGS. 18A-18D illustrate example vehicle wheel-based computing devices, according to example embodiments of the disclosure.

FIGS. 18A-18D illustrate example vehicle wheel-based computing devices, according to example embodiments of the disclosure. FIG. 18A illustrates a wheel 1810 including a round display device 1820. In some implementations, the round display device 1820 can be a tablet-like device. For instance, the display device 1820 can include a display screen, control circuit, battery, sensors, cameras, lighting elements, and the like, as described with respect to the display device 805 of FIG. 8. In FIG. 18A, one or more cameras 1826 may be positioned circumferentially about an outside portion of the display device 1820. In some implementations, the one or more cameras 1826 may be wide angle cameras. In some implementations, one or more cameras 1826 may face outward (e.g., in an axial direction perpendicular to the radial and circumferential direction of the display device 1820) to capture the environment (the road, pedestrians, curbs, etc.). In some implementations, the one or more cameras 1826 may face in a radial direction of the display device 1820 to capture part of the tire and part of the environment (e.g., the sky, the road, etc.) as the wheel 1810 turns. For example, the one or more cameras 1826 can be positioned on an edge of the display device 1820. For example, the one or more cameras 1826 can be enclosed in a case which encloses the display device 1820, the case having a small window to allow the one or more cameras 1826 to capture imagery in its field of view. In some implementations, a plurality of cameras can be provided. For example, as shown in FIG. 18A three cameras are circumferentially disposed about an outside portion of the display device 1820. If each camera has a field of view of 120 degrees, a view of 360 degrees of the tire can be captured by the cameras. For example, if four cameras are circumferentially disposed about an outside portion of the display device 1820 and each camera has at least a field of view of 90 degrees, a view of 360 degrees of the tire can be captured by the cameras. Imagery which is captured by the one or more cameras 1826 which can be positioned so as to face the tire and/or road can be transmitted to a display device provided in the interior of the vehicle to allow an occupant of the vehicle to view the road conditions and conditions of the tire visually in the cockpit of the vehicle.

As illustrated in FIG. 18A, lighting elements 1822, 1824 can also be provided circumferentially about an outside portion of the display device 1820. For example, the lighting elements 1822, 1824 can be positioned on an edge of the display device 1820. For example, the lighting elements 1822, 1824 can be enclosed in a case which encloses the display device 1820, the case having a small window to allow the lighting elements 1822, 1824 to emit or project light through the window to the outside. For example, the lighting emitted by the lighting elements 1822, 1824 can be used to illuminate the roadway, curb, or other environmental features such that the one or more cameras 1826 have sufficient lighting to capture tire and road conditions at night. For example, the lighting can be used to illuminate the areas around the wheel. The lighting elements 1822, 1824 can be integrated with the display device 1820 or provided separately from the display device 1820. In some implementations, the lighting elements 1822, 1824 can be controlled by the vehicle wheel-based computing device to emit light in coordination with the display device 1820. For example, the lighting elements 1822, 1824 can be configured to illuminate the tires with colors or other effects that are related to content being displayed on the display device 1820. For example, the lighting elements 1822, 1824 may be LED lighting elements. For example, if the display device 1820 has a background color of a red haze, then the lighting elements 1822, 1824 can be configured to emit a similar color such that the tire is illuminated with the same color as the video on the display device 1820. In some implementations, the lighting elements 1822, 1824 can be integrated into the vehicle onboard system (vehicle computing system 200) and/or vehicle wheel-based computing device so a user can choose different lighting configurations from the cockpit.

Figure 18B:
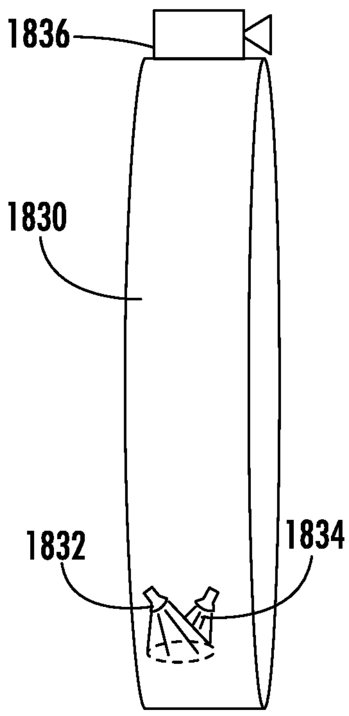

FIG. 18B illustrates an example round display device 1830. In some implementations, the round display device 1830 can be a tablet-like device. For instance, the display device 1830 can include a display screen, control circuit, battery, sensors, lighting elements, cameras, and the like, as described with respect to the display device 805 of FIG. 8. In FIG. 18B, one or more cameras 1836 may be positioned circumferentially about an outside portion of the display device 1830. The example of FIG. 18B illustrates that the one or more cameras 1836 can face outward (e.g., in an axial direction perpendicular to the radial and circumferential direction of the display device 1830) to capture the environment (the road, pedestrians, curbs, etc.). As illustrated in FIG. 18B, lighting elements 1832, 1834 can also be provided circumferentially about an outside portion of the display device 1830, similar to the lighting elements 1822, 1824 described with respect to FIG. 18A.

Figure 18C:
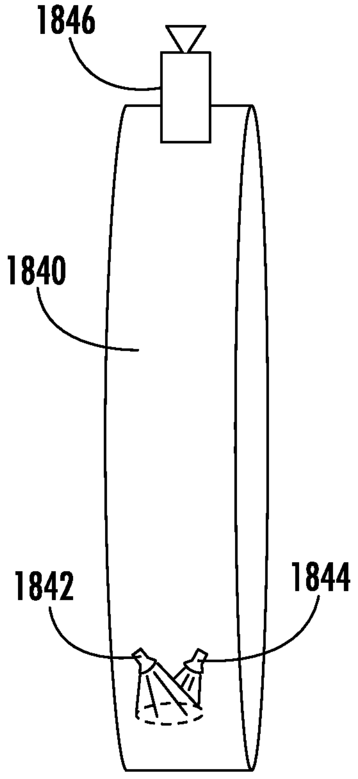

FIG. 18C illustrates an example round display device 1840. In some implementations, the round display device 1840 can be a tablet-like device. For instance, the display device 1840 can include a display screen, control circuit, battery, sensors, lighting elements, cameras, and the like, as described with respect to the display device 805 of FIG. 8. In FIG. 18C, one or more cameras 1846 may be positioned circumferentially about an outside portion of the display device 1840. The example of FIG. 18C illustrates that the one or more cameras 1846 can face outward (e.g., in a radial direction perpendicular to the axial and circumferential direction of the display device 1840) to capture part of the tire and part of the environment (e.g., the sky, the road, etc.) as the wheel, to which the display device 1840 is fixed, turns. As illustrated in FIG. 18C, lighting elements 1842, 1844 can also be provided circumferentially about an outside portion of the display device 1840, similar to the lighting elements 1822, 1824 described with respect to FIG. 18A.

Figure 18D:
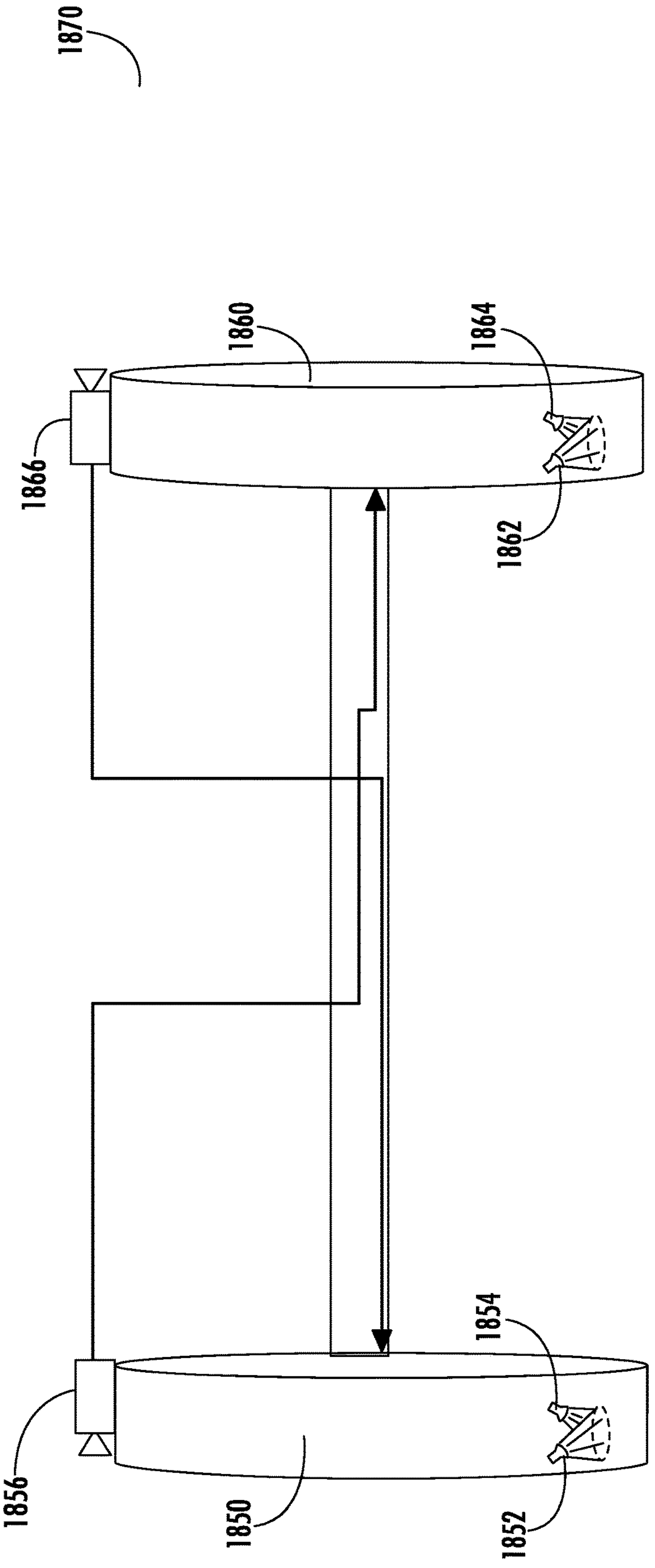

FIG. 18D illustrates an example implementation of two round display devices 1850, 1860. In some implementations, the round display devices 1850, 1860 can be a tablet-like device. For instance, each of the display devices 1850, 1860 can include a display screen, control circuit, battery, sensors, lighting elements, cameras, and the like, as described with respect to the display device 805 of FIG. 8. In FIG. 18D, one or more cameras 1856 may be positioned circumferentially about an outside portion of the display device 1850 and one or more cameras 1866 may be positioned circumferentially about an outside portion of the display device 1860. The example of FIG. 18D illustrates that the one or more cameras 1856 can face outward in a first axial direction (e.g., in a direction perpendicular to the radial and circumferential direction of the display device 1850) to capture the environment (the road, pedestrians, curbs, etc.) and the one or more cameras 1866 can face outward in a second axial direction opposite of the first axial direction (e.g., in a direction perpendicular to the radial and circumferential direction of the display device 1860) to capture the environment (the road, pedestrians, curbs, etc.). As illustrated in FIG. 18D, lighting elements 1852, 1854 can also be provided circumferentially about an outside portion of the display device 1850 and lighting elements 1862, 1864 can also be provided circumferentially about an outside portion of the display device 1860, similar to the lighting elements 1822, 1824 described with respect to FIG. 18A.

In FIG. 18D, the imagery that is captured by one or more cameras 1856 can be transmitted (e.g., in a wired or wireless manner) and presented for display on the display screen of the display device 1860 such that when a user 1870 views the display device 1860 it appears as though the user is seeing through the wheel to which display device 1860 is fixed. Likewise, imagery that is captured by one or more cameras 1866 can be transmitted (e.g., in a wired or wireless manner) and presented for display on the display screen of the display device 1850 such that when a user 1870 views the display device 1850 it appears as though the user is seeing through the wheel to which display device 1850 is fixed.

Figure 19:
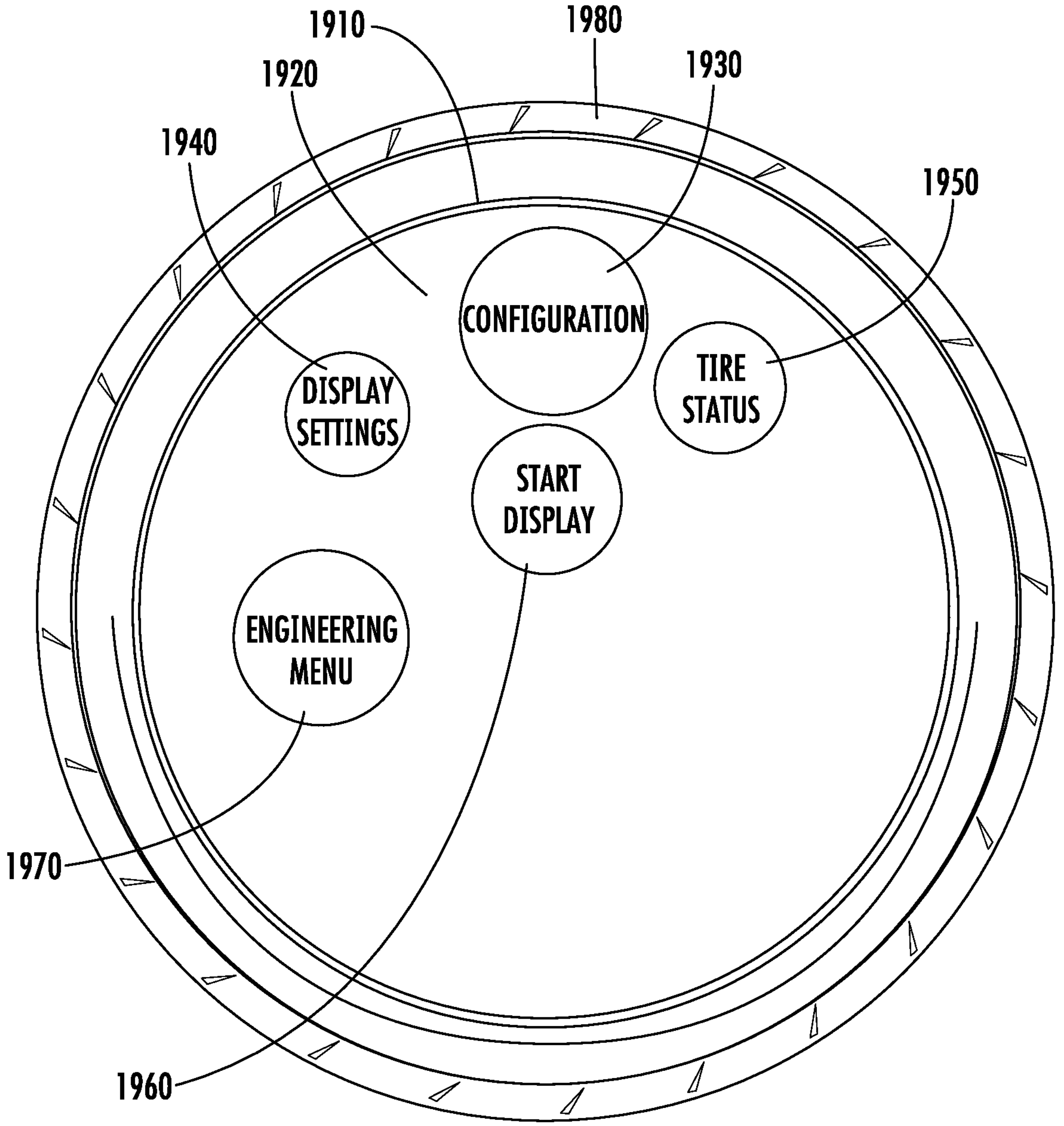
FIG. 19 illustrates an example user interface screen displayed on a display screen of a vehicle wheel-based computing device, according to example embodiments disclosed herein.

FIG. 19 illustrates an example user interface screen displayed on a display screen of a vehicle wheel-based computing device, according to example embodiments disclosed herein. As shown in FIG. 19, a vehicle wheel-based computing device 1910 is mounted to a wheel 1980 and includes a user interface screen 1920 which is displayed on a display screen of the vehicle wheel-based computing device 1910. For example, the example user interface screen 1920 may be displayed by any of the example vehicle wheel-based computing devices described herein. For example, the display screen of the vehicle wheel-based computing device 1910 may be a touch screen. For example, various menus may be presented for display on the user interface screen 1920 to perform various operations. For example, a configuration 1930 option may be presented to enable a user to calibrate sensors and configure various settings include network configurations, WiFi configurations, Bluetooth configurations, battery configurations, etc. For example, a display settings 1940 option may be presented to adjust or set various display screen settings including a brightness level, a contrast level, set LED configurations, etc. For example, a tire status 1950 option may be presented to enable a user to obtain instant information about the tires, including pressure information, temperature information, wear information, tire type information, model size, etc. For example, a start display option 1960 may be presented to connect with an onboard vehicle computer (e.g., vehicle computing system 200). For example, an engineering menu option 1970 may be presented to enable a user to adjust settings relating to the presentation of images on the display screen of the vehicle wheel-based computing device 1910. For example, various options may be presented to adjust or update driver settings of the display driver. Other menu options may also be provided and the above example are merely example options and are not intended to limit the disclosure.

Figure 20:
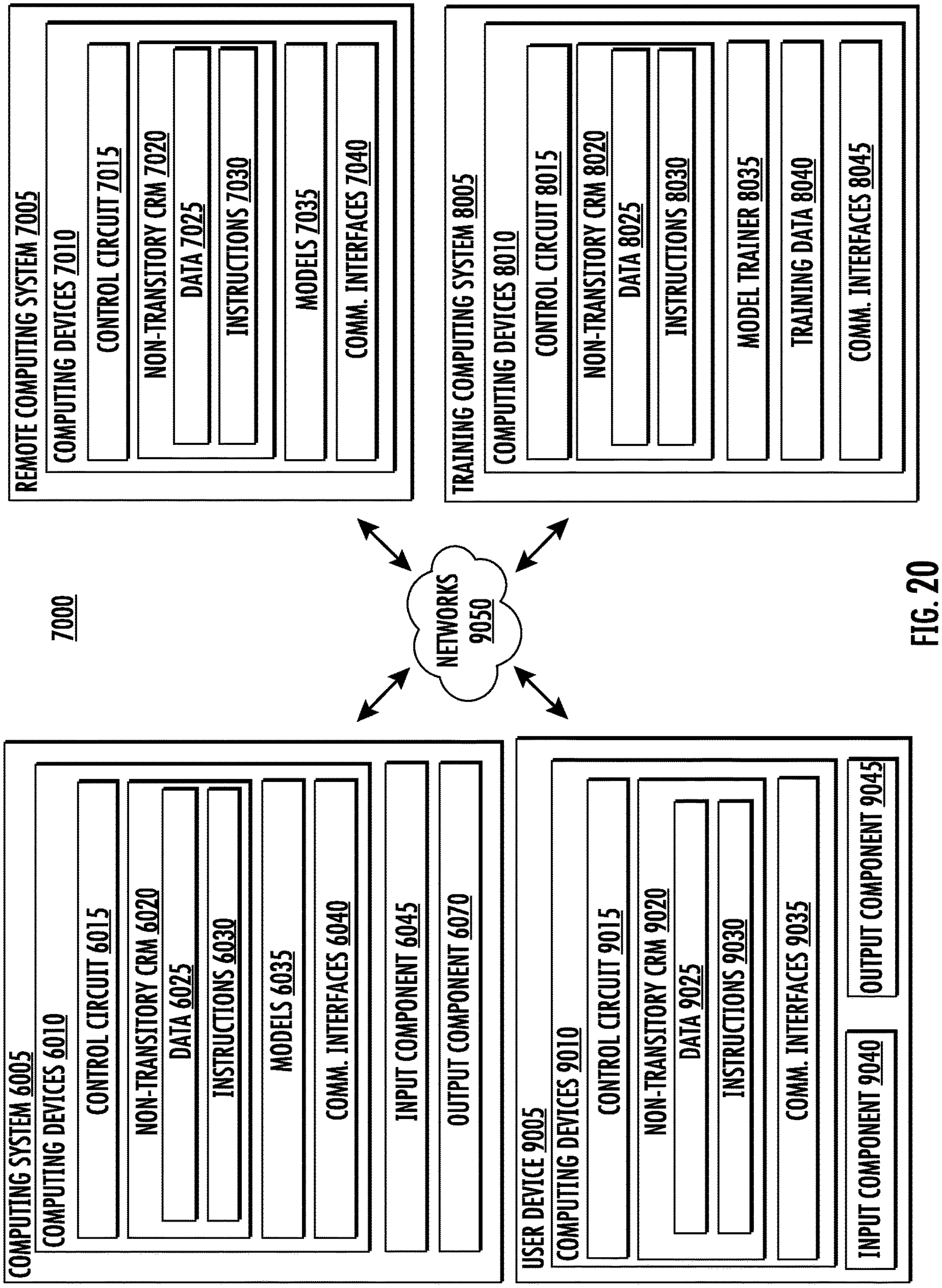
FIG. 20 illustrates a diagram of an example computing ecosystem with computing components according to example embodiments disclosed herein.

FIG. 20 illustrates a block diagram of an example computing system 7000 according to an embodiment hereof. The system 7000 includes a computing system 6005 (e.g., a computing system onboard a vehicle), a remote computing system 7005 (e.g., a server computing system, cloud computing platform), a user device 9005 (e.g., a user's mobile device), and a training computing system 8005 that are communicatively coupled over one or more networks 9050.

The computing system 6005 may include one or more computing devices 6010 or circuitry. For instance, the computing system 6005 may include a control circuit 6015 and a non-transitory computer-readable medium 6020, also referred to herein as memory. In an embodiment, the control circuit 6015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 6015 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 6015 may be programmed by one or more computer-readable or computer-executable instructions stored on the non-transitory computer-readable medium 6020.

In an embodiment, the non-transitory computer-readable medium 6020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 6020 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 6020 may store information that may be accessed by the control circuit 6015. For instance, the non-transitory computer-readable medium 6020 (e.g., memory devices) may store data 6025 that may be obtained, received, accessed, written, manipulated, created, and/or stored. The data 6025 may include, for instance, any of the data or information described herein. In some implementations, the computing system 6005 may obtain data from one or more memories that are remote from the computing system 6005.

The non-transitory computer-readable medium 6020 may also store computer-readable instructions 6030 that may be executed by the control circuit 6015. The instructions 6030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 6015 to perform one or more functional tasks. The modules and computer-readable/executable instructions may be described as performing various operations or tasks when the control circuit 6015 or other hardware component is executing the modules or computer-readable instructions.

The instructions 6030 may be executed in logically and/or virtually separate threads on the control circuit 6015. For example, the non-transitory computer-readable medium 6020 may store instructions 6030 that when executed by the control circuit 6015 cause the control circuit 6015 to perform any of the operations, methods and/or processes described herein. In some cases, the non-transitory computer-readable medium 6020 may store computer-executable instructions or computer-readable instructions, such as instructions to perform at least a portion of the methods of FIG. 13 and FIG. 14.

In an embodiment, the computing system 6005 may store or include one or more machine-learned models 6035. For example, the machine-learned models 6035 may be or may otherwise include various machine-learned models, including machine-learned generative models (e.g., the machine-learned generative model 620 of FIGS. 6A-6B). In an embodiment, the machine-learned models 6035 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models). As another example, the machine-learned models 6035 can include generative models, such as stable diffusion models, generative adversarial networks (GAN), GPT models, and other suitable models.

In an aspect of the disclosure, the models 6035 may be used to produce generated content for a wheel hub display device (e.g., vehicle wheel-based computing device 800 including display device 805). For example, the machine-learned models 6035 can, in response to user input data descriptive of content to be displayed on the wheel hub display device, produce generated content to be displayed on that wheel hub display device according to the description provided by the user input data.

In an embodiment, the one or more machine-learned models 6035 may be received from the server computing system 7005 over networks 9050, stored in the computing system 6005 (e.g., non-transitory computer-readable medium 6020), and then used or otherwise implemented by the control circuit 6015. In an embodiment, the computing system 6005 may implement multiple parallel instances of a single model.

Additionally, or alternatively, one or more machine-learned models 6035 may be included in or otherwise stored and implemented by the remote computing system 7005 that communicates with the computing system 6005 according to a client-server relationship. For example, the machine-learned models 6035 may be implemented by the server computing system 7005 as a portion of a web service. Thus, one or more models 6035 may be stored and/or implemented (e.g., as models 7035) at the computing system 6005 and/or one or more models 6035 may be stored and implemented at the remote computing system 7005.

The computing system 6005 may include one or more communication interfaces 6040. The communication interfaces 6040 may be used to communicate with one or more other systems. The communication interfaces 6040 may include any circuits, components, software, etc. for communicating via one or more networks (e.g., networks 9050). In some implementations, the communication interfaces 6040 may include for example, one or more of a communications controller, receiver, transceiver, transmitter, port, conductors, software and/or hardware for communicating data/information.

The computing system 6005 may also include one or more user input components 6045 that receives user input. For example, the user input component 6045 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 6005 may include one or more output components 6050. The output components 6050 may include hardware and/or software for audibly or visually producing content. For instance, the output components 6050 may include one or more speakers, earpieces, headsets, handsets, etc. The output components 6050 may include a display device, which may include hardware for displaying a user interface and/or messages for a user. By way of example, the output component 6050 may include a display screen, CRT, LCD, plasma screen, touch screen, TV, projector, tablet, and/or other suitable display components.

The server computing system 7005 may include one or more computing devices 7010. In an embodiment, the server computing system 7005 may include or is otherwise implemented by one or more server computing devices. In instances in which the server computing system 7005 includes plural server computing devices, such server computing devices may operate according to sequential computing architectures, parallel computing architectures, or some combination thereof.

The server computing system 7005 may include a control circuit 7015 and a non-transitory computer-readable medium 7020, also referred to herein as memory 7020. In an embodiment, the control circuit 7015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 7015 may be programmed by one or more computer-readable or computer-executable instructions stored on the non-transitory computer-readable medium 7020.

In an embodiment, the non-transitory computer-readable medium 7020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 7020 may store information that may be accessed by the control circuit 7015. For instance, the non-transitory computer-readable medium 7020 (e.g., memory devices) may store data 7025 that may be obtained, received, accessed, written, manipulated, created, and/or stored. The data 7025 may include, for instance, any of the data or information described herein. In some implementations, the server computing system 7005 may obtain data from one or more memories that are remote from the server computing system 7005.

The non-transitory computer-readable medium 7020 may also store computer-readable instructions 7030 that may be executed by the control circuit 7015. The instructions 7030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 7015 to perform one or more functional tasks. The modules and computer-readable/executable instructions may be described as performing various operations or tasks when the control circuit 7015 or other hardware component is executing the modules or computer-readable instructions.

The instructions 7030 may be executed in logically and/or virtually separate threads on the control circuit 7015. For example, the non-transitory computer-readable medium 7020 may store instructions 7030 that when executed by the control circuit 7015 cause the control circuit 7015 to perform any of the operations, methods and/or processes described herein. In some cases, the non-transitory computer-readable medium 7020 may store computer-executable instructions or computer-readable instructions, such as instructions to perform at least a portion of the methods of FIG. 13 and FIG. 14.

The server computing system 7005 may include one or more communication interfaces 7040. The communication interfaces 7040 may be used to communicate with one or more other systems. The communication interfaces 7040 may include any circuits, components, software, etc. for communicating via one or more networks (e.g., networks 7050). In some implementations, the communication interfaces 7040 may include for example, one or more of a communications controller, receiver, transceiver, transmitter, port, conductors, software and/or hardware for communicating data/information.

The computing system 6005 and/or the server computing system 7005 may train the models 6035, 7035 via interaction with the training computing system 8005 that is communicatively coupled over the networks 9050. The training computing system 8005 may be separate from the server computing system 7005 or may be a portion of the server computing system 7005.

The training computing system 8005 may include one or more computing devices 8010. In an embodiment, the training computing system 8005 may include or is otherwise implemented by one or more server computing devices. In instances in which the training computing system 8005 includes plural server computing devices, such server computing devices may operate according to sequential computing architectures, parallel computing architectures, or some combination thereof.

The training computing system 8005 may include a control circuit 8015 and a non-transitory computer-readable medium 8020, also referred to herein as memory 8020. In an embodiment, the control circuit 8015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 8015 may be programmed by one or more computer-readable or computer-executable instructions stored on the non-transitory computer-readable medium 8020.

In an embodiment, the non-transitory computer-readable medium 8020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 8020 may store information that may be accessed by the control circuit 8015. For instance, the non-transitory computer-readable medium 8020 (e.g., memory devices) may store data 8025 that may be obtained, received, accessed, written, manipulated, created, and/or stored. The data 8025 may include, for instance, any of the data or information described herein. In some implementations, the training computing system 8005 may obtain data from one or more memories that are remote from the training computing system 8005.

The non-transitory computer-readable medium 8020 may also store computer-readable instructions 8030 that may be executed by the control circuit 8015. The instructions 8030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 8015 to perform one or more functional tasks. The modules and computer-readable/executable instructions may be described as performing various operations or tasks when the control circuit 8015 or other hardware component is executing the modules or computer-readable instructions.

The instructions 8030 may be executed in logically or virtually separate threads on the control circuit 8015. For example, the non-transitory computer-readable medium 8020 may store instructions 8030 that when executed by the control circuit 8015 cause the control circuit 8015 to perform any of the operations, methods and/or processes described herein. In some cases, the non-transitory computer-readable medium 8020 may store computer-executable instructions or computer-readable instructions, such as instructions to perform at least a portion of the methods of FIG. 13 and FIG. 14.

The training computing system 8005 may include a model trainer 8035 that trains the machine-learned models 6035, 7035 stored at the computing system 6005 and/or the remote computing system 7005 using various training or learning techniques. For example, the models 6035, 7035 (e.g., a machine-learned generative model) may be trained using a loss function that evaluates quality of generated samples over various characteristics, such as similarity to the training data.

The training computing system 8005 may modify parameters of the models 6035, 7035 (e.g., a machine-learned clustering model) based on the loss function (e.g., generative loss function) such that the models 6035, 7035 may be effectively trained for specific applications in a supervised manner using labeled data and/or in an unsupervised manner.

In an example, the model trainer 8035 may backpropagate the loss function through the machine-learned clustering model to modify the parameters (e.g., weights) of the generative model (e.g., 620). The model trainer 8035 may continue to backpropagate the clustering loss function through the machine-learned model, with or without modification of the parameters (e.g., weights) of the model. For instance, the model trainer 8035 may perform a gradient descent technique in which parameters of the machine-learned model may be modified in a direction of a negative gradient of the clustering loss function. Thus, in an embodiment, the model trainer 8035 may modify parameters of the machine-learned model based on the loss function.

The model trainer 8035 may utilize training techniques, such as backwards propagation of errors. For example, a loss function may be backpropagated through a model to update one or more parameters of the models (e.g., based on a gradient of the loss function). Various loss functions may be used such as mean squared error, likelihood loss, cross entropy loss, hinge loss, and/or various other loss functions. Gradient descent techniques may be used to iteratively update the parameters over a number of training iterations.

In an embodiment, performing backwards propagation of errors may include performing truncated backpropagation through time. The model trainer 8035 may perform a number of generalization techniques (e.g., weight decays, dropouts, etc.) to improve the generalization capability of a model being trained. In particular, the model trainer 8035 may train the machine-learned models 6035, 7035 based on a set of training data 8040.

The training data 8040 may include unlabeled training data for training in an unsupervised fashion. Furthermore, in some implementations, the training data 8040 can include labeled training data for training in a supervised fashion. For example, the training data 8040 can be or can include the training data 610 of FIG. 6A.

In an embodiment, if the user has provided consent/authorization, training examples may be provided by the computing system 6005 (e.g., of the user's vehicle). Thus, in such implementations, a model 6035 provided to the computing system 6005 may be trained by the training computing system 8005 in a manner to personalize the model 6035.

The model trainer 8035 may include computer logic utilized to provide desired functionality. The model trainer 8035 may be implemented in hardware, firmware, and/or software controlling a general-purpose processor. For example, in an embodiment, the model trainer 8035 may include program files stored on a storage device, loaded into a memory and executed by one or more processors. In other implementations, the model trainer 8035 may include one or more sets of computer-executable instructions that are stored in a tangible computer-readable storage medium such as RAM, hard disk, or optical or magnetic media.

The training computing system 8005 may include one or more communication interfaces 8045. The communication interfaces 8045 may be used to communicate with one or more other systems. The communication interfaces 8045 may include any circuits, components, software, etc. for communicating via one or more networks (e.g., networks 9050). In some implementations, the communication interfaces 8045 may include for example, one or more of a communications controller, receiver, transceiver, transmitter, port, conductors, software and/or hardware for communicating data/information.

The computing system 6005, the remote computing system 7005, and/or the training computing system 8005 may also be in communication with a user device 9005 that is communicatively coupled over the networks 9050.

The user device 9005 may include one or more computing devices 9010. The user device 9005 may include a control circuit 9015 and a non-transitory computer-readable medium 9020, also referred to herein as memory 9020. In an embodiment, the control circuit 9015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 9015 may be programmed by one or more computer-readable or computer-executable instructions stored on the non-transitory computer-readable medium 9020.

In an embodiment, the non-transitory computer-readable medium 9020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 9020 may store information that may be accessed by the control circuit 9015. For instance, the non-transitory computer-readable medium 9020 (e.g., memory devices) may store data 9025 that may be obtained, received, accessed, written, manipulated, created, and/or stored. The data 9025 may include, for instance, any of the data or information described herein. In some implementations, the user device 9005 may obtain data from one or more memories that are remote from the user device 9005.

The non-transitory computer-readable medium 9020 may also store computer-readable instructions 9030 that may be executed by the control circuit 9015. The instructions 9030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 9015 to perform one or more functional tasks. The modules and computer-readable/executable instructions may be described as performing various operations or tasks when the control circuit 9015 or other hardware component is executing the modules or computer-readable instructions.

The instructions 9030 may be executed in logically or virtually separate threads on the control circuit 9015. For example, the non-transitory computer-readable medium 9020 may store instructions 9030 that when executed by the control circuit 9015 cause the control circuit 9015 to perform any of the operations, methods and/or processes described herein. In some cases, the non-transitory computer-readable medium 9020 may store computer-executable instructions or computer-readable instructions, such as instructions to perform at least a portion of the methods of FIG. 13 and FIG. 14.

The user device 9005 may include one or more communication interfaces 9035. The communication interfaces 9035 may be used to communicate with one or more other systems. The communication interfaces 9035 may include any circuits, components, software, etc. for communicating via one or more networks (e.g., networks 7050). In some implementations, the communication interfaces 9035 may include for example, one or more of a communications controller, receiver, transceiver, transmitter, port, conductors, software and/or hardware for communicating data/information.

The user device 9005 may also include one or more user input components 9040 that receives user input. For example, the user input component 9040 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The user device 9005 may include one or more output components 9045. The output components 9045 may include hardware and/or software for audibly or visually producing content. For instance, the output components 9045 may include one or more speakers, earpieces, headsets, handsets, etc. The output components 9045 may include a display device, which may include hardware for displaying a user interface and/or messages for a user. By way of example, the output component 9045 may include a display screen, CRT, LCD, plasma screen, touch screen, TV, projector, tablet, and/or other suitable display components.

The one or more networks 9050 may be any type of communications network, such as a local area network (e.g., intranet), wide area network (e.g., Internet), or some combination thereof and may include any number of wired or wireless links. In general, communication over a network 9050 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Additional Discussion of Various Embodiments

Embodiment 1 relates to a vehicle wheel-based computing device. The vehicle wheel-based computing device may include a display device configured for at least partial attachment to a wheel of a vehicle and a control circuit. The control circuit may be configured to: obtain content to be provided for presentation on a display screen of the display device, receive vehicle data indicating a motion parameter associated with the vehicle, and perform a transformation of the content based on: (i) a refresh rate associated with the display device, and (ii) the motion parameter associated with the vehicle.

Embodiment 2 includes the vehicle wheel-based computing device of Embodiment 1. In this embodiment, the transformation includes a rotation of the content in a direction opposite of a rotation direction of the wheel.

Embodiment 3 includes the vehicle wheel-based computing device of any of embodiments 1 or 2. In this embodiment, the display device is circular-shaped.

Embodiment 4 includes the vehicle wheel-based computing device of any of embodiments 1 to 3. In this embodiment, the display device covers a rim of the wheel.

Embodiment 5 includes the vehicle wheel-based computing device of any of embodiments 1 to 4. In this embodiment, the display device is integrated into the wheel.

Embodiment 6 includes the vehicle wheel-based computing device of any of embodiments 1 to 4. In this embodiment, the display device is configured to be detachable from the wheel and attachable to the wheel.

Embodiment 7 includes the vehicle wheel-based computing device of any of embodiments 1 to 6. In this embodiment, the control circuit is configured to render the content to be provided for presentation on the display screen of the display device, the content being generated at least partially via one or more machine-learned models, wherein the one or more machine-learned models include one or more machine-learned generative models trained based on training data indicative of a plurality of wheel-based features.

Embodiment 8 includes the computing system of any of embodiments 1 to 7. In this embodiment, the motion parameter includes at least one of a speed of the vehicle, an angular velocity of the wheel, revolutions per minute of the wheel, a heading of the wheel or the vehicle, or an acceleration of the vehicle.

Embodiment 9 includes the vehicle wheel-based computing device of any of embodiments 1 to 8. In this embodiment, the vehicle wheel-based computing device further includes a motion sensor configured to obtain the vehicle data, and the vehicle data includes at least one of accelerometer data associated with the display device, gyroscope data associated with the display device, wheel torque data, or brake torque data.

Embodiment 10 includes the vehicle wheel-based computing device of any of embodiments 1 to 9. In this embodiment, the motion parameter includes an angular velocity of the display device and the transformation includes a rotation of the content. When the angular velocity of the display device is less than a threshold angular velocity value, the control circuit is configured to rotate the content at a rotation rate which matches the angular velocity of the display device, and when the angular velocity of the display device is more than the threshold angular velocity value, the content corresponds to a static image and the control circuit is configured to provide the static image for presentation on the display screen of the display device.

Embodiment 11 includes the vehicle wheel-based computing device of any of embodiments 1 to 9. In this embodiment, the motion parameter includes an angular velocity of the display device and the transformation includes a rotation of the content. When the angular velocity of the display device is less than a threshold angular velocity value, the control circuit is configured to rotate the content at a rotation rate which matches the angular velocity of the display device, and when the angular velocity of the display device is more than the threshold angular velocity value, the content corresponds to a video stream and the control circuit is configured to provide the video stream for presentation on the display screen of the display device which appears stationary on the display device.

Embodiment 12 includes the vehicle wheel-based computing device of any of embodiments 1 to 11. In this embodiment, the control circuit is configured to obtain an image captured by a camera disposed at the vehicle, and to provide for presentation on the display screen of the display device an augmented-reality image which includes one or more virtual objects which are overlaid on the image captured by the camera.

Embodiment 13 includes the vehicle wheel-based computing device of any of embodiments 1 to 12. In this embodiment, to perform the transformation of the content the control circuit is configured to rotate the content to match an angular velocity of the display device such that an orientation of the content presented on the display device is maintained.

Embodiment 14 includes the vehicle wheel-based computing device of any of embodiments 1 to 13. In this embodiment, the content to be provided for presentation on the display screen of the display device includes an animation including a plurality of image frames, and to perform the transformation of the content, the control circuit is configured to rotate one or more of the image frames to maintain, while the animation is provided for presentation on the display screen of the display device during rotation of the wheel, an orientation of the animation as it appears from a viewpoint external to the vehicle.

Embodiment 15 includes the vehicle wheel-based computing device of any of embodiments 1 to 14. In this embodiment, the control circuit is configured to: obtain motion data associated with the display device based on one or more sensors integrated with the display device, and transmit the motion data to an infotainment system of the vehicle to provide for display within the vehicle a representation of the display screen of the display device based on the motion data.

Embodiment 16 relates to a computer-implemented method. The method can include obtaining, by a vehicle wheel-based computing device, content to be provided for presentation on a display screen of a display device, the display device being configured for at partial attachment to a wheel of a vehicle; receiving, by the vehicle wheel-based computing device, vehicle data indicating a motion parameter associated with the vehicle; and performing, by the vehicle wheel-based computing device, a transformation of the content based on: (i) a refresh rate associated with the display device, and (ii) the motion parameter associated with the vehicle.

Embodiment 17 includes the method of embodiment 16. In this embodiment, the method further includes rendering, by the vehicle wheel-based computing device, the content to be provided for presentation on the display screen of the display device, the content being generated at least partially via one or more machine-learned models, wherein the one or more machine-learned models include one or more machine-learned generative models trained based on training data indicative of a plurality of wheel-based features.

Embodiment 18 is directed to a vehicle. The vehicle includes a wheel and a vehicle wheel-based computing device. The vehicle wheel-based computing device includes: a display device configured for at least partial attachment to the wheel, and a control circuit configured to: obtain content to be provided for presentation on a display screen of the display device, receive vehicle data indicating a motion parameter associated with the vehicle, and perform a transformation of the content based on: (i) a refresh rate associated with the display device, and (ii) the motion parameter associated with the vehicle.

Embodiment 19 includes the vehicle of Embodiment 18. In this embodiment, the transformation includes a rotation of the content in a direction opposite of a rotation direction of the wheel.

Embodiment 20 includes the vehicle of any of embodiments 18 or 19. In this embodiment, the display device is circular-shaped and covers a rim of the wheel.

Embodiment 21 includes the vehicle of any of embodiments 18 to 20. In this embodiment, the control circuit is configured to receive an input requesting content to be provided for presentation on the display screen of the display device, and to render the content to be provided for presentation on the display screen of the display device based on the input, the content being rendered at least partially via one or more machine-learned models, wherein the one or more machine-learned models include one or more machine-learned generative models trained based on training data indicative of a plurality of wheel-based features.

Embodiment 22 includes the vehicle of any of embodiments 18 to 21. In this embodiment, the motion parameter includes an angular velocity of the display device, the display device includes a motion sensor configured to measure motion data associated with the display device, and the control circuit is configured to determine the angular velocity of the display device based on the motion data.

Embodiment 23 includes the vehicle of any of embodiments 18 to 22. In this embodiment, the vehicle further includes a charging system disposed proximate to the display device, the charging system being configured to transfer power wirelessly to a power source of the display device.

ADDITIONAL DISCLOSURE

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the subject matter of the disclosure has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the subject matter as would be readily apparent to one of ordinary skill in the art. For instance, features illustrated or described as part of one embodiment may be used with another embodiment to yield a still further embodiment. Thus, it is intended that the disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the disclosure is by way of example rather than by way of limitation, and the subject disclosure does not preclude inclusion of such modifications, variations or additions to the subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . (i), (ii), (iii), . . . , etc. may be used to illustrate operations or different elements in a list. Such identifiers are provided for the case of the reader and do not denote a particular order, importance, or priority of steps, operations, or elements. For instance, an operation illustrated by a list identifier of (a). (i), etc. may be performed before, after, or in parallel with another operation illustrated by a list identifier of (b). (ii), etc.

What is claimed is:

1. A vehicle wheel-based computing device, comprising:
a display device configured for at least partial attachment to a wheel of a vehicle; and
a control circuit configured to:
obtain content to be provided for presentation on a display screen of the display device,
receive vehicle data indicating a motion parameter associated with the vehicle,
perform a transformation of the content based on: (i) a refresh rate associated with the display device, and (ii) the motion parameter associated with the vehicle; and
render the content to be provided for presentation on the display screen of the display device, the content being generated at least partially via one or more machine-learned models, wherein the one or more machine-learned models comprise one or more machine-learned generative models trained based on training data indicative of a plurality of wheel-based features.

2. The vehicle wheel-based computing device of claim 1, wherein the transformation comprises a rotation of the content in a direction opposite of a rotation direction of the wheel.

3. The vehicle wheel-based computing device of claim 1, wherein the display device is circular-shaped.

4. The vehicle wheel-based computing device of claim 1, wherein the display device covers a rim of the wheel.

5. The vehicle wheel-based computing device of claim 1, wherein the display device is integrated into the wheel.

6. The vehicle wheel-based computing device of claim 1, wherein the display device is configured to be detachable from the wheel and attachable to the wheel.

7. The vehicle wheel-based computing device of claim 1, wherein the motion parameter comprises at least one of a speed of the vehicle, an angular velocity of the wheel, revolutions per minute of the wheel, a heading of the wheel or the vehicle, or an acceleration of the vehicle.

8. The vehicle wheel-based computing device of claim 1, further comprising:
a motion sensor configured to obtain the vehicle data, and wherein the vehicle data comprises at least one of accelerometer data associated with the display device, gyroscope data associated with the display device, wheel torque data, or brake torque data.

9. The vehicle wheel-based computing device of claim 1, wherein the motion parameter comprises an angular velocity of the display device and wherein the transformation comprises a rotation of the content, and wherein when the angular velocity of the display device is less than a threshold angular velocity value, the control circuit is configured to rotate the content at a rotation rate which matches the angular velocity of the display device, and when the angular velocity of the display device is more than the threshold angular velocity value, the content corresponds to a static image and the control circuit is configured to provide the static image for presentation on the display screen of the display device.

10. The vehicle wheel-based computing device of claim 1, wherein the motion parameter comprises an angular velocity of the display device and wherein the transformation comprises a rotation of the content, and wherein when the angular velocity of the display device is less than a threshold angular velocity value, the control circuit is configured to rotate the content at a rotation rate which matches the angular velocity of the display device, and when the angular velocity of the display device is more than the threshold angular velocity value, the content corresponds to a video stream and the control circuit is configured to provide the video stream for presentation on the display screen of the display device which appears stationary on the display device.

11. The vehicle wheel-based computing device of claim 1, wherein: the control circuit is configured to obtain an image captured by a camera disposed at the vehicle, and to provide for presentation on the display screen of the display device an augmented-reality image which comprises one or more virtual objects which are overlaid on the image captured by the camera.

12. The vehicle wheel-based computing device of claim 1, wherein to perform the transformation of the content the control circuit is configured to rotate the content to match an angular velocity of the display device such that an orientation of the content presented on the display device is maintained.

13. The vehicle wheel-based computing device of claim 1, wherein: the content to be provided for presentation on the display screen of the display device comprises an animation comprising a plurality of image frames, and wherein to perform the transformation of the content, the control circuit is configured to rotate one or more of the image frames to maintain, while the animation is provided for presentation on the display screen of the display device during rotation of the wheel, an orientation of the animation as it appears from a viewpoint external to the vehicle.

14. The vehicle wheel-based computing device of claim 1, wherein the control circuit is configured to:
obtain motion data associated with the display device based on one or more sensors integrated with the display device, and transmit the motion data to an infotainment system of the vehicle to provide for display within the vehicle a representation of the display screen of the display device based on the motion data.

15. A computer-implemented method, comprising:
obtaining, by a vehicle wheel-based computing device, content to be provided for presentation on a display screen of a display device, the display device being configured for at partial attachment to a wheel of a vehicle;
receiving, by the vehicle wheel-based computing device, vehicle data indicating a motion parameter associated with the vehicle;
performing, by the vehicle wheel-based computing device, a transformation of the content based on: (i) a refresh rate associated with the display device, and (ii) the motion parameter associated with the vehicle; and
rendering, by the vehicle wheel-based computing device, the content to be provided for presentation on the display screen of the display device, the content being generated at least partially via one or more machine-learned models, wherein the one or more machine-learned models comprise one or more machine-learned generative models trained based on training data indicative of a plurality of wheel-based features.

16. A vehicle, comprising:
a wheel; and
a vehicle wheel-based computing device including:
a display device configured for at least partial attachment to the wheel, and a control circuit configured to:

obtain content to be provided for presentation on a display screen of the display device, receive vehicle data indicating a motion parameter associated with the vehicle, perform a transformation of the content based on: (i) a refresh rate associated with the display device, and (ii) the motion parameter associated with the vehicle, and receive an input requesting content to be provided for presentation on the display screen of the display device, and to render the content to be provided for presentation on the display screen of the display device based on the input, the content being rendered at least partially via one or more machine-learned models, wherein the one or more machine-learned models comprise one or more machine-learned generative models trained based on training data indicative of a plurality of wheel-based features.

17. The vehicle of claim 16, wherein the transformation comprises a rotation of the content in a direction opposite of a rotation direction of the wheel.

18. The vehicle of claim 16, wherein the display device is circular-shaped and covers a rim of the wheel.

19. The vehicle of claim 16, wherein the motion parameter comprises an angular velocity of the display device, the display device comprises a motion sensor configured to measure motion data associated with the display device, and the control circuit is configured to determine the angular velocity of the display device based on the motion data.

20. The vehicle of claim 16, further comprising a charging system disposed proximate to the display device, the charging system being configured to transfer power wirelessly to a power source of the display device.

* * * * *